(12) United States Patent
Hayes et al.

(10) Patent No.: US 12,444,755 B2
(45) Date of Patent: Oct. 14, 2025

(54) CORRUGATED FUEL ELECTRODE

(71) Applicant: FORM ENERGY, INC., Somerville, MA (US)

(72) Inventors: Joel Ryan Hayes, Chandler, AZ (US); Ramkumar Krishnan, Scottsdale, AZ (US); Todd Trimble, Phoenix, AZ (US); Clifford Anderson, Tempe, AZ (US)

(73) Assignee: FORM ENERGY, INC., Somerville, MA (US)

( * ) Notice: Subject to any disclaimer, the term of this patent is extended or adjusted under 35 U.S.C. 154(b) by 0 days.

(21) Appl. No.: 18/436,647

(22) Filed: Feb. 8, 2024

(65) Prior Publication Data

US 2024/0387837 A1 Nov. 21, 2024

Related U.S. Application Data

(63) Continuation of application No. 17/663,318, filed on May 13, 2022, now Pat. No. 11,923,568, which is a (Continued)

(51) Int. Cl.
*H01M 8/0254* (2016.01)
*H01M 4/66* (2006.01)
(Continued)

(52) U.S. Cl.
CPC ......... *H01M 8/0254* (2013.01); *H01M 4/661* (2013.01); *H01M 4/742* (2013.01);
(Continued)

(58) Field of Classification Search
CPC ............ H01M 8/0254; H01M 8/0232; H01M 8/0245; H01M 8/184; H01M 4/661; H01M 4/742; H01M 4/747; H01M 4/78
See application file for complete search history.

(56) References Cited

U.S. PATENT DOCUMENTS

| | | |
|---|---|---|
| 678,722 A | 7/1901 | Edison |
| 692,507 A | 2/1902 | Edison |

(Continued)

FOREIGN PATENT DOCUMENTS

| | | |
|---|---|---|
| CN | 1253385 A | 5/2000 |
| CN | 101651208 A | 2/2010 |

(Continued)

OTHER PUBLICATIONS

Gayer KH, Woontner L. The solubility of ferrous hydroxide and ferric hydroxide in acidic and basic media at 25. The Journal of Physical Chemistry. Nov. 1956;60(11):1569-71.

(Continued)

*Primary Examiner* — Karie O'Neill Apicella
(74) *Attorney, Agent, or Firm* — The Marbury Law Group, PLLC

(57) ABSTRACT

A fuel electrode incorporates a first and second corrugated portion that are attached to each other at offset angles respect to their corrugation axis and therefore reinforce each other. A first corrugated portion may extend orthogonally with respect to a second corrugated portion. The first and second corrugated portions may be formed from metal wire and may therefore have a very high volumetric void fraction and a high surface area to volume ratio (sa/vol). In addition, the strands of the wire may be selected to enable high conductivity to the current collectors while maximizing the sa/vol. In addition, the shape of the corrugation, including the period distance, amplitude and geometry may be selected with respect to the stiffness requirements and electrochemical cell application factors. The first and second corrugated portions may be calendared or crushed to reduce thickness of the fuel electrode.

9 Claims, 17 Drawing Sheets

Related U.S. Application Data continuation of application No. 16/343,158, filed as application No. PCT/US2017/057552 on Oct. 20, 2017, now Pat. No. 11,335,918.

(60) Provisional application No. 62/410,852, filed on Oct. 21, 2016.

(51) Int. Cl.
| | |
|---|---|
| *H01M 4/74* | (2006.01) |
| *H01M 4/78* | (2006.01) |
| *H01M 8/0232* | (2016.01) |
| *H01M 8/0245* | (2016.01) |
| *H01M 8/18* | (2006.01) |
| *H01M 12/08* | (2006.01) |

(52) U.S. Cl.
CPC ............ *H01M 4/747* (2013.01); *H01M 4/78* (2013.01); *H01M 8/0232* (2013.01); *H01M 8/0245* (2013.01); *H01M 8/184* (2013.01); *H01M 12/08* (2013.01)

(56) References Cited

U.S. PATENT DOCUMENTS

| | | |
|---|---|---|
| 956,252 A | 4/1910 | Wilson |
| 983,430 A | 2/1911 | Estelle |
| 1,940,385 A | 12/1933 | Ackermann |
| 1,988,861 A | 1/1935 | Thorausch et al. |
| 2,083,364 A | 6/1937 | Cook, Jr. |
| 2,104,973 A | 1/1938 | Dassler |
| 2,131,592 A | 9/1938 | Lange et al. |
| 2,571,927 A | 10/1951 | Neumann et al. |
| 2,643,276 A | 6/1953 | Salauze |
| 2,646,454 A | 7/1953 | Herold |
| 2,661,387 A | 12/1953 | Ackermann et al. |
| 2,683,182 A | 7/1954 | Salauze |
| 2,798,110 A | 7/1957 | Peters |
| 2,862,989 A | 12/1958 | Strauss |
| 2,871,281 A | 1/1959 | Moulton et al. |
| 2,905,739 A | 9/1959 | Strauss |
| 2,915,576 A | 12/1959 | Strauss |
| 2,920,127 A | 1/1960 | Vogt |
| 2,930,829 A | 3/1960 | Jacauier |
| 2,980,747 A | 4/1961 | Daley |
| 2,980,748 A | 4/1961 | Piroux |
| 2,988,584 A | 6/1961 | Peters |
| 2,988,585 A | 6/1961 | Peters |
| 2,994,728 A | 8/1961 | Herold |
| 2,997,516 A | 8/1961 | Soding |
| 3,003,014 A | 10/1961 | Philipp et al. |
| 3,055,963 A | 9/1962 | Krebs |
| 3,059,041 A | 10/1962 | Vogt |
| 3,066,178 A | 11/1962 | Winkler |
| 3,080,440 A | 3/1963 | Ruetschi et al. |
| 3,096,215 A | 7/1963 | Voss et al. |
| 3,117,033 A | 1/1964 | Bachmann |
| 3,174,879 A | 3/1965 | Stanimirovitch |
| 3,219,486 A | 11/1965 | Salcedo |
| 3,223,611 A | 12/1965 | Wells et al. |
| 3,226,260 A | 12/1965 | Drenaler |
| 3,262,815 A | 7/1966 | Langer et al. |
| 3,266,936 A | 8/1966 | Krebs |
| 3,323,951 A | 6/1967 | Kreiselmaier |
| 3,326,676 A | 6/1967 | Rubel et al. |
| 3,338,746 A | 8/1967 | Plust et al. |
| 3,342,639 A | 9/1967 | Harivel |
| 3,345,212 A | 10/1967 | Schweitzer |
| 3,378,406 A | 4/1968 | Rosansky |
| 3,393,094 A | 7/1968 | Stanimirovitch |
| 3,424,618 A | 1/1969 | Weilnbock et al. |
| 3,438,812 A | 4/1969 | Cherney et al. |
| 3,462,303 A | 8/1969 | Reber |
| 3,483,036 A | 12/1969 | Gregor |
| 3,484,291 A | 12/1969 | Mackenzie et al. |
| 3,507,696 A | 4/1970 | Jackovitz et al. |
| 3,525,640 A | 8/1970 | Mccormick et al. |
| 3,525,643 A | 8/1970 | Spahrbier et al. |
| 3,526,822 A | 9/1970 | Dickfeldt et al. |
| 3,527,613 A | 9/1970 | Hardman |
| 3,532,548 A | 10/1970 | Stachurski |
| 3,598,653 A | 8/1971 | Fukuda et al. |
| 3,615,843 A | 10/1971 | Moran |
| 3,615,844 A | 10/1971 | Spengler |
| 3,615,845 A | 10/1971 | Gray |
| 3,622,398 A | 11/1971 | Sekido et al. |
| 3,630,778 A | 12/1971 | Kreidl et al. |
| 3,647,544 A | 3/1972 | Schneider |
| 3,650,835 A | 3/1972 | Jackovitz et al. |
| 3,650,837 A | 3/1972 | Palmer |
| 3,679,482 A | 7/1972 | Hardman |
| 3,701,691 A | 10/1972 | Sassmannshausen et al. |
| 3,713,889 A | 1/1973 | Lecouffe |
| 3,713,892 A | 1/1973 | Moran |
| 3,716,413 A | 2/1973 | Eisner |
| 3,717,505 A | 2/1973 | Unkle, Jr. et al. |
| 3,728,244 A | 4/1973 | Cooley |
| 3,785,867 A | 1/1974 | Edwards et al. |
| 3,785,868 A | 1/1974 | Devitt |
| 3,801,376 A | 4/1974 | Lindstrom |
| 3,802,878 A | 4/1974 | Lindstrom |
| 3,819,413 A | 6/1974 | Niooe et al. |
| 3,822,149 A | 7/1974 | Hale |
| 3,836,397 A | 9/1974 | Hardman |
| 3,840,455 A | 10/1974 | Cooley |
| 3,847,603 A | 11/1974 | Fukuda et al. |
| 3,847,668 A | 11/1974 | Kramer et al. |
| 3,849,198 A | 11/1974 | Seidel |
| 3,850,696 A | 11/1974 | Summers |
| 3,853,624 A | 12/1974 | Brown et al. |
| 3,871,921 A | 3/1975 | Beatty et al. |
| 3,886,426 A | 5/1975 | Daggett |
| 3,895,961 A | 7/1975 | Gutridae |
| 3,898,098 A | 8/1975 | Giles |
| 3,898,099 A | 8/1975 | Baker et al. |
| 3,918,989 A | 11/1975 | Gillman et al. |
| 3,919,062 A | 11/1975 | Lundquist, Jr. et al. |
| 3,947,292 A | 3/1976 | Jackovitz et al. |
| 3,972,727 A | 8/1976 | Cohn |
| 3,976,502 A | 8/1976 | Sekido et al. |
| 3,977,906 A | 8/1976 | Beatty et al. |
| 3,980,501 A | 9/1976 | Feder et al. |
| 3,982,966 A | 9/1976 | Beatty et al. |
| 3,987,266 A | 10/1976 | Betz |
| 3,993,504 A | 11/1976 | Kramer et al. |
| 4,000,004 A | 12/1976 | Takahashi et al. |
| 4,011,365 A | 3/1977 | Lindstrom |
| 4,021,911 A | 5/1977 | Kononenko et al. |
| 4,032,693 A | 6/1977 | Lindstrom |
| 4,037,033 A | 7/1977 | Takamura et al. |
| 4,049,878 A | 9/1977 | Lindstrom |
| 4,064,331 A | 12/1977 | Patton et al. |
| 4,078,120 A | 3/1978 | Lindstrom |
| 4,083,940 A | 4/1978 | Das |
| 4,091,178 A | 5/1978 | Kordesch |
| 4,109,060 A | 8/1978 | Andersson et al. |
| 4,119,772 A | 10/1978 | Peters et al. |
| 4,123,568 A | 10/1978 | Kononenko et al. |
| 4,132,547 A | 1/1979 | Buzzelli et al. |
| 4,143,212 A | 3/1979 | Ueno et al. |
| 4,166,886 A | 9/1979 | Bonnaterre |
| 4,168,349 A | 9/1979 | Buzzelli |
| 4,201,653 A | 5/1980 | Ettel et al. |
| 4,207,383 A | 6/1980 | Oliaouram |
| 4,225,411 A | 9/1980 | Grune |
| 4,236,927 A | 12/1980 | Buhl et al. |
| 4,246,324 A | 1/1981 | De Nora et al. |
| 4,250,236 A | 2/1981 | Haschka et al. |
| 4,312,927 A | 1/1982 | Salmon |
| 4,317,863 A | 3/1982 | Struthers |
| 4,320,184 A | 3/1982 | Bernstein et al. |
| 4,332,869 A | 6/1982 | Maraalit et al. |
| 4,335,192 A | 6/1982 | Oliaouram |
| 4,340,449 A | 7/1982 | Srinivasan et al. |

(56) References Cited

U.S. PATENT DOCUMENTS

| | | |
|---|---|---|
| 4,356,027 A | 10/1982 | Sugiyama et al. |
| 4,356,101 A | 10/1982 | Jackovitz et al. |
| 4,383,015 A | 5/1983 | Buzzelli |
| 4,384,928 A | 5/1983 | Hall |
| 4,385,101 A | 5/1983 | Catanzarite |
| 4,385,967 A | 5/1983 | Brady et al. |
| 4,434,214 A | 2/1984 | Suzuki |
| 4,436,795 A | 3/1984 | Cooper et al. |
| 4,447,504 A | 5/1984 | Goebel |
| 4,447,509 A | 5/1984 | Maskalick |
| 4,448,858 A | 5/1984 | Graf et al. |
| 4,448,860 A | 5/1984 | Von Alpen et al. |
| 4,450,211 A | 5/1984 | Vignaud |
| 4,461,817 A | 7/1984 | Itoh et al. |
| 4,474,862 A | 10/1984 | Buzzelli et al. |
| 4,485,154 A | 11/1984 | Remick et al. |
| 4,519,425 A | 5/1985 | Seidel |
| 4,521,497 A | 6/1985 | Tamminen |
| 4,552,630 A | 11/1985 | Wheeler et al. |
| 4,581,064 A | 4/1986 | Morrison et al. |
| 4,643,959 A | 2/1987 | Glotzl et al. |
| 4,680,100 A | 7/1987 | Morin |
| 4,684,585 A | 8/1987 | Tamminen |
| 4,689,880 A | 9/1987 | Brezillon et al. |
| 4,693,946 A | 9/1987 | Niksa et al. |
| 4,732,823 A | 3/1988 | Ito et al. |
| 4,735,874 A | 4/1988 | Glatzel et al. |
| 4,746,415 A | 5/1988 | Boulton et al. |
| 4,804,390 A | 2/1989 | Lloyd et al. |
| 4,826,744 A | 5/1989 | Ltou et al. |
| 4,828,942 A | 5/1989 | Licht |
| 4,842,963 A | 6/1989 | Ross, Jr. |
| 4,863,484 A | 9/1989 | Beauchamp et al. |
| 4,871,627 A | 10/1989 | Strong et al. |
| 4,894,355 A | 1/1990 | Takeuchi et al. |
| 4,897,324 A | 1/1990 | Glaser |
| 4,900,642 A | 2/1990 | Tomantschaer et al. |
| 4,925,747 A | 5/1990 | Kordesch et al. |
| 4,950,561 A | 8/1990 | Niksa et al. |
| 4,957,827 A | 9/1990 | Kordesch et al. |
| 4,977,044 A | 12/1990 | Ludwig |
| 5,009,755 A | 4/1991 | Shor |
| 5,011,747 A | 4/1991 | Strong et al. |
| 5,043,234 A | 8/1991 | Tomantschqer et al. |
| 5,077,151 A | 12/1991 | Yasuda et al. |
| 5,104,497 A | 4/1992 | Tetzlaff et al. |
| 5,122,426 A | 6/1992 | Simon et al. |
| 5,143,799 A | 9/1992 | Tsenter |
| 5,145,752 A | 9/1992 | Goldstein et al. |
| 5,158,658 A | 10/1992 | Cawlfield et al. |
| 5,162,169 A | 11/1992 | Tomantschqer et al. |
| 5,185,218 A | 2/1993 | Brokman et al. |
| 5,190,833 A | 3/1993 | Goldstein et al. |
| 5,227,256 A | 7/1993 | Marianowski et al. |
| 5,254,414 A | 10/1993 | Tsenter |
| 5,281,495 A | 1/1994 | Hirakawa et al. |
| 5,290,640 A | 3/1994 | Tsenter et al. |
| 5,300,371 A | 4/1994 | Tomantschqer et al. |
| 5,318,861 A | 6/1994 | Harats et al. |
| 5,362,942 A | 11/1994 | Vanderslice et al. |
| 5,376,471 A | 12/1994 | Hunter et al. |
| 5,397,532 A | 3/1995 | Blaimschein |
| 5,405,719 A | 4/1995 | Sonoda et al. |
| 5,411,815 A | 5/1995 | Goldstein |
| 5,415,949 A | 5/1995 | Stone et al. |
| 5,429,885 A | 7/1995 | Stockburaer et al. |
| 5,431,823 A | 7/1995 | Gofer |
| 5,432,022 A | 7/1995 | Cheiky |
| 5,434,020 A | 7/1995 | Cooper |
| 5,439,758 A | 8/1995 | Stone et al. |
| 5,441,820 A | 8/1995 | Siu et al. |
| 5,447,805 A | 9/1995 | Harats et al. |
| 5,447,806 A | 9/1995 | Hoge et al. |
| 5,451,475 A | 9/1995 | Ohta et al. |
| 5,458,988 A | 10/1995 | Putt |
| 5,549,991 A | 8/1996 | Licht et al. |
| 5,565,072 A | 10/1996 | Faita et al. |
| 5,567,540 A | 10/1996 | Stone et al. |
| 5,569,551 A | 10/1996 | Pedicini et al. |
| 5,569,554 A | 10/1996 | Tsenter |
| 5,576,116 A | 11/1996 | Sanchez et al. |
| 5,595,949 A | 1/1997 | Goldstein et al. |
| 5,650,240 A | 7/1997 | Rogers |
| 5,652,068 A | 7/1997 | Shuster et al. |
| 5,665,481 A | 9/1997 | Schuster et al. |
| 5,700,596 A | 12/1997 | Ikorna et al. |
| 5,733,384 A | 3/1998 | Cao et al. |
| 5,733,677 A | 3/1998 | Golovin et al. |
| 5,750,289 A | 5/1998 | Kejha |
| 5,753,384 A | 5/1998 | Kimberg |
| 5,773,163 A | 6/1998 | Suzuki et al. |
| 5,780,184 A | 7/1998 | Coco et al. |
| 5,780,186 A | 7/1998 | Casey, Jr. |
| 5,788,943 A | 8/1998 | Aladjov |
| 5,789,097 A | 8/1998 | Kistrup et al. |
| 5,850,136 A | 12/1998 | Kaneko |
| 5,935,724 A | 8/1999 | Spillman et al. |
| 5,935,728 A | 8/1999 | Spillman et al. |
| 5,938,899 A | 8/1999 | Forand |
| 5,965,298 A | 10/1999 | Harada et al. |
| 5,972,531 A | 10/1999 | Kawakami |
| 5,998,967 A | 12/1999 | Umeki et al. |
| 6,014,013 A | 1/2000 | Suppanz et al. |
| 6,025,696 A | 2/2000 | Lenhart et al. |
| 6,027,827 A | 2/2000 | Gan et al. |
| 6,027,834 A | 2/2000 | Hayashi et al. |
| 6,034,506 A | 3/2000 | Hall |
| 6,046,514 A | 4/2000 | Rouillard et al. |
| 6,054,840 A | 4/2000 | Nakanishi et al. |
| 6,057,052 A | 5/2000 | Shrim et al. |
| 6,091,230 A | 7/2000 | Winzer |
| 6,121,752 A | 9/2000 | Kitahara et al. |
| 6,127,061 A | 10/2000 | Shun et al. |
| 6,153,328 A | 11/2000 | Colborn |
| 6,162,555 A | 12/2000 | Gutierrez et al. |
| 6,165,638 A | 12/2000 | Spillman et al. |
| 6,183,899 B1 | 2/2001 | Sanchez et al. |
| 6,194,098 B1 | 2/2001 | Ying et al. |
| 6,207,037 B1 | 3/2001 | Dartnell et al. |
| 6,210,832 B1 | 4/2001 | Visco et al. |
| 6,211,650 B1 | 4/2001 | Mumaw et al. |
| 6,228,535 B1 | 5/2001 | Fierro et al. |
| 6,249,940 B1 | 6/2001 | Asano et al. |
| 6,265,846 B1 | 7/2001 | Flechsig et al. |
| 6,268,085 B1 | 7/2001 | Manthiram et al. |
| 6,271,646 B1 | 8/2001 | Evers et al. |
| 6,277,508 B1 | 8/2001 | Reiser et al. |
| 6,312,846 B1 | 11/2001 | Marsh |
| 6,333,123 B1 | 12/2001 | Davis et al. |
| 6,355,369 B1 | 3/2002 | Iarochenko et al. |
| 6,358,643 B1 | 3/2002 | Katz et al. |
| 6,379,828 B1 | 4/2002 | Worth |
| 6,379,833 B1 | 4/2002 | Hill et al. |
| 6,383,673 B1 | 5/2002 | Faris et al. |
| 6,383,675 B1 | 5/2002 | Zhong |
| 6,392,389 B1 | 5/2002 | Kohler |
| 6,410,160 B1 | 6/2002 | Landin et al. |
| 6,410,174 B1 | 6/2002 | Faris |
| 6,416,649 B1 | 7/2002 | Ray et al. |
| 6,451,463 B1 | 9/2002 | Tsai et al. |
| 6,458,480 B1 | 10/2002 | Morris et al. |
| 6,465,638 B2 | 10/2002 | Gorman et al. |
| 6,472,093 B2 | 10/2002 | Faris et al. |
| 6,475,658 B1 | 11/2002 | Pedicini et al. |
| 6,489,056 B1 | 12/2002 | Davis et al. |
| 6,537,701 B1 | 3/2003 | Nimon et al. |
| 6,541,941 B2 | 4/2003 | Adams et al. |
| 6,544,678 B2 | 4/2003 | Faris et al. |
| 6,558,830 B2 | 5/2003 | Faris et al. |
| 6,562,494 B1 | 5/2003 | Tsai et al. |
| 6,562,504 B2 | 5/2003 | Faris et al. |
| 6,566,000 B1 | 5/2003 | Iarochenko et al. |
| 6,569,555 B1 | 5/2003 | Faris et al. |
| 6,579,637 B1 | 6/2003 | Savage et al. |

(56) References Cited

U.S. PATENT DOCUMENTS

| | | |
|---|---|---|
| 6,586,909 B1 | 7/2003 | Trepka |
| 6,620,548 B1 | 9/2003 | Satoguchi et al. |
| 6,641,943 B1 | 11/2003 | Faris et al. |
| 6,646,418 B1 | 11/2003 | Xie et al. |
| 6,649,294 B2 | 11/2003 | Faris et al. |
| 6,653,252 B2 | 11/2003 | Kawahara |
| 6,673,483 B2 | 1/2004 | Jordy et al. |
| 6,673,490 B2 | 1/2004 | Miki et al. |
| 6,677,077 B2 | 1/2004 | Spillman et al. |
| 6,680,140 B1 | 1/2004 | Berlureau et al. |
| 6,706,433 B2 | 3/2004 | Pinto et al. |
| 6,713,206 B2 | 3/2004 | Markoski et al. |
| 6,756,149 B2 | 6/2004 | Knights et al. |
| 6,762,587 B1 | 7/2004 | Barbetta |
| 6,764,588 B2 | 7/2004 | Smedley et al. |
| 6,777,129 B2 | 8/2004 | Komori et al. |
| 6,787,260 B2 | 9/2004 | Smedley |
| 6,800,397 B2 | 10/2004 | Okada |
| 6,802,946 B2 | 10/2004 | Basol et al. |
| 6,811,903 B2 | 11/2004 | Vartak et al. |
| 6,822,423 B2 | 11/2004 | Yau et al. |
| 6,835,027 B1 | 12/2004 | Glass |
| 6,838,203 B2 | 1/2005 | Zheng |
| 6,849,172 B2 | 2/2005 | Rigby et al. |
| 6,849,356 B2 | 2/2005 | Dow et al. |
| 6,855,455 B1 | 2/2005 | Berger et al. |
| 6,858,347 B2 | 2/2005 | Tanigawa et al. |
| 6,866,950 B2 | 3/2005 | Connor et al. |
| 6,902,602 B2 | 6/2005 | Keefer et al. |
| 6,911,274 B1 | 6/2005 | Colborn et al. |
| 6,918,945 B2 | 7/2005 | Uenosono et al. |
| 6,942,105 B2 | 9/2005 | Smedley et al. |
| 6,967,064 B2 | 11/2005 | Haltiner, Jr. et al. |
| 6,986,964 B2 | 1/2006 | Faris et al. |
| 6,994,933 B1 | 2/2006 | Bates |
| 7,020,355 B2 | 3/2006 | Lahann et al. |
| 7,060,388 B2 | 6/2006 | Naruoka |
| 7,070,632 B1 | 7/2006 | Visco et al. |
| 7,112,383 B2 | 9/2006 | Konabe |
| 7,126,310 B1 | 10/2006 | Barron |
| 7,150,933 B1 | 12/2006 | Mclean |
| 7,201,857 B2 | 4/2007 | Ovshinsky et al. |
| 7,201,980 B2 | 4/2007 | Sudo et al. |
| 7,226,676 B2 | 6/2007 | Faris et al. |
| 7,238,440 B2 | 7/2007 | Damore et al. |
| 7,252,898 B2 | 8/2007 | Markoski et al. |
| 7,261,970 B2 | 8/2007 | Young et al. |
| 7,270,906 B2 | 9/2007 | Haltiner, Jr. et al. |
| 7,273,541 B2 | 9/2007 | Choban et al. |
| 7,276,309 B2 | 10/2007 | Smedley et al. |
| 7,279,245 B1 | 10/2007 | Clark |
| 7,291,186 B2 | 11/2007 | Zhang et al. |
| 7,303,835 B2 | 12/2007 | Mathias et al. |
| 7,399,391 B2 | 7/2008 | Oldani et al. |
| 7,466,104 B2 | 12/2008 | Wang et al. |
| 7,468,221 B2 | 12/2008 | Lafollette et al. |
| 7,482,081 B2 | 1/2009 | Hong |
| 7,488,547 B1 | 2/2009 | Iacovelli |
| 7,527,890 B2 | 5/2009 | Kodama et al. |
| 7,535,199 B2 | 5/2009 | Kimura et al. |
| 7,598,706 B2 | 10/2009 | Koski et al. |
| 7,670,575 B2 | 3/2010 | Jarvinen et al. |
| 7,670,705 B2 | 3/2010 | Ueda et al. |
| 7,670,724 B1 | 3/2010 | Chan et al. |
| 7,722,988 B2 | 5/2010 | Webber |
| 8,058,165 B2 | 11/2011 | Kawano et al. |
| 8,163,410 B2 | 4/2012 | Fulop et al. |
| 8,168,337 B2 | 5/2012 | Friesen et al. |
| 8,309,259 B2 | 11/2012 | Friesen et al. |
| 8,329,346 B2 | 12/2012 | Rensburg et al. |
| 8,372,255 B2 | 2/2013 | Perego et al. |
| 8,383,267 B2 | 2/2013 | Konishiike et al. |
| 8,397,508 B2 | 3/2013 | Weimer et al. |
| 8,480,932 B2 | 7/2013 | Takeuchi et al. |
| 8,486,563 B2 | 7/2013 | Chou et al. |
| 8,491,763 B2 | 7/2013 | Friesen |
| 8,492,052 B2 | 7/2013 | Friesen et al. |
| 8,563,150 B2 | 10/2013 | Bugnet et al. |
| 8,659,268 B2 | 2/2014 | Krishnan et al. |
| 8,728,671 B1 | 5/2014 | Brost |
| 8,741,491 B2 | 6/2014 | Wolfe et al. |
| 8,758,948 B2 | 6/2014 | Narayan et al. |
| 8,859,145 B2 | 10/2014 | Stevanovic et al. |
| 8,877,391 B2 | 11/2014 | Friesen et al. |
| 8,895,197 B2 | 11/2014 | Friesen et al. |
| 8,904,626 B2 | 12/2014 | Liu et al. |
| 8,906,563 B2 | 12/2014 | Friesen et al. |
| 8,911,910 B2 | 12/2014 | Krishnan et al. |
| 8,920,969 B2 | 12/2014 | Issaev et al. |
| 9,045,338 B2 | 6/2015 | Mcwhorter et al. |
| 9,065,120 B2 | 6/2015 | Carlson |
| 9,105,910 B2 | 8/2015 | Friesen et al. |
| 9,105,946 B2 | 8/2015 | Friesen et al. |
| 9,136,563 B2 | 9/2015 | Hucker et al. |
| 9,147,919 B2 | 9/2015 | Friesen et al. |
| 9,172,123 B2 | 10/2015 | Albertus et al. |
| 9,178,207 B2 | 11/2015 | Friesen et al. |
| 9,214,830 B2 | 12/2015 | Friesen et al. |
| 9,263,779 B2 | 2/2016 | Lee et al. |
| 9,269,995 B2 | 2/2016 | Friesen et al. |
| 9,269,996 B2 | 2/2016 | Friesen et al. |
| 9,287,592 B2 | 3/2016 | Gifford et al. |
| 9,368,486 B2 | 6/2016 | Wang et al. |
| 9,368,788 B2 | 6/2016 | Ogg et al. |
| 9,419,273 B2 | 8/2016 | Kakeya et al. |
| 9,450,233 B2 | 9/2016 | Ogg |
| 9,478,793 B2 | 10/2016 | Ogg et al. |
| 9,478,806 B2 | 10/2016 | Ogg et al. |
| 9,537,144 B2 | 1/2017 | Huang et al. |
| 9,559,385 B2 | 1/2017 | Ogg et al. |
| 9,577,298 B2 | 2/2017 | Narayan et al. |
| 9,583,779 B2 | 2/2017 | Chiang et al. |
| 9,660,265 B2 | 5/2017 | Msco et al. |
| 9,680,151 B2 | 6/2017 | Mullins et al. |
| 9,680,154 B2 | 6/2017 | Chen et al. |
| 9,728,774 B2 | 8/2017 | Schuh et al. |
| 9,732,409 B2 | 8/2017 | Ogg et al. |
| 9,755,231 B2 | 9/2017 | Lee et al. |
| 9,780,379 B2 | 10/2017 | Zhamu et al. |
| 9,816,170 B2 | 11/2017 | Ogg et al. |
| 9,843,064 B2 | 12/2017 | Brandon et al. |
| 9,893,397 B2 | 2/2018 | Yoshida et al. |
| 9,911,985 B2 | 3/2018 | Dong et al. |
| 9,941,548 B2 | 4/2018 | Vu et al. |
| 9,947,481 B2 | 4/2018 | Solomon et al. |
| 9,972,874 B2 | 5/2018 | Toussaint et al. |
| 10,008,754 B2 | 6/2018 | Englert |
| 10,014,530 B2 | 7/2018 | Lang et al. |
| 10,033,036 B2 | 7/2018 | Christensen et al. |
| 10,044,082 B2 | 8/2018 | Suyama et al. |
| 10,147,988 B2 | 12/2018 | Park et al. |
| 10,177,417 B2 | 1/2019 | Van Dijk et al. |
| 10,177,426 B2 | 1/2019 | Nitta |
| 10,522,840 B2 | 12/2019 | Gayden |
| 2001/0007725 A1 | 7/2001 | Faris et al. |
| 2002/0010261 A1 | 1/2002 | Callahan et al. |
| 2002/0015871 A1 | 2/2002 | Tao et al. |
| 2002/0028372 A1 | 3/2002 | Ohlsen et al. |
| 2002/0045075 A1 | 4/2002 | Pinto et al. |
| 2002/0061427 A1 | 5/2002 | Vu et al. |
| 2002/0076602 A1 | 6/2002 | Finkelshtain et al. |
| 2002/0098398 A1 | 7/2002 | Chen |
| 2002/0142202 A1 | 10/2002 | Li et al. |
| 2002/0142203 A1 | 10/2002 | Ma et al. |
| 2002/0146600 A1 | 10/2002 | Vartak et al. |
| 2002/0155327 A1 | 10/2002 | Faris |
| 2002/0155351 A1 | 10/2002 | Licht |
| 2002/0160247 A1 | 10/2002 | Tzeng et al. |
| 2002/0177036 A1 | 11/2002 | Faris |
| 2003/0049520 A1 | 3/2003 | Davis et al. |
| 2003/0054217 A1 | 3/2003 | Faris |
| 2003/0059668 A1 | 3/2003 | Visco et al. |
| 2003/0077501 A1 | 4/2003 | Knights et al. |
| 2003/0099882 A1 | 5/2003 | Hampden-Smith et al. |

(56) References Cited

U.S. PATENT DOCUMENTS

| | | |
|---|---|---|
| 2003/0134163 A1 | 7/2003 | Markoski et al. |
| 2003/0143446 A1 | 7/2003 | Faris et al. |
| 2003/0162068 A1 | 8/2003 | Wilson et al. |
| 2003/0165727 A1 | 9/2003 | Priestnall et al. |
| 2003/0175566 A1 | 9/2003 | Fisher et al. |
| 2003/0190504 A1 | 10/2003 | Fisher et al. |
| 2003/0198862 A1 | 10/2003 | Struthers |
| 2004/0005488 A1 | 1/2004 | Faris et al. |
| 2004/0023112 A1 | 2/2004 | Lin |
| 2004/0031143 A1 | 2/2004 | Morris et al. |
| 2004/0053104 A1 | 3/2004 | Novkov et al. |
| 2004/0053132 A1 | 3/2004 | Smedley et al. |
| 2004/0058203 A1 | 3/2004 | Priestnall et al. |
| 2004/0058217 A1 | 3/2004 | Ohlsen et al. |
| 2004/0058226 A1 | 3/2004 | Lamarre et al. |
| 2004/0069622 A1 | 4/2004 | Martelli et al. |
| 2004/0121208 A1 | 6/2004 | James et al. |
| 2004/0146764 A1 | 7/2004 | Tsai et al. |
| 2004/0157092 A1 | 8/2004 | Kimberg et al. |
| 2004/0157101 A1 | 8/2004 | Smedley |
| 2004/0175603 A1 | 9/2004 | Yang et al. |
| 2004/0180246 A1 | 9/2004 | Smedley |
| 2004/0185323 A1 | 9/2004 | Fowler et al. |
| 2004/0185328 A1 | 9/2004 | Lin et al. |
| 2004/0197643 A1 | 10/2004 | Buckle |
| 2004/0221426 A1 | 11/2004 | Igawa et al. |
| 2004/0225249 A1 | 11/2004 | Leonard et al. |
| 2004/0229107 A1 | 11/2004 | Smedley |
| 2004/0247969 A1 | 12/2004 | Faris et al. |
| 2004/0265684 A1 | 12/2004 | Faris et al. |
| 2005/0019634 A1 | 1/2005 | Legg et al. |
| 2005/0019651 A1 | 1/2005 | Tsai et al. |
| 2005/0031911 A1 | 2/2005 | Venkatesan et al. |
| 2005/0042503 A1 | 2/2005 | Kim et al. |
| 2005/0048351 A1 | 3/2005 | Hood et al. |
| 2005/0084737 A1 | 4/2005 | Wine et al. |
| 2005/0123815 A1 | 6/2005 | Tsai et al. |
| 2005/0170245 A1 | 8/2005 | Vartak et al. |
| 2005/0196656 A1 | 9/2005 | Gomez et al. |
| 2005/0201918 A1 | 9/2005 | Gordon et al. |
| 2005/0208343 A1 | 9/2005 | Kim et al. |
| 2005/0233191 A1 | 10/2005 | Ushio |
| 2006/0003217 A1 | 1/2006 | Cohen et al. |
| 2006/0024551 A1 | 2/2006 | Smotkin |
| 2006/0038536 A1 | 2/2006 | Lafollette et al. |
| 2006/0040174 A1 | 2/2006 | Peabody |
| 2006/0076295 A1 | 4/2006 | Leonard et al. |
| 2006/0127731 A1 | 6/2006 | Faris et al. |
| 2006/0194107 A1 | 8/2006 | Licht |
| 2006/0210867 A1 | 9/2006 | Kenis et al. |
| 2006/0228622 A1 | 10/2006 | Cohen et al. |
| 2006/0234855 A1 | 10/2006 | Gorte et al. |
| 2006/0269826 A1 | 11/2006 | Katz et al. |
| 2006/0292407 A1 | 12/2006 | Gervasio et al. |
| 2007/0020496 A1 | 1/2007 | Pelton et al. |
| 2007/0048577 A1 | 3/2007 | Ringeisen et al. |
| 2007/0077491 A1 | 4/2007 | Burchardt |
| 2007/0087265 A1 | 4/2007 | Lai et al. |
| 2007/0092787 A1 | 4/2007 | Chen |
| 2007/0120091 A1 | 5/2007 | Ovshinsky et al. |
| 2007/0141415 A1 | 6/2007 | Yang et al. |
| 2007/0141430 A1 | 6/2007 | Huang et al. |
| 2007/0141432 A1 | 6/2007 | Wang et al. |
| 2007/0141440 A1 | 6/2007 | Yang et al. |
| 2007/0141450 A1 | 6/2007 | Yang et al. |
| 2007/0154766 A1 | 7/2007 | Baik et al. |
| 2007/0166602 A1 | 7/2007 | Burchardt |
| 2007/0184314 A1 | 8/2007 | Kagami |
| 2007/0202365 A1 | 8/2007 | Sawa et al. |
| 2007/0224500 A1 | 9/2007 | White et al. |
| 2007/0234900 A1 | 10/2007 | Soloveichik et al. |
| 2007/0237993 A1 | 10/2007 | Carlsson et al. |
| 2007/0248845 A1 | 10/2007 | Armstrong et al. |
| 2007/0248868 A1 | 10/2007 | Haltiner et al. |
| 2007/0259234 A1 | 11/2007 | Chua et al. |
| 2007/0264550 A1 | 11/2007 | Zhang et al. |
| 2007/0269695 A1 | 11/2007 | Yamazaki et al. |
| 2007/0278107 A1 | 12/2007 | Barnett et al. |
| 2007/0287034 A1 | 12/2007 | Minteer et al. |
| 2008/0008911 A1 | 1/2008 | Stroock et al. |
| 2008/0009780 A1 | 1/2008 | Leonard et al. |
| 2008/0026265 A1 | 1/2008 | Markoski et al. |
| 2008/0032170 A1 | 2/2008 | Wainright et al. |
| 2008/0044721 A1 | 2/2008 | Heller et al. |
| 2008/0131762 A1 | 6/2008 | Joo et al. |
| 2008/0145719 A1 | 6/2008 | Yang et al. |
| 2008/0145721 A1 | 6/2008 | Shapiro et al. |
| 2008/0145737 A1 | 6/2008 | Cai et al. |
| 2008/0154101 A1 | 6/2008 | Jain et al. |
| 2008/0160413 A1 | 7/2008 | Dopp et al. |
| 2008/0231231 A1 | 9/2008 | Hartzog |
| 2008/0241617 A1 | 10/2008 | Sato |
| 2008/0252257 A1 | 10/2008 | Sufrin-Disler et al. |
| 2008/0261094 A1 | 10/2008 | Licht et al. |
| 2008/0268341 A1 | 10/2008 | Zhang |
| 2009/0027006 A1 | 1/2009 | Vezzini et al. |
| 2009/0061293 A1 | 3/2009 | Webber |
| 2009/0081488 A1 | 3/2009 | Sato et al. |
| 2009/0117429 A1 | 5/2009 | Zillmer et al. |
| 2009/0130539 A1 | 5/2009 | Burdine |
| 2009/0167242 A1 | 7/2009 | Naganuma et al. |
| 2009/0230921 A1 | 9/2009 | Hsu et al. |
| 2009/0284229 A1 | 11/2009 | Friesen et al. |
| 2009/0286149 A1 | 11/2009 | Ci et al. |
| 2009/0305090 A1 | 12/2009 | Chuang |
| 2010/0003570 A1 | 1/2010 | Finsterwalder et al. |
| 2010/0040926 A1 | 2/2010 | Blanchet et al. |
| 2010/0043824 A1 | 2/2010 | Greeley et al. |
| 2010/0062303 A1 | 3/2010 | Bae et al. |
| 2010/0062313 A1 | 3/2010 | Browning et al. |
| 2010/0069228 A1 | 3/2010 | Dopp et al. |
| 2010/0119883 A1 | 5/2010 | Friesen et al. |
| 2010/0119895 A1 | 5/2010 | Friesen |
| 2010/0119919 A1 | 5/2010 | Iarochenko et al. |
| 2010/0143824 A1 | 6/2010 | Tucker et al. |
| 2010/0285375 A1 | 11/2010 | Friesen et al. |
| 2010/0304274 A1 | 12/2010 | Bennett et al. |
| 2010/0310905 A1 | 12/2010 | Oriet et al. |
| 2010/0316935 A1 | 12/2010 | Friesen et al. |
| 2011/0003213 A1 | 1/2011 | Burchardt et al. |
| 2011/0020534 A1 | 1/2011 | Chou et al. |
| 2011/0027648 A1 | 2/2011 | Rolison et al. |
| 2011/0039181 A1 | 2/2011 | Friesen et al. |
| 2011/0044528 A1 | 2/2011 | Tsuchiya et al. |
| 2011/0070487 A1 | 3/2011 | Padhi et al. |
| 2011/0070506 A1 | 3/2011 | Friesen et al. |
| 2011/0086278 A1 | 4/2011 | Friesen et al. |
| 2011/0114496 A1 | 5/2011 | Dopp et al. |
| 2011/0189551 A1 | 8/2011 | Friesen et al. |
| 2011/0200893 A1 | 8/2011 | Friesen et al. |
| 2011/0250512 A1 | 10/2011 | Friesen et al. |
| 2011/0300429 A1 | 12/2011 | Mswhorter |
| 2011/0305959 A1 | 12/2011 | Friesen et al. |
| 2011/0316485 A1 | 12/2011 | Krishnan et al. |
| 2012/0000789 A1 | 1/2012 | Turek et al. |
| 2012/0015264 A1 | 1/2012 | Friesen et al. |
| 2012/0021303 A1 | 1/2012 | Amendola et al. |
| 2012/0024719 A1 | 2/2012 | Botte |
| 2012/0034498 A1 | 2/2012 | Hsu et al. |
| 2012/0052404 A1 | 3/2012 | Friesen et al. |
| 2012/0068667 A1 | 3/2012 | Friesen et al. |
| 2012/0070746 A1 | 3/2012 | Mikhaylik et al. |
| 2012/0098499 A1 | 4/2012 | Friesen et al. |
| 2012/0139496 A1 | 6/2012 | Krishnan et al. |
| 2012/0140378 A1 | 6/2012 | Tan et al. |
| 2012/0171594 A1 | 7/2012 | Mizuno et al. |
| 2012/0187918 A1 | 7/2012 | Narayan et al. |
| 2012/0202127 A1 | 8/2012 | Friesen et al. |
| 2012/0295172 A1 | 11/2012 | Peled et al. |
| 2012/0321969 A1 | 12/2012 | Friesen et al. |
| 2013/0022881 A1 | 1/2013 | Friesen et al. |
| 2013/0095393 A1 | 4/2013 | Friesen et al. |
| 2013/0115523 A1 | 5/2013 | Friesen et al. |
| 2013/0115525 A1 | 5/2013 | Friensen et al. |

(56) References Cited

U.S. PATENT DOCUMENTS

| | | |
|---|---|---|
| 2013/0115526 A1 | 5/2013 | Friesen et al. |
| 2013/0115531 A1 | 5/2013 | Amendola et al. |
| 2013/0115533 A1 | 5/2013 | Friesen et al. |
| 2013/0122344 A1 | 5/2013 | Visco et al. |
| 2013/0149615 A1 | 6/2013 | Narayan et al. |
| 2013/0183591 A1 | 7/2013 | Dickson |
| 2013/0189592 A1 | 7/2013 | Roumi et al. |
| 2013/0285597 A1 | 10/2013 | Goldstein |
| 2013/0295471 A1 | 11/2013 | Visco et al. |
| 2014/0075745 A1 | 3/2014 | Lu et al. |
| 2014/0087147 A1 | 3/2014 | Shelby et al. |
| 2014/0091631 A1 | 4/2014 | Naden et al. |
| 2014/0162129 A1 | 6/2014 | Kim et al. |
| 2014/0217985 A1 | 8/2014 | Gifford et al. |
| 2014/0220256 A1 | 8/2014 | Ogg et al. |
| 2014/0220432 A1 | 8/2014 | Ogg et al. |
| 2014/0220434 A1 | 8/2014 | Ogg et al. |
| 2014/0220435 A1 | 8/2014 | Ogg et al. |
| 2014/0220440 A1 | 8/2014 | Ogg et al. |
| 2014/0220460 A1 | 8/2014 | Ogg et al. |
| 2014/0227615 A1 | 8/2014 | Friesen et al. |
| 2014/0234730 A1 | 8/2014 | Albertus et al. |
| 2014/0262760 A1 | 9/2014 | Hayes et al. |
| 2014/0266055 A1 | 9/2014 | Trimble et al. |
| 2014/0266056 A1 | 9/2014 | Trimble et al. |
| 2014/0322598 A1 | 10/2014 | Ogg |
| 2014/0329126 A1 | 11/2014 | Ho et al. |
| 2014/0342214 A1 | 11/2014 | Wegner et al. |
| 2014/0377626 A1 | 12/2014 | Vu et al. |
| 2015/0010812 A1 | 1/2015 | Ohyama et al. |
| 2015/0010833 A1 | 1/2015 | Amendola et al. |
| 2015/0044572 A1 | 2/2015 | Dunleavy et al. |
| 2015/0048777 A1 | 2/2015 | Goldstein |
| 2015/0056505 A1 | 2/2015 | Ogg et al. |
| 2015/0064512 A1 | 3/2015 | Turney et al. |
| 2015/0064561 A1 | 3/2015 | Ogg et al. |
| 2015/0064562 A1 | 3/2015 | Ogg et al. |
| 2015/0086884 A1 | 3/2015 | Narayan et al. |
| 2015/0104679 A1 | 4/2015 | Trimble et al. |
| 2015/0140471 A1 | 5/2015 | Dong |
| 2015/0162601 A1 | 6/2015 | Meese et al. |
| 2015/0171455 A1 | 6/2015 | Mills |
| 2015/0214591 A1 | 7/2015 | Yoshida et al. |
| 2015/0221999 A1 | 8/2015 | Friesen et al. |
| 2015/0228991 A1 | 8/2015 | Friesen et al. |
| 2015/0280216 A1 | 10/2015 | Sumiyama et al. |
| 2015/0311519 A1 | 10/2015 | Kawanaka et al. |
| 2015/0349325 A1 | 12/2015 | Chen et al. |
| 2015/0372357 A1 | 12/2015 | Kruglak et al. |
| 2016/0006090 A1 | 1/2016 | Licht |
| 2016/0020493 A1 | 1/2016 | Van Dijk et al. |
| 2016/0036094 A1 | 2/2016 | Ogg |
| 2016/0036095 A1 | 2/2016 | Ogg |
| 2016/0049689 A1 | 2/2016 | Zinck et al. |
| 2016/0056518 A1 | 2/2016 | Benkert et al. |
| 2016/0064789 A1 | 3/2016 | Friesen et al. |
| 2016/0087320 A1 | 3/2016 | Suyama |
| 2016/0104926 A1 | 4/2016 | Nitta |
| 2016/0111729 A1 | 4/2016 | Kim et al. |
| 2016/0111730 A1 | 4/2016 | Kim et al. |
| 2016/0118636 A1 | 4/2016 | Jin et al. |
| 2016/0137498 A1 | 5/2016 | Gnotke |
| 2016/0190563 A1 | 6/2016 | Yan et al. |
| 2016/0197351 A1 | 7/2016 | Tani et al. |
| 2016/0248136 A1 | 8/2016 | Bugga et al. |
| 2016/0268622 A1 | 9/2016 | Lu et al. |
| 2016/0276697 A1 | 9/2016 | Esswein et al. |
| 2016/0276723 A1* | 9/2016 | Krishnan ............ H01M 4/38 |
| 2016/0308220 A1 | 10/2016 | Qi et al. |
| 2016/0351896 A1 | 12/2016 | Yushin et al. |
| 2016/0351907 A1 | 12/2016 | Tsutsumi |
| 2017/0040597 A1 | 2/2017 | Ogg et al. |
| 2017/0092990 A1 | 3/2017 | Tarrant et al. |
| 2017/0141434 A1 | 5/2017 | Narayan et al. |
| 2017/0162857 A1 | 6/2017 | Ogg et al. |
| 2017/0194635 A1 | 7/2017 | Kudo et al. |
| 2017/0194795 A1 | 7/2017 | Ensling et al. |
| 2017/0207432 A1 | 7/2017 | Vu et al. |
| 2017/0207464 A1 | 7/2017 | Gyenge et al. |
| 2017/0222246 A1 | 8/2017 | Kreiner et al. |
| 2017/0237063 A1 | 8/2017 | Ogg et al. |
| 2017/0244106 A1 | 8/2017 | Mortensen |
| 2018/0010228 A1 | 1/2018 | Ogg et al. |
| 2018/0123116 A1 | 5/2018 | Lee et al. |
| 2018/0214949 A1 | 8/2018 | Martin et al. |
| 2018/0219220 A1 | 8/2018 | Hayashi et al. |
| 2018/0241107 A1 | 8/2018 | Su et al. |
| 2018/0287237 A1 | 10/2018 | Manthiram et al. |
| 2019/0123339 A1 | 4/2019 | Yushin et al. |
| 2020/0003570 A1 | 1/2020 | Marti et al. |
| 2020/0006745 A1 | 1/2020 | Westwood et al. |
| 2020/0006796 A1 | 1/2020 | Su et al. |
| 2020/0006828 A1 | 1/2020 | Milshtein et al. |
| 2020/0006896 A1 | 1/2020 | Mahadik et al. |
| 2020/0036002 A1 | 1/2020 | Chakraborty et al. |
| 2020/0136153 A1 | 4/2020 | Jaramillo et al. |
| 2020/0353660 A1 | 11/2020 | Lee |
| 2020/0365953 A1 | 11/2020 | Pham et al. |
| 2020/0411879 A1 | 12/2020 | Hartman et al. |
| 2020/0411932 A1 | 12/2020 | Weber et al. |
| 2021/0028452 A1 | 1/2021 | Su et al. |
| 2021/0028457 A1 | 1/2021 | Newhouse et al. |
| 2021/0151775 A1 | 5/2021 | Perkins et al. |
| 2021/0354050 A1 | 11/2021 | Aiba et al. |
| 2022/0149359 A1 | 5/2022 | Gibson et al. |
| 2022/0223845 A1 | 7/2022 | Yang et al. |
| 2022/0352498 A1 | 11/2022 | Narayan et al. |

FOREIGN PATENT DOCUMENTS

| | | |
|---|---|---|
| CN | 101783429 A | 7/2010 |
| CN | 102449843 A | 5/2012 |
| CN | 202797189 U | 3/2013 |
| CN | 103098299 A | 5/2013 |
| CN | 103238239 A | 8/2013 |
| CN | 102623710 B | 7/2014 |
| CN | 102623757 B | 7/2014 |
| CN | 102623758 B | 7/2014 |
| CN | 105780081 A | 7/2016 |
| CN | 105789552 A | 7/2016 |
| CN | 106784815 A | 5/2017 |
| CN | 206340592 U | 7/2017 |
| CN | 107195910 A | 9/2017 |
| CN | 109478653 A | 3/2019 |
| CN | 109546157 A | 3/2019 |
| CN | 110957481 A | 4/2020 |
| DE | 1671929 A1 | 10/1971 |
| DE | 69306598 T2 | 6/1997 |
| EP | 0030954 A1 | 7/1981 |
| EP | 0058090 A1 | 8/1982 |
| EP | 0146946 A1 | 7/1985 |
| EP | 0229473 A1 | 7/1987 |
| EP | 0277937 A1 | 8/1988 |
| EP | 0278997 A1 | 8/1988 |
| EP | 0507862 B1 | 1/1995 |
| EP | 0677883 A1 | 10/1995 |
| EP | 0624283 B1 | 12/1995 |
| EP | 0598144 B1 | 10/1996 |
| EP | 0637291 B1 | 10/1997 |
| EP | 0813261 A2 | 12/1997 |
| EP | 0664932 B1 | 1/1998 |
| EP | 0823135 B1 | 11/1998 |
| EP | 0835334 B1 | 9/2002 |
| EP | 1027747 B1 | 9/2002 |
| EP | 1413001 B1 | 4/2005 |
| EP | 1266413 B1 | 5/2005 |
| EP | 1977475 B1 | 2/2012 |
| EP | 2486622 B1 | 7/2014 |
| EP | 2424016 B1 | 10/2014 |
| EP | 2973803 A1 | 1/2016 |
| EP | 2823528 B1 | 3/2016 |
| EP | 2586092 B1 | 1/2017 |
| EP | 2619835 B1 | 6/2017 |
| EP | 2792004 B1 | 11/2017 |

(56) References Cited

FOREIGN PATENT DOCUMENTS

| | | | |
|---|---|---|---|
| EP | 2721688 B1 | 2/2018 | |
| EP | 2774205 B1 | 3/2018 | |
| EP | 2954583 B1 | 4/2018 | |
| EP | 2559097 B1 | 5/2018 | |
| EP | 3322003 A1 | 5/2018 | |
| EP | 2596545 B1 | 6/2018 | |
| EP | 2659536 B1 | 8/2018 | |
| EP | 2973803 B1 | 7/2021 | |
| FR | 2770342 A1 | 4/1999 | |
| FR | 2998719 A1 | 5/2014 | |
| GB | 757294 A | 9/1956 | |
| GB | 1179777 A | 1/1970 | |
| GB | 1242832 A | 8/1971 | |
| GB | 1286173 A1 | 8/1972 | |
| GB | 1359746 A | 7/1974 | |
| GB | 1564438 A | 4/1980 | |
| IN | 201917002254 A | 4/2019 | |
| JP | S4888439 A | 11/1973 | |
| JP | S50127136 A | 10/1975 | |
| JP | S50154746 A | 12/1975 | |
| JP | S5288738 A | 7/1977 | |
| JP | S5443109 A | 4/1979 | |
| JP | H0714575 A | 1/1995 | |
| JP | H0863821 B | 3/1996 | |
| JP | H08141310 A | 6/1996 | |
| JP | H08302499 A | 11/1996 | |
| JP | H1032006 A * | 2/1998 | ............... B22F 3/11 |
| JP | 2000204056 A | 7/2000 | |
| JP | 2001313093 A | 11/2001 | |
| JP | 2002194411 A | 7/2002 | |
| JP | 3387724 B2 | 1/2003 | |
| JP | 2005285599 A | 10/2005 | |
| JP | 2008293678 A | 12/2008 | |
| JP | 2009129646 A | 6/2009 | |
| JP | 2010140736 A | 6/2010 | |
| JP | 2010192313 A | 9/2010 | |
| JP | 2010262876 A | 11/2010 | |
| JP | 2013134838 A | 7/2013 | |
| JP | 2014127289 A | 7/2014 | |
| JP | 2014150056 A | 8/2014 | |
| JP | 2015076379 A | 4/2015 | |
| JP | 5952540 B2 | 6/2016 | |
| JP | 2016528669 A | 9/2016 | |
| JP | 6032018 B2 | 11/2016 | |
| JP | 6234917 B2 | 11/2017 | |
| JP | 2017216126 A | 12/2017 | |
| JP | 2018006057 A | 1/2018 | |
| JP | 2018067399 A | 4/2018 | |
| JP | 6352884 B2 | 6/2018 | |
| JP | 6363244 B2 | 7/2018 | |
| JP | 2018529207 A | 10/2018 | |
| JP | 2019220340 A | 12/2019 | |
| JP | 6682102 B2 | 3/2020 | |
| KR | 20110101891 A | 9/2011 | |
| KR | 20140068850 A | 6/2014 | |
| KR | 20160108938 A | 9/2016 | |
| KR | 20160115912 A | 10/2016 | |
| KR | 20170061206 A | 6/2017 | |
| KR | 20180063144 A | 6/2018 | |
| KR | 20190012064 A | 2/2019 | |
| KR | 20190079988 A | 7/2019 | |
| RU | 2012950 C1 | 5/1994 | |
| TW | 552731 B | 9/2003 | |
| TW | 200421657 A | 10/2004 | |
| WO | 8304381 A1 | 12/1983 | |
| WO | 8402232 A1 | 6/1984 | |
| WO | 8402429 A1 | 6/1984 | |
| WO | 8904067 A1 | 5/1989 | |
| WO | 8904070 A1 | 5/1989 | |
| WO | 8905528 A1 | 6/1989 | |
| WO | 9117581 A1 | 11/1991 | |
| WO | 9120102 A1 | 12/1991 | |
| WO | 9312553 A1 | 6/1993 | |
| WO | 9401896 A1 | 1/1994 | |
| WO | 02069422 A2 | 9/2002 | |
| WO | 03012908 A2 | 2/2003 | |
| WO | 2005004260 A1 | 1/2005 | |
| WO | 2008058165 A2 | 5/2008 | |
| WO | 2010060333 A1 | 6/2010 | |
| WO | 2010065890 A1 | 6/2010 | |
| WO | 2010069209 A1 | 6/2010 | |
| WO | 2011035176 A1 | 3/2011 | |
| WO | 2011044528 A1 | 4/2011 | |
| WO | 2011149624 A1 | 12/2011 | |
| WO | 2011163553 A1 | 12/2011 | |
| WO | 2011012364 A1 | 1/2012 | |
| WO | 2012012558 A2 | 1/2012 | |
| WO | 2012012731 A2 | 1/2012 | |
| WO | 2012023018 A1 | 2/2012 | |
| WO | 2012074622 A1 | 6/2012 | |
| WO | 2012174433 A2 | 12/2012 | |
| WO | 2012174433 A3 | 12/2012 | |
| WO | 2013005050 A1 | 1/2013 | |
| WO | 2013066828 A1 | 5/2013 | |
| WO | 2013177671 A1 | 12/2013 | |
| WO | 2014067982 A1 | 5/2014 | |
| WO | 2014121276 A2 | 8/2014 | |
| WO | 2016123113 A1 | 8/2014 | |
| WO | 2014142666 A1 | 9/2014 | |
| WO | 2014185494 A1 | 11/2014 | |
| WO | 2015026393 A1 | 2/2015 | |
| WO | 2015042573 A1 | 3/2015 | |
| WO | 2015145690 A1 | 10/2015 | |
| WO | 2015150784 A1 | 10/2015 | |
| WO | 2016110862 A1 | 7/2016 | |
| WO | 2016149702 A1 | 9/2016 | |
| WO | 2017006666 A1 | 1/2017 | |
| WO | 2017049414 A1 | 3/2017 | |
| WO | 2017075577 A1 | 5/2017 | |
| WO | 2017117373 A1 | 7/2017 | |
| WO | 2017223219 A1 | 12/2017 | |
| WO | 2018009930 A2 | 1/2018 | |
| WO | 2018018036 A1 | 1/2018 | |
| WO | 2018052376 A1 | 3/2018 | |
| WO | 2018187561 A1 | 10/2018 | |
| WO | 2019045302 A1 | 3/2019 | |
| WO | 2019133702 A1 | 7/2019 | |
| WO | 2020006419 A1 | 1/2020 | |
| WO | 2020006436 A1 | 1/2020 | |
| WO | 2020006506 A1 | 1/2020 | |
| WO | 2020023912 A1 | 1/2020 | |
| WO | 2020264344 A1 | 12/2020 | |
| WO | 2020264415 A1 | 12/2020 | |
| WO | 2021021681 A1 | 2/2021 | |
| WO | 2021021685 A1 | 2/2021 | |
| WO | 2021102016 A1 | 5/2021 | |
| WO | 2021216769 A1 | 10/2021 | |
| WO | 2021236347 A1 | 11/2021 | |
| WO | 2022048931 A1 | 3/2022 | |
| WO | 2022103893 A1 | 5/2022 | |
| WO | 2022155254 A1 | 7/2022 | |
| WO | 2022232465 A1 | 11/2022 | |

OTHER PUBLICATIONS

Gross MM, Manthiram A. Aqueous polysulfide-air battery with a mediator-ion solid electrolyte and a copper sulfide catalyst for polysulfide redox. ACS Applied Energy Materials. Nov. 29, 2018;1(12):7230-6.

Haleem SM, Abd El Aal EE. Electrochemical behaviour of iron in alkaline sulphide solutions. Corrosion engineering, science and technology. Jun. 2008;43(2):173-8.

Hall DE. Ni (OH) 2-Impregnated Anodes for Alkaline Water Electrolysis. Journal of The Electrochemical Society. Feb. 1, 1983;130(2):317.

Hall DE. Porous Nickel-Coated Steel Anodes for Alkaline Water Electrolysis: Corrosion Resistance. Journal of the Electrochemical Society. Feb. 1, 1982;129(2):310.

Han J, Liu W, Zhang T, Xue K, Li W, Jiao F, Qin W. Mechanism study on the sulfidation of ZnO with sulfur and iron oxide at high temperature. Scientific Reports. Feb. 10, 2017;7(1):42536.

(56) References Cited

OTHER PUBLICATIONS

Hang BT, Hayashi H, Yoon SH, Okada S, Yamaki JI. Fe2O3-filled carbon nanotubes as a negative electrode for an Fe-air battery. Journal of Power Sources. Mar. 15, 2008;178(1):393-401.

Hang BT, Thang DH. Effect of additives on the electrochemical properties of Fe2O3/C nanocomposite for Fe/air battery anode. Journal of Electroanalytical Chemistry. Feb. 1, 2016;762:59-65.

Hang BT, Yoon SH, Okada S, Yamaki JI. Effect of metal-sulfide additives on electrochemical properties of nano-sized Fe2O3-loaded carbon for Fe/air battery anodes. Journal of power sources. Jun. 1, 2007;168(2):522-32.

Hariprakash B, Bera P, Martha SK, Gaffoor SA, Hegde MS, Shukla AK. Ceria-supported platinum as hydrogen-oxygen recombinant catalyst for sealed lead-acid batteries. Electrochemical and Solid-State Letters. Jan. 25, 2001;4(3):A23.

Hariprakash B, Martha SK, Hegde MS, Shukla AK. A sealed, starved-electrolyte nickel-iron battery. Journal of Applied Electrochemistry. Jan. 2005;35:27-32.

Hayashi K, Maeda Y, Suzuki T, Sakamoto H, Kugimiya T, Tan WK, Kawamura G, Muto H, Matsuda A. Development of iron-based rechargeable batteries with sintered porous iron electrodes. ECS Transactions. Jan. 10, 2017;75(18):111.

Hayashi K, Wada Y, Maeda Y, Suzuki T, Sakamoto H, Tan WK, Kawamura G, Muto H, Matsuda A. Electrochemical performance of sintered porous negative electrodes fabricated with atomized powders for iron-based alkaline rechargeable batteries. Journal of The Electrochemical Society. Jul. 14, 2017;164(9):A2049.

Hayashi K, Wada Y, Suzuki T, Maeda Y, Sakamoto H, Tan WK, Kawamura G, Muto H, Matsuda A. Performance of Rechargeable Iron Alkaline Batteries with Sulfur-Containing Atomized Powders As Negative Electrodes. InElectrochemical Society Meeting Abstracts 232 Sep. 1, 2017 (No. 1, pp. 53-53). The Electrochemical Society, Inc.

Hoist G. Production of sodium chlorite. Industrial & Engineering Chemistry. Nov. 1950;42(11):2359-71.

Holm TC. The Hidden Cost of Chlorine Dioxide. Buckman Chemistry Connected, Memphis, TN, USA. Accessed Nov. 17, 2023.

International Preliminary Report on Patentability in PCT/US11/41748, mailed Jun. 24, 2011, 11 pages.

International Preliminary Report on Patentability in PCT/US2010/049361, mailed Mar. 29, 2012, 6 pages.

International Preliminary Report on Patentability in PCT/US2011/025016, mailed Aug. 30, 2012, 9 pages.

International Preliminary Report on Patentability in PCT/US2011/051213, mailed Feb. 27, 2013, 6 pages.

International Preliminary Report on Patentability in PCT/US2012/062502, mailed May 14, 2015, 13 pages.

International Preliminary Report on Patentability in PCT/US2016/014936, mailed Aug. 10, 2017, 7 pages.

International Preliminary Report on Patentability in PCT/US2016/023439, mailed May 31, 2017, 21 pages.

International Preliminary Report on Patentability in PCT/US2017/057552, mailed Jun. 12, 2019, 24 pages.

International Preliminary Report on Patentability in PCT/US2019/043745, mailed Feb. 11, 2021, 14 pages.

International Preliminary Report on Patentability in PCT/US2020/031182, mailed Nov. 18, 2021, 6 pages.

International Preliminary Report on Patentability in PCT/US2020/039976, mailed Jan. 6, 2022, 8 pages.

International Preliminary Report on Patentability in PCT/US2020/043630, mailed Feb. 10, 2022, 7 pages.

International Preliminary Report on Patentability in PCT/US2020/043639, mailed Feb. 10, 2022, 8 pages.

International Preliminary Report on Patentability in PCT/US2020/058859, mailed May 19, 2022, 8 pages.

International Preliminary Report on Patentability in PCT/US2021/031182, mailed Nov. 17, 2022, 8 pages.

International Preliminary Report on Patentability in PCT/US2021/058859, mailed May 25, 2023, 7 pages.

International Preliminary Report on Patentability in PCT/US2022/012191, mailed Jul. 4, 2023, 10 pages.

International Preliminary Report on Patentability in PCT/US2022/026844, mailed Nov. 9, 2023, 10 pages.

International Search Report and Written Opinion in PCT/US12/62502, mailed Jan. 24, 2013, 10 pages.

International Search Report and Written Opinion in PCT/US2009/040658, mailed Aug. 24, 2009, 6 pages.

International Search Report and Written Opinion in PCT/US2010/049361, mailed Dec. 29, 2010, 8 pages.

International Search Report and Written Opinion in PCT/US2011/025016, mailed May 26, 2011.

International Search Report and Written Opinion in PCT/US2011/041748, mailed Oct. 5, 2011.

International Search Report and Written Opinion in PCT/US2012/062502, mailed Jan. 24, 2013, 13 pages.

International Search Report and Written Opinion in PCT/US2016/014936, mailed May 12, 2016, 8 pages.

International Search Report and Written Opinion in PCT/US2017/057552, mailed Jan. 18, 2018, 13 pages.

International Search Report and Written Opinion in PCT/US2018/026243, mailed Jul. 27, 2018, 12 pages.

International Search Report and Written Opinion in PCT/US2019/039844, mailed Oct. 23, 2019, 15 pages.

International Search Report and Written Opinion in PCT/US2019/039867, mailed Nov. 15, 2019, 19 pages.

International Search Report and Written Opinion in PCT/US2019/039973, mailed Jan. 13, 2020, 26 pages.

International Search Report and Written Opinion in PCT/US2019/043745, mailed Nov. 13, 2019, 17 pages.

International Search Report and Written Opinion in PCT/US2020/043630, mailed Nov. 11, 2020, 9 pages.

International Search Report and Written Opinion in PCT/US2021/028477, mailed Aug. 4, 2021, 13 pages.

International Search Report and Written Opinion in PCT/US2021/031182, mailed Dec. 31, 2021, 11 pages.

Margarido F, Martins JP, Figueiredo MO, Bastos MH. Kinetics of acid leaching refining of an industrial Fe—Si alloy. Hydrometallurgy. Sep. 1, 1993;34(1):1-1.

Matsuda A, Sakamoto H, Kishimoto T, Hayashi K, Kugimiya T, Muto H. Preparation of hydroxide ion conductive KOH-ZrO2 electrolyte for all-solid state iron/air secondary battery. Solid State Ionics. Sep. 1, 2014;262:188-91.

Maurya S, Shin SH, Kim Y, Moon SH. A review on recent developments of anion exchange membranes for fuel cells and redox flow batteries. Rsc Advances. 2015;5(47):37206-30.

McKerracher RD, Ponce de Leon C, Wills RG, Shah AA, Walsh FC. A review of the iron-air secondary battery for energy storage. ChemPlusChem. Feb. 2015;80(2):323-35.

Merle G, Wessling M, Nijmeijer K. Anion exchange membranes for alkaline fuel cells: A review. Journal of Membrane Science. Jul. 15, 2011;377(1-2):1-35.

Mitra D, Narayanan SR. A stable and electrocatalytic iron electrode for oxygen evolution in alkaline water electrolysis. Topics in Catalysis. Jun. 2018;61:591-600.

Mitra D, Rajan AS, Irshad A, Narayanan SR. High performance iron electrodes with metal sulfide additives. Journal of The Electrochemical Society. Mar. 10, 2021;168(3):030518.

Mitra D, Trinh P, Malkhandi S, Mecklenburg M, Heald SM, Balasubramanian M, Narayanan SR. An efficient and robust surface-modified iron electrode for oxygen evolution in alkaline water electrolysis. Journal of The Electrochemical Society. Apr. 14, 2018;165(5):F392.

Mitra D, Yang C, Manohar AK, Trinh P, Narayanan SR. Highly-Active, Durable and Inexpensive Iron-Based Electrocatalyst for Oxygen Evolution. InElectrochemical Society Meeting Abstracts 230 Sep. 1, 2016 (No. 1, pp. 53-53). The Electrochemical Society, Inc.

Mostafa E, Reinsberg P, Garcia-Segura S, Baltruschat H. Chlorine species evolution during electrochlorination on boron-doped diamond anodes: In-situ electrogeneration of Cl2, Cl2O and ClO2. Electrochimica Acta. Aug. 10, 2018;281:831-40.

(56) References Cited

OTHER PUBLICATIONS

Murcia DC, Fosbøl PL, Thomsen K, Stenby EH. Determination of zinc sulfide solubility to high temperatures. Journal of Solution Chemistry. Oct. 2017;46:1805-17.
Narayan SR, Manohar A, Mukerjee S. Bi-functional oxygen electrodes-challenges and prospects. The Electrochemical Society Interface. 2015;24(2):65.
National Tank. Chlorine dioxide tanks [Internet]. Available from: https://www.ntotank.com/chlorine-dioxide-storage-tanks. Accessed Nov. 1, 20237.
Neburchilov V, Zhang J. Metal-air and metal-sulfur batteries: fundamentals and applications. CRC Press; Sep. 19, 2016.
Notice of Rejection of Japanese Office Action in 2013-520885, mailed May 12, 2015, 8 pages.
Notification Concerning Transmittal of a International Preliminary Report on Patentability and Written Opinion of the International Search Authority for International Patent Application No. PCT/US2018/026243, mailed Oct. 17, 2019, 9 pages.
Notification of Transmittal of the International Search Report and Written Opinion of the International Search Authority for International Patent Application No. PCT/US2020/039889, mailed Oct. 15, 2020, 11 pages.
Notification of Transmittal of the International Search Report and Written Opinion of the International Search Authority for International Patent Application No. PCT/US2020/039942, mailed Oct. 22, 2020, 17 pages.
Notification of Transmittal of the International Search Report and Written Opinion of the International Search Authority for International Patent Application No. PCT/US2020/039976, mailed Oct. 23, 2020, 11 pages.
Notification of Transmittal of the International Search Report and Written Opinion of the International Search Authority for International Patent Application No. PCT/US2020/043630, mailed Nov. 11, 2020, 10 pages.
Notification of Transmittal of the International Search Report and Written Opinion of the International Search Authority for International Patent Application No. PCT/US2020/043639, mailed Nov. 13, 2020, 11 pages.
Office Action in BR112021000258-8, mailed May 2, 2023, 10 pages.
Office Action in CN201110274724.1, mailed Dec. 31, 2014, 7 pages.
Office Action in CN201110274724.1, mailed May 19, 2015, 7 pages.
Office Action in CN201120307185.2, mailed Jan. 13, 2012, 9 pages.
Office Action in CN201780079332.5, with English translation, mailed Dec. 23, 2021, 18 pages.
Office Action in JP2021527026, mailed Aug. 22, 2023, 19 pages.
Office Action in RU2021100085, mailed Jan. 30, 2023, 19 pages.
Office Action in RU2022103201, mailed Nov. 16, 2023, 16 pages.
Öjefors L, Carlsson L. An iron-air vehicle battery. Journal of Power Sources. Feb. 1, 1978;2(3):287-96.
OxyChem. Sodium chlorite chlorine dioxide generators [Internet]. Nov. 2022. Available from: www.oxy.com.
Pan J, Chen C, Li Y, Wang L, Tan L, Li G, Tang X, Xiao L, Lu J, Zhuang L. Constructing ionic highway in alkaline polymer electrolytes. Energy & Environmental Science. 2014;7(1):354-60.
Paruthimalkalaignan G, Muralidharan VS. Iron-Copper electrode for alkaline batteries. Bulletin of electrochemistry. 1996;12(3-4):213-7.
Paulraj AR, Kiros Y, Chamoun M, Svengren H, Noréus D, Göthelid M, Skarman B, Vidarsson H, Johansson MB. Electrochemical Performance and in Operando Charge Efficiency Measurements of Cu/Sn-Doped Nano Iron Electrodes. Batteries. Dec. 21, 2018;5(1):1.
Paulraj AR, Kiros Y, Skårman B, Vidarsson H. Core/shell structure nano-iron/iron carbide electrodes for rechargeable alkaline iron batteries. Journal of The Electrochemical Society. Jun. 2, 2017;164(7):A1665.
Paulraj AR, Kiros Y, Skårman B, Vidarsson H. Electrochemical Study of Nano-Iron/Iron Carbide As Rechargeable Electrodes. InElectrochemical Society Meeting Abstracts 230 Sep. 1, 2016 (No. 1, pp. 96-96). The Electrochemical Society, Inc.
Periasamy P, Babu BR, Iyer SV. Cyclic voltammetric studies of porous iron electrodes in alkaline solutions used for alkaline batteries. Journal of power sources. Jan. 1, 1996;58(1):35-40.
Perkins NR, Weber E, Hultman BT, McKay IS, Milshtein JD, Su L, Liotta A, Newhouse JM, Woodford WH, Thompson AC, Smith DC, inventors. Hydrogen oxidation electrodes and electrochemical cells including the same. U.S. Appl. No. 16/951,396, filed May 20, 2021.
Poquillon D, Lemaitre J, Baco-Carles V, Tailhades P, Lacaze J. Cold compaction of iron powders—relations between powder morphology and mechanical properties: Part I: Powder preparation and compaction. Powder Technology. Jun. 27, 2002;126(1):65-74.
Posada JO, Hall PJ. Post-hoc comparisons among iron electrode formulations based on bismuth, bismuth sulphide, iron sulphide, and potassium sulphide under strong alkaline conditions. Journal of Power Sources. Dec. 5, 2014;268:810-5.
Pureline. Pureline chlorine dioxide generators [Internet]. Available from: https://www.pureline.com/equipment/?matchtype=e&network=g&device=c&keyword=chlorine. Accessed Nov. 17, 2023.
Rajan AS, Ravikumar MK, Priolkar KR, Sampath S, Shukla AK. Carbonyl-iron electrodes for rechargeable-iron batteries. Electrochemistry Energy Technology. Dec. 16, 2014;1:2-9.
Rajan AS, Sampath S, Shukla AK. An in situ carbon-grafted alkaline iron electrode for iron-based accumulators. Energy & Environmental Science. 2014;7(3):1110-6.
Ravikumar MK, Rajan AS, Sampath S, Priolkar KR, Shukla AK. In situ crystallographic probing on ameliorating effect of sulfide additives and carbon grafting in iron electrodes. Journal of The Electrochemical Society. Sep. 17, 2015;162(12):A2339.
Reardon EJ. Zerovalent irons: Styles of corrosion and inorganic control on hydrogen pressure buildup. Environmental science & technology. Sep. 15, 2005;39(18):7311-7.
Reinders LA. Selective Separation of Heavy Metals in Aqueous Systems by Sulfide Precipation: A Theoretical Equilibrium Model.
Rickard D, Luther GW. Chemistry of iron sulfides. Chemical reviews. Feb. 14, 2007;107(2):514-62.
Roe S, Menictas C, Skyllas-Kazacos M. A high energy density vanadium redox flow battery with 3 M vanadium electrolyte. Journal of The Electrochemical Society. Jul. 23, 2015;163(1):A5023.
Rosenblum P. Solubility in the potassium stannate-potassium hydroxide-water system at 0 to 95.0° C. Canadian Journal of Chemistry. Aug. 15, 1968;46(16):2715-9.
Salloum KS, Hayes JR, Friesen CA, Posner JD. Sequential flow membraneless microfluidic fuel cell with porous electrodes. Journal of Power Sources. May 15, 2008;180(1):243-52.
International Search Report and Written Opinion in PCT/US2021/058859, mailed Mar. 8, 2022, 10 pages.
International Search Report and Written Opinion in PCT/US2022/012191, mailed May 4, 2022, 13 pages.
International Search Report and Written Opinion in PCT/US2022/026844, mailed Sep. 21, 2022, 15 pages.
International Search Report and Written Opinion in PCT/US2022/047916, mailed Feb. 27, 2023, 11 pages.
International Search Report and Written Opinion in PCT/US2022/048092, mailed Feb. 27, 2023, 12 pages.
International Search Report and Written Opinion in PCT/US2023/011769, mailed Jun. 8, 2023, 14 pages.
International Search Report and Written Opinion in PCT/US2023/012448, mailed Jun. 21, 2023, 12 pages.
International Search Report and Written Opinion in PCT/US2023/018696, mailed Aug. 11, 2023, 8 pages.
International Search Report and Written Opinion of the International Application No. PCT/US2020/043639, mailed Nov. 13, 2020, 11 pages.
International Search Report in PCT/US2016/023439, mailed Aug. 31, 2016, 6 pages.
International Search Report in PCT/US2018/067662, mailed Mar. 18, 2019, 3 pages.
International Search Report in PCT/US2023/019847, mailed Aug. 31, 2023, 9 pages.

(56) References Cited

OTHER PUBLICATIONS

Isostatic Pressing Association "Advantages," Retrieved from the Internet: URL: http://ipa-web.org/advantages.html, Dec. 22, 2019, 4 pages.

Jackovitz JF, Bayles GA, Brodd RJ. Iron electrode batteries. Handbook of Batteries; Linden, D., Reddy, TB, Eds. 2002:720-46.

Janot R, Guérard D. Ball-milling in liquid media: Applications to the preparation of anodic materials for lithium-ion batteries. Progress in Materials Science. Jan. 1, 2005;50(1):1-92.

Jayalakshmi M, Muralidharan VS. Passivation of iron in alkaline carbonate solutions. Journal of power sources. Jul. 1, 1991;35(2):131-42.

Jayashree RS, Gancs L, Choban ER, Primak A, Natarajan D, Markoski LJ, Kenis PJ. Air-breathing laminar flow-based microfluidic fuel cell. Journal of the American Chemical Society. Dec. 7, 2005;127(48):16758-9.

Ji X, Evers S, Black R, Nazar LF. Stabilizing lithium-sulphur cathodes using polysulphide reservoirs. Nature communications. May 24, 2011;2(1):325.

Jin X, Zhao X, Huang K. A high-fidelity multiphysics model for the new solid oxide iron-air redox battery: part I: Bridging mass transport and charge transfer with redox cycle kinetics. Journal of Power Sources. Apr. 15, 2015;280:195-204.

Jinnai M, Shimamura C, Kuntolaksono S, Tokoyo Y, Sato S, Matsuura H. Electrochemical Properties of Chlorine Dioxide Using Aminated Glassy Carbon Electrodes Fabricated by Electrolysis. Electrochemistry. Sep. 5, 2020;88(5):347-9.

Jolly M. 1.18—Castings. In: Milne I, Ritchie RO, Karihaloo B, editors. Comprehensive Structural Integrity. Pergamon; 2003. p. 377-466.

Jorne J, Lii YJ, Yee KE. Suppression of dendrites and roughness during electrodeposition by impinging flow. Journal of the Electrochemical Society. Jun. 1, 1987;134(6):1399.

Jozwiak WK, Kaczmarek E, Maniecki TP, Ignaczak W, Maniukiewicz W. Reduction behavior of iron oxides in hydrogen and carbon monoxide atmospheres. Applied Catalysis A: General. Jun. 30, 2007;326(1):17-27.

Kadyk T, Bruce D, Eikerling M. How to enhance gas removal from porous electrodes?. Scientific reports. Dec. 23, 2016;6(1):38780.

Kao CY, Chou KS. Iron/carbon-black composite nanoparticles as an iron electrode material in a paste type rechargeable alkaline battery. Journal of Power Sources. Apr. 15, 2010;195(8):2399-404.

Kao CY, Tsai YR, Chou KS. Synthesis and characterization of the iron/copper composite as an electrode material for the rechargeable alkaline battery. Journal of Power Sources. Jul. 1, 2011;196(13):5746-50.

Kitamura H, Zhao L, Hang BT, Okada S, Yamaki JI. Effect of charge current density on electrochemical performance of Fe/C electrodes in alkaline solutions. Journal of the Electrochemical Society. Apr. 2, 2012;159(6):A720.

Klaus S, Cai Y, Louie MW, Trotochaud L, Bell AT. Effects of Fe electrolyte impurities on Ni (OH) 2/NiOOH structure and oxygen evolution activity. The Journal of Physical Chemistry C. Apr. 2, 2015;119(13):7243-54.

Kumar H, Shukla AK. Fabrication Fe/Fe3O4/graphene nanocomposite electrode material for rechargeable Ni/Fe batteries in hybrid electric vehicles. International Letters of Chemistry, Physics and Astronomy. 2013;14.

Lee TS. Hydrogen overpotential on pure metals in alkaline solution. Journal of The Electrochemical Society. Aug. 1, 1971;118(8):1278.

Lenntech. Disinfectants: chlorine dioxide [Internet]. Available from: https://www.lenntech.com/processes/disinfection/chemical/disinfectants-chlorine-dioxide.htm. Accessed Nov. 17, 2023.

Li Z, Pan MS, Su L, Tsai PC, Badel AF, Valle JM, Eiler SL, Xiang K, Brushett FR, Chiang YM. Air-breathing aqueous sulfur flow battery for ultralow-cost long-duration electrical storage. Joule. Oct. 11, 2017;1(2):306-27.

Li Z, Weng G, Zou Q, Cong G, Lu YC. A high-energy and low-cost polysulfide/iodide redox flow battery. Nano Energy. Dec. 1, 2016;30:283-92.

Licht S. A novel aqueous aluminum| permanganate fuel cell. Electrochemistry communications. Jan. 1, 1999;1(1):33-6.

Licht S. Aqueous solubilities, solubility products and standard oxidation-reduction potentials of the metal sulfides. Journal of the Electrochemical Society. Dec. 1, 1988;135(12):2971.

Lin M, Lei S, Pei Z, Liu Y, Xia Z, Xie F. Application of hydrometallurgy techniques in quartz processing and purification: a review. Metallurgical Research & Technology. 2018;115(3):303.

Liu J, Chen M, Zhang L, Jiang J, Yan J, Huang Y, Lin J, Fan HJ, Shen ZX. A flexible alkaline rechargeable Ni/Fe battery based on graphene foam/carbon nanotubes hybrid film. Nano letters. Dec. 10, 2014;14(12):7180-7.

Liu W, Zhu L, Han J, Jiao F, Qin W. Sulfidation mechanism of ZnO roasted with pyrite. Scientific reports. Jun. 22, 2018;8(1):9516.

Luk S. Surface area, density, and porosity of powders.

Mabbett I, Marinaccio J, Glover C, Barnes A, Subramanian R, Williams G, Worsley DA. Rapid Processing and Scanning Electrochemical Techniques Applied to Sintered Nickel Electrodes of Varying Thickness and Rate Capability. ECS Transactions. Feb. 10, 2015;64(18):1.

Machine translation of CN110957481A, 2020, 7 pages.

Machine translation of WO2014185494A1, 2014, 20 pages.

Mainar A, Leonet O, Bengoechea M, Boyano I, de Meatza I, Kvasha A, Guerfi A, Alberto Blazquez J. Alkaline aqueous electrolytes for secondary zinc-air batteries: an overview. International Journal of Energy Research. Jun. 25, 2016;40(8):1032-49.

Malkhandi S, Yang B, Manohar AK, Prakash GS, Narayanan SR. Organo-Sulfur Additives for Suppressing Hydrogen Evolution in Iron-air Battery. InECS Meeting Abstracts Aug. 1, 2011 (No. 13, p. 688). IOP Publishing.

Malkhandi S, Yang B, Manohar AK, Prakash GS, Narayanan SR. Self-assembled monolayers of n-alkanethiols suppress hydrogen evolution and increase the efficiency of rechargeable iron battery electrodes. Journal of the American Chemical Society. Jan. 9, 2013;135(1):347-53.

Manohar AK, Malkhandi S, Yang B, Yang C, Prakash GS, Narayanan SR. A high-performance rechargeable iron electrode for large-scale battery-based energy storage. Journal of the Electrochemical Society. Jul. 20, 2012;159(8):A1209.

Manohar AK, Yang C, Malkhandi S, Prakash GS, Narayanan SR. Enhancing the performance of the rechargeable iron electrode in alkaline batteries with bismuth oxide and iron sulfide additives. Journal of the Electrochemical Society. Oct. 1, 2013;160(11):A2078.

Manohar AK, Yang C, Malkhandi S, Yang B, Prakash GS, Narayanan SR. Mechanism of Formation of Carbonyl Iron Electrodes in Alkaline Batteries. InECS Meeting Abstracts Jun. 4, 2012 (No. 5, p. 371). IOP Publishing.

Manohar AK, Yang C, Malkhandi S, Yang B, Prakash GS, Narayanan SR. Understanding the factors affecting the formation of carbonyl iron electrodes in rechargeable alkaline iron batteries. Journal of the Electrochemical Society. Oct. 25, 2012;159(12):A2148.

Manohar AK, Yang C, Narayanan SR. The role of sulfide additives in achieving long cycle life rechargeable iron electrodes in alkaline batteries. Journal of The Electrochemical Society. Jun. 30, 2015;162(9):A1864.

Sayilgan E, Kukrer T, Civelekoglu GÖ, Ferella F, Akcil A, Veglio FR, Kitis M. A review of technologies for the recovery of metals from spent alkaline and zinc-carbon batteries. Hydrometallurgy. Jul. 1, 2009;97(3-4):158-66.

Scotmas. Bravo MX. Available from: https://www.scotmas.com/solutions/bravo-mx-generator/. Accessed Nov. 17, 2023.

Scotmas. Bravo Ultra-Pure. Available from: https://www.scotmas.com/solutions/bravo-ultrapure-generator/. Accessed Nov. 17, 2023.

Scotmas. CIDOX+ Chlorine Dioxide Tablets, High Level Sporicidal Cleaning and Disinfection. Available from: https://www.scotmas.com. Accessed Nov. 17, 2023.

Scotmas. Delta WA—Industrial and Potable Water Treatment with ClO2. Available from: https://www.scotmas.com. Accessed Nov. 17, 2023.

Scotmas. Disinfect Water and Water Distribution Systems Quickly and Simply. Available from: https://www.scotmas.com. Accessed Nov. 17, 2023.

(56) References Cited

OTHER PUBLICATIONS

Sen RK, Van Voorhees SL, Ferrel T. Metal-air battery assessment. Pacific Northwest National Lab.(PNNL), Richland, WA (United States); May 1, 1988.

Serebrennikova I, Paramasivam I, Roy P, Wei W, Virtanen S, Schmuki P. Steel corrosion in alkaline batteries. Electrochimica acta. Sep. 1, 2009;54(22):5216-22.

Sevinc S, Tekin B, Ata A, Morcrette M, Perrot H, Sel O, Demir-Cakan R. In-situ tracking of NaFePO4 formation in aqueous electrolytes and its electrochemical performances in Na-ion/polysulfide batteries. Journal of Power Sources. Feb. 1, 2019;412:55-62.

Shanmugam N, Cholan S, Kannadasan N, Sathishkumar K, Viruthagiri G. Effect of annealing on the ZnS nanocrystals prepared by chemical precipitation method. Journal of Nanomaterials. 2013;2013(1):351798.

Shukla AK, Venugopalan S, Hariprakash B. Nickel-based rechargeable batteries. Journal of power sources. Nov. 30, 2001;100(1-2):125-48.

Singh RN, Singh JP, Singh A, Anindita M, Savita Y, Sinha AS, et al. Iron molybdales as electrocatalysts for O2 evolution reaction in alkaline solutions. Int J Hydrogen Energy. 2009;34(11):4693-700.

Smedley SI, Zhang XG. A regenerative zinc-air fuel cell. Journal of power sources. Mar. 20, 2007;165(2):897-904.

Smith RD, Prévot MS, Fagan RD, Trudel S, Berlinguette CP. Water oxidation catalysis: electrocatalytic response to metal stoichiometry in amorphous metal oxide films containing iron, cobalt, and nickel. Journal of the American Chemical Society. Aug. 7, 2013;135(31):11580-6.

Su D, Kretschmer K, Wang G. Improved electrochemical performance of Na-ion batteries in ether-based electrolytes: a case study of ZnS nanospheres. Advanced Energy Materials. Jan. 2016;6(2):1501785.

Tekin B, Sevinc S, Morcrette M, Demir-Cakan R. A new sodium-based aqueous rechargeable battery system: the special case of Na0.44MnO2/dissolved sodium polysulfide. Energy Technology. Dec. 2017;5(12):2182-8.

Thirsk J. Electrochemistry. In: Thirsk J, ed. Electrochemistry. vol 4. Oxford: The Chemical Society, Alden Press; 1974. p. 16.

Thompson AC, Gibson MA, Woodford WH, Eisenach RM, Newhouse JM, Perkins NR, Taylor OC, Schroder KW, Thomas-alyea K, inventors; Form Energy Inc, assignee. Electrolyte formulations and additives for iron anode electrochemical systems. U.S. Appl. No. 17/661,256, filed Nov. 17, 2022.

Tian B, Światowska J, Maurice V, Zanna S, Seyeux A, Marcus P. The effect of Na2S additive in alkaline electrolyte on improved performances of Fe-based air batteries. Electrochimica Acta. Jan. 1, 2018;259:196-203.

Trocino S, Faro ML, Zignani SC, Antonucci V, Aricò AS. High performance solid-state iron-air rechargeable ceramic battery operating at intermediate temperatures (500-650° C.). Applied energy. Jan. 1, 2019;233:386-94.

Valin. Chlorine Dioxide Generator. Available from: https://www.valin.com/print/1855. Accessed Nov. 17, 2023.

Vega MF, Díaz-Faes E, Barriocanal C. Influence of the heating rate on the quality of metallurgical coke. ACS omega. Dec. 10, 2021;6(50):34615-23.

Veselov SV, Kuzmin RI, Cherkasova NY, Felofyanova AV. The Capability of Multilayer Cermet Coating Fabrication on Steel with Electrophoretic Deposition. ECS Transactions. Jan. 23, 2018;82(1):67.

Vijayamohanan K, Balasubramanian TS, Shukla AK. Rechargeable alkaline iron electrodes. Journal of power sources. Apr. 1, 1991;34(3):269-85.

Vijayamohanan K, Shukla AK, Sathyanarayana S. Formation mechanism of porous alkaline iron electrodes. Journal of power sources. Oct. 1, 1990;32(4):329-39.

Walchem. Chlorine Dioxide Generator. Available from: https://www.walchem.com/about-iwakiamerica/. Accessed Nov. 17, 2023.

Wang HF, Xu Q. Materials design for rechargeable metal-air batteries. Matter. Sep. 4, 2019;1(3):565-95.

Wang M, Zhang Q, Hao W, Sun ZX. Surface stoichiometry of zinc sulfide and its effect on the adsorption behaviors of xanthate. Chemistry Central Journal. Dec. 2011;5:1-0.

WatertechUSA. Dioxide Pacific Chlorine Dioxide Generators. Available from: https://www.watertechusa.com/dioxide-pacific-chlorine-dioxiode-generator. Accessed Nov. 17, 2023.

Wei X, Xia GG, Kirby B, Thomsen E, Li B, Nie Z, Graff GG, Liu J, Sprenkle V, Wang W. An aqueous redox flow battery based on neutral alkali metal ferri/ferrocyanide and polysulfide electrolytes. Journal of the Electrochemical Society. Nov. 13, 2015;163(1):A5150.

Weinrich H, Come J, Tempel H, Kungl H, Eichel RA, Balke N. Understanding the nanoscale redox-behavior of iron-anodes for rechargeable iron-air batteries. Nano Energy. Nov. 1, 2017;41:706-16.

Weinrich H, Gehring M, Tempel H, Kungl H, Eichel RA. Electrode thickness-dependent formation of porous iron electrodes for secondary alkaline iron-air batteries. Electrochimica acta. Aug. 10, 2019;314:61-71.

Wen Z, Shen C, Lu Y. Air electrode for the lithium-air batteries: Materials and structure designs. ChemPlusChem. Feb. 2015;80(2):270-87.

Wilke SK, Dunand DC. Structural evolution of directionally freeze-cast iron foams during oxidation/reduction cycles. Acta Materialia. Jan. 1, 2019;162:90-102.

Written Opinion in PCT/US2016/023439, mailed Aug. 31, 2016, 14 pages.

Xylem + Evoqua. Millennium III Chlorine Dioxide Generators. Available from: https://www.evoqua.com/en/evoqua/products--services/disinfection-systems/chlorine-dioxide-generation-systems/millennium-iii-chlorine-dioxide-gener. Accessed Nov. 17, 2023.

Yang B, Malkhandi S, Manohar AK, Prakash GS, Narayanan SR. Organo-sulfur molecules enable iron-based battery electrodes to meet the challenges of large-scale electrical energy storage. Energy & Environmental Science. 2014;7(8):2753-63.

Yang C, Manohar AK, Narayanan SR. A high-performance sintered iron electrode for rechargeable alkaline batteries to enable large-scale energy storage. Journal of The Electrochemical Society. Jan. 7, 2017;164(2):A418.

Yang C, Manohar AK, Prakash GS, Narayanan SR. Performance of Rechargeable Sintered Iron Electrodes for Large-Scale Energy Storage. InElectrochemical Society Meeting Abstracts 227 Apr. 29, 2015 (No. 3, pp. 673-673). The Electrochemical Society, Inc.

Yao C, Anderson JL. Retention characteristics of organic compounds on molten salt and ionic liquid-based gas chromatography stationary phases. Journal of Chromatography A. Mar. 6, 2009;1216(10):1658-712.

You S, Zhao Q, Zhang J, Jiang J, Zhao S. A microbial fuel cell using permanganate as the cathodic electron acceptor. Journal of power sources. Nov. 22, 2006;162(2):1409-15.

Yu X, Manthiram A. A voltage-enhanced, low-cost aqueous iron-air battery enabled with a mediator-ion solid electrolyte. ACS Energy Letters. May 12, 2017;2(5):1050-5.

Yun S, Park SH, Yeon JS, Park J, Jana M, Suk J, Park HS. Materials and device constructions for aqueous lithium-sulfur batteries. Advanced Functional Materials. Sep. 2018;28(38):1707593.

Zhang L, Zhou L, Wu HB, Xu R, Lou XW. Unusual formation of single-crystal manganese sulfide microboxes co-mediated by the cubic crystal structure and shape. Angewandte Chemie (International ed. in English). Jun. 8, 2012;51(29):7267-70.

Zieliński J, Zglinicka I, Znak L, Kaszkur Z. Reduction of Fe2O3 with hydrogen. Applied Catalysis A: General. Jun. 15, 2010;381(1-2):191-6.

Ai W, Xie L, Du Z, Zeng Z, Liu J, Zhang H, Huang Y, Huang W, Yu T. A novel graphene-polysulfide anode material for high-performance lithium-ion batteries. Scientific Reports. Aug. 1, 2013;3(1):2341.

Al-Hoshan MS, Singh JP, Al-Mayouf AM, Al-Suhybani AA, Shaddad MN. Synthesis, physicochemical and electrochemical properties of nickel ferrite spinels obtained by hydrothermal method for the oxygen evolution reaction (OER). International Journal of Electrochemical Science. Jan. 1, 2012;7(6):4959-73.

(56) References Cited

OTHER PUBLICATIONS

Andreas V., "Iron-Carbon Phase Diagram Explained," Oct. 3, 2020, 9 pages, Retrieved from the Internet: URL: https://fractory.com/iron-carbon-phase-diagram/.
Anh TT, Thang DH, Hang BT. The influence of carbon additive on the electrochemical behaviors of Fe2O3/C electrodes in alkaline solution. Vietnam Journal of Science and Technology. Jan. 30, 2018;56(1):24-30.
Argonne National Laboratory—Design and Cost Study of a Nickel-Iron Oxide Battery for electric vehicles, vol. II, Public Report, Final Report Contract No. 31-109-38-3723, (1977), 76 pages.
Argonne National Laboratory—Development of Near-Term Batteries for Electric Vehicles, Summary Report Oct. 1977-Sep. 1979, 100 pages.
Arunchander A, Peera SG, Sahu AK. Synthesis of flower-like molybdenum sulfide/graphene hybrid as an efficient oxygen reduction electrocatalyst for anion exchange membrane fuel cells. Journal of Power Sources. Jun. 15, 2017;353:104-14.
Bandal H, Reddy KK, Chaugule A, Kim H. Iron-based heterogeneous catalysts for oxygen evolution reaction; change in perspective from activity promoter to active catalyst. Journal of Power Sources. Aug. 15, 2018;395:106-27.
Baratin F. An investigation of the Cu—Fe—S—$H_2O$ system at 200° C. (Doctoral dissertation, University of British Columbia).
Bhadeshia HK. Cementite. International Materials Reviews. Jan. 2, 2020;65(1):1-27.
Bisoi S, Mandal AK, Singh A, Banerjee S. Gas separation properties of Troeger's base-bridged polyamides. e-Polymers. Jun. 27, 2017;17(4):283-93.
Blurton KF, Sammells AF. Metal/air batteries: their status and potential-a review. Journal of Power Sources. Jan. 1, 1979;4(4):263-79.
Burke MS, Enman LJ, Batchellor AS, Zou S, Boettcher SW. Oxygen evolution reaction electrocatalysis on transition metal oxides and (oxy) hydroxides: activity trends and design principles. Chemistry of Materials. Nov. 24, 2015;27(22):7549-58.
Burke MS, Kast MG, Trotochaud L, Smith AM, Boettcher SW. Cobalt-iron (oxy) hydroxide oxygen evolution electrocatalysts: the role of structure and composition on activity, stability, and mechanism. Journal of the American Chemical Society. Mar. 18, 2015;137(10):3638-48.
Carta M, Malpass-Evans R, Croad M, Rogan Y, Lee M, Rose I, McKeown NB. The synthesis of microporous polymers using Tröger's base formation. Polymer Chemistry. 2014;5(18):5267-72.
Černý J, Micka K. Voltammetric study of an iron electrode in alkaline electrolytes. Journal of Power Sources. Feb. 1, 1989;25(2):111-22.
Chamoun M, Skårman B, Vidarsson H, Smith RI, Hull S, Lelis M, Milcius D, Noréus D. Stannate increases hydrogen evolution overpotential on rechargeable alkaline iron electrodes. Journal of The Electrochemical Society. Apr. 14, 2017;164(6):A1251.
Chen Y, Li Z, Li X, Zeng D, Xu G, Zhang Y, Sun Y, Ke H, Cheng H. Harvesting polysulfides by sealing the sulfur electrode in a composite ion-selective net. Journal of Power Sources. Nov. 15, 2017;368:38-45.
Cherepy NJ, Kruegar R, Cooper JF. A zinc/air fuel cell for electric vehicles. InFourteenth Annual Battery Conference on Applications and Advances. Proceedings of the Conference (Cat. No. 99TH8371) Jan. 12, 1999 (pp. 11-13). IEEE.
Chiang MK, Su L, Raman K, Chiang YM, Woodford WH. Reversible Chlorite Anion/Chlorine Dioxide Redox Couple for Low-Cost Energy Storage. The Journal of Physical Chemistry C. Feb. 16, 2023;127(8):3921-7.
Chiang YM, Sadoway DR, Jang YI, Huang B, Wang H. High Capacity, Temperature-Stable Lithium Aluminum Manganese Oxide Cathodes for Rechargeable Batteries. Electrochemical and solid-state letters. Jan. 11, 1998;2(3):107.
Chladil L, Novak V, But C. Influence of Zinc Ions on Properties of Non-Sintered Ni (OH) 2 Electrodes. Meet, Abstract. Oct. 27, 2013;338:2013-338.

Clever HL, Derrick ME, Johnson SA. The solubility of some sparingly soluble salts of zinc and cadmium in water and in aqueous electrolyte solutions. Journal of physical and chemical reference data. Sep. 1, 1992;21(5):941-1004.
Cohen JL, Westly DA, Pechenik A, Abruña HD. Fabrication and preliminary testing of a planar membraneless microchannel fuel cell. Journal of Power Sources. Jan. 4, 2005;139(1-2):96-105.
Colli AN, Peljo P, Girault HH. High energy density MnO 4-/MnO 4 2—redox couple for alkaline redox flow batteries. Chemical Communications. 2016;52(97):14039-42.
Corrigan DA. The catalysis of the oxygen evolution reaction by iron impurities in thin film nickel oxide electrodes. Journal of The Electrochemical Society. Feb. 1, 1987;134(2):377.
Cui B, Xin H, Liu S, Liu X, Hao Y, Guo Q, Licht S. Improved cycle iron molten air battery performance using a robust fin air electrode. Journal of The Electrochemical Society. Dec. 8, 2016;164(2):A88.
Daskalakis KD. The solubility of sphalerite (ZnS) in sulfidic solutions at 25 C and 1 atm pressure. Geochimica et cosmochimica acta. Oct. 1, 1993;57(20):4923-31.
De Nora, "On-Site High-Strength Sodium Hypochlorite Generator, CECHLO—MS," https://www.denora.com/ourbrands/cechlo/CECHLO-ms.html viewed on Nov. 17, 2023.
Demir-Cakan R, Morcrette M, Leriche JB, Tarascon JM. An aqueous electrolyte rechargeable Li-ion/polysulfide battery. Journal of Materials Chemistry A. 2014;2(24):9025-9.
Demir-Cakan R, Morcrette M, Tarascon JM. Use of ion-selective polymer membranes for an aqueous electrolyte rechargeable Li-ion-polysulphide battery. Journal of Materials Chemistry A. 2015;3(6):2869-75.
Dioxide, "Chlorine Dioxide Generation and Dosing Systems, chemical and e-chem," https://www.dioxide.com/systems/chlorine-dioxide/ viewed on Nov. 17, 2023.
Dioxide, "Dioxide Pacific—Electrochemical Chlorine Dioxide Generators," https://www.dioxide.com/products/chlorinedioxide/ viewed on Nov. 17, 2023.
E Gorji N. Recyclability of stainless steel (316 L) powder within the additive manufacturing process. Instituto de Ingeniería y Tecnología. Dec. 12, 2019.
Edison Manual of Storage Battery Practice (© 1914).
Egashira M. Secondary Batteries—Metal-Air Systems | Iron-Air (Secondary and Primary). In: Encyclopedia of Electrochemical Power Sources. Elsevier; 2009. doi:10.1016/B978-044452745-5.00102-7.
Extended European Search Report for EP12845396.6, mailed Jun. 8, 2016, 8 pages.
Extended European Search Report for EP17861315.4, mailed Jun. 17, 2020, 8 pages.
Extended European Search Report for EP18176436.6, mailed Sep. 28, 2018, 16 pages.
Extended European Search Report for EP18189034.4, mailed Oct. 12, 2018, 8 pages.
Extended European Search Report for EP19839894.3, mailed May 10, 2022, 7 pages.
Extended European Search Report for EP20196772.6, mailed Jan. 22, 2021, 6 pages.
Ferreira AS, Mansur MB. Statistical analysis of the spray roasting operation for the production of high quality Fe2O3 from steel pickling liquors. Process Safety and Environmental Protection. May 1, 2011;89(3):172-8.
Ferreira SK, Baca WE, Avedikian K. Selected Test Results from the Encell Technology Nickel Iron Battery. Sandia National Lab.(SNL-NM), Albuquerque, NM (United States); Sep. 1, 2014.
Ferrigno R, Stroock AD, Clark TD, Mayer M, Whitesides GM. Membraneless vanadium redox fuel cell using laminar flow. Journal of the American Chemical Society. Nov. 6, 2002;124(44):12930-1.
Figueredo-Rodríguez HA, McKerracher RD, Insausti M, Luis AG, de León CP, Alegre C, Baglio V, Aricò AS, Walsh FC. A rechargeable, aqueous iron air battery with nanostructured electrodes capable of high energy density operation. Journal of The Electrochemical Society. Mar. 31, 2017;164(6):A1148.
First Examination Report in IN201617013657, mailed Aug. 27, 2019, 6 pages.

(56) References Cited

OTHER PUBLICATIONS

First Examination Report in IN202117008130, mailed Aug. 4, 2022, 7 pages.
First Examination Report in SA522431488, mailed Jun. 13, 2023, 14 pages.
First Examination Report in SA522440999, mailed Sep. 28, 2023, 14 pages.
Extended European Search Report in EP20833221.3, mailed Sep. 16, 2024, 5 pages.
Final Office Action in U.S. Appl. No. 17/523,389, mailed Sep. 16, 2024, 19 pages.
International Preliminary Report on Patentability in PCT/US2023/012448, mailed Aug. 22, 2024, 8 pages.
International Search Report and Written Opinion in PCT/US2023/075744, mailed Jan. 22, 2024, 9 pages.
International Search Report and Written Opinion in PCT/US2024/014834, mailed Jun. 18, 2024, 13 pages.
International Search Report and Written Opinion in PCT/US2024/036765, mailed Oct. 7, 2024, 13 pages.
Office Action and Search Report in CN202080048577, mailed May 17, 2024, 21 pages.
Office Action for Brazilian Application No. BR112021000258-8, Dated May 2, 2023, 10 Pages, including English-language translation.
Office Action in CN202080048577.3, mailed Jan. 14, 2025, 15 pages.
Office Action in KR1020217006361, mailed Sep. 10, 2024, 9 pages.
Office Action in SA524452116, mailed Jan. 4, 2025, 9 pages.
Office Action in U.S. Appl. No. 16/913,958, mailed Jun. 10, 2024, 12 pages.
Wang YJ, Fan H, Ignaszak A, Zhang L, Shao S, Wilkinson DP, Zhang J. Compositing doped-carbon with metals, non-metals, metal oxides, metal nitrides and other materials to form bifunctional electrocatalysts to enhance metal-air battery oxygen reduction and evolution reactions. Chemical Engineering Journal. Sep. 15, 2018;348:416-37.
Janot R., et al.. "Ball-milling in Liquid Media: Applications to the Preparation of Anodic Materials for Lithium-ion Batteries," Progress in Materials Science, vol. 50.1, 2005, pp. 1-92.
Margarido F., et al., "Kinetics of Acid Leaching Refining of an Industrial Fe—Si Alloy," Hydrometallurgy, 1993, vol. 34, pp. 1-11.
Bhadeshia H. K. D. H, "Cementite," International Materials Reviews, vol. 65.1, 2020), pp. 1-27.
Gorji N. E., et al., "Recyclability of Stainless Steel (316 L) Powder Within the Additive Manufacturing Process," Materialia, vol. 8, 2019, 100489, 9 pages.
Mitra, D. et al., "High Performance Iron Electrodes with Metal Sulfide Additives," Journal of The Electrochemical Society, Mar. 10, 2021;168(3):030518. 10 pages.
IPA—Isostatic Pressing Association "Advantages," Retrieved from the Internet: URL: http://ipa-web.org/advantages.html, Dec. 22, 2019, 4 pages.
USPTO Office Communication, Non-Final Office Action for U.S. Appl. No. 18/160,480, mailed Jan. 24, 2025, 19 pages.

* cited by examiner

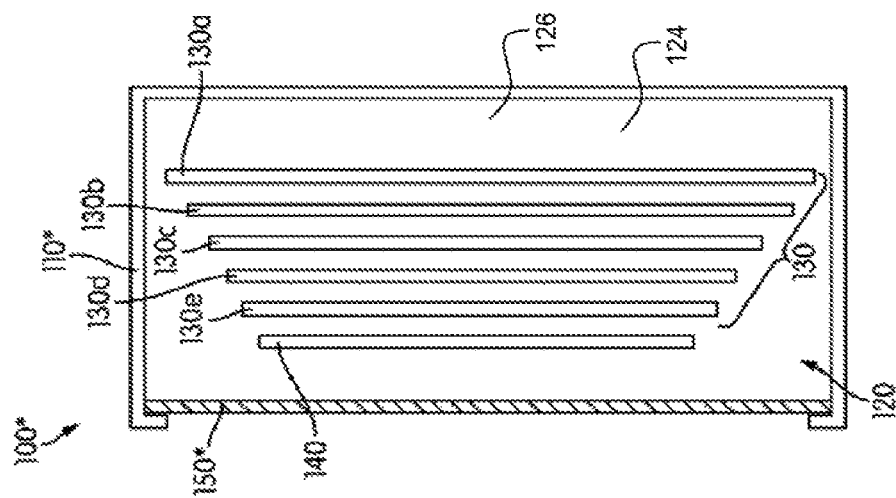
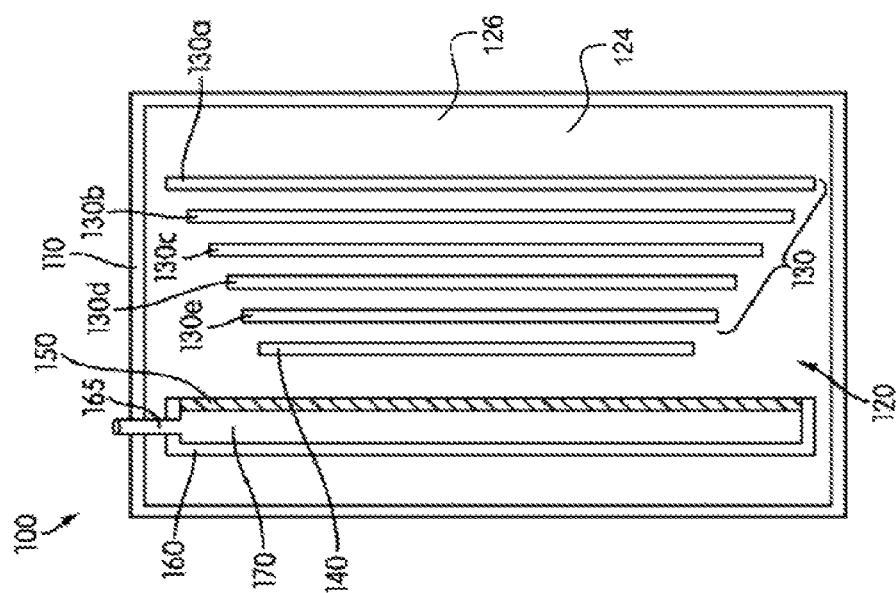

PRIOR ART

CORRUGATED FUEL ELECTRODE

CROSS REFERENCE TO RELATED APPLICATIONS

This application is a continuation of, and claims priority to, pending U.S. patent application Ser. No. 17/663,318, filed May 13, 2022, and to U.S. patent application Ser. No. 16/343,158, filed Apr. 18, 2019 (issued as U.S. Pat. No. 11,335,918), which is a national stage entry of PCT/US2017/057552 filed Oct. 20, 2017, which claims priority to U.S. Provisional Patent Application No. 62/410,852, filed on Oct. 21, 2016, with the entire contents of each of these applications incorporated herein by reference.

BACKGROUND

Field

The invention relates to fuel electrodes for electrochemical power systems and particularly to fuel electrodes for metal-air rechargeable power systems.

Description of Related Art

Fuel electrodes for battery and power systems require contact with an ionic conductive medium, such as an electrolyte and electrical coupling with a current collector to allow current flow to and from the fuel electrode. It is desirable in many systems to have a large surface area of contact between the fuel electrode and the electrolyte to enable loading of fuel onto the electrode while minimizing thickness of the deposited fuel. A fuel electrode with a very high surface-area-to-volume ratio (also called the surface to volume ratio and variously denoted sa/vol or SA:V, the amount of surface area per unit volume that a material occupies) is desirable. It is also desirable for this surface area to be readily accessible to the electrolyte and not small internal pores within the fuel electrode material, as this may present limitations to depositing of the fuel. In addition, it is desirable that the surface of the fuel electrode be smooth with limited corners as this may be an area of charge concentration and can lead to dendrite formation. Fuel electrodes are usually made of metal and therefore a high specific surface area, surface area per unit mass, i.e. $m^2/g$, is desired to keep the cost of the fuel electrode down.

Porous metal fuel electrodes provide a high sa/vol but are cost prohibitive in many applications and have irregularly shaped pores. The pores within a porous metal span a wide range of sizes and present a tortuous path from the exterior of the porous metal to the most interior pores within the porous metal. This tortuous path to the internal surface area, and smaller pores, can present flow restrictions of the electrolyte and result in poor exchange and reaction rates. In addition, some of the pores within a porous metal fuel electrode can become blocked or clogged with deposits thereby reducing the effective sa/vol ratio over time as these clogged pores become unavailable for reaction. Electrolyte has to flow from the outside surface of the porous metal through a labyrinth of pores to reach pores and surface area within the depth of the porous metal. Therefore, the structure of a porous metal, while having a high initial sa/vol ratio, may present mass transport limitations, can have a reduced sa/vol ratio over time due to blocked pores, can have low electrolyte exchange or permeability of electrolyte therethrough, and can be cost prohibitive.

In addition, if the fuel electrode bows or flexes it can contact the opposite electrode and short out the system. Fuel electrodes made out of sheets of material are susceptible to such deflection and bowing. To prevent this, spacers or separators are often placed between the fuel electrode and the opposing electrode, or cathode, to prevent shorting. The fuel electrode is sometimes in direct contact with a spacer which reduces surface area available for reaction. Spacers add cost and can reduce the flow and mixing of electrolyte within the cell.

Furthermore, in some electrochemical systems, deposits, such as dendrites can form on the fuel electrode which can extend out from the surface. If these dendrites contact the opposing electrode they can short the system. The dendrites can also become dislodged from the surface of the fuel electrode and fall to the bottom of the cell where they can also build up and extend over to the opposing electrode to cause a short.

Metal foams or 3D foams have been used, in some cases, to form part of the electrode structure. However, such foams are not ideal for a variety of reasons, including, for example, producing irregularities, providing reduced open area, producing rough surfaces with sharp or undesirable angles and corners, and having lower surface area to volume ratios.

SUMMARY

One aspect of the present invention provides a fuel electrode for an electrochemical cell. The electrode comprises a first corrugated portion formed of an electroconductive material. The first corrugated portion has a first corrugation axis and comprises a plurality of apertures therethrough. A second corrugated portion is formed of an electroconductive material. The second corrugated portion has a second corrugation axis offset from the first corrugation axis and comprises a plurality of apertures therethrough. Electrode attachments attach the first and second corrugated portions to each other.

Another aspect of the invention provides an electrochemical cell comprising the foregoing fuel electrode with metal fuel electrodeposited thereon, a cathode, such as an air electrode, and an ionically conductive medium between the fuel electrode and the cathode.

Other aspects, features, and advantages will become apparent from the following detailed description, the accompanying drawings and the appended claims.

BRIEF DESCRIPTION OF THE DRAWINGS

The accompanying drawings are included to provide a further understanding of the invention and are incorporated in and constitute a part of this specification, illustrate embodiments of the invention, and together with the description serve to explain the principles of the invention.

FIG. 1 depicts a schematic view of an electrochemical cell having an immersed oxidant reduction electrode.

FIG. 2 depicts a schematic view of an electrochemical cell having an oxidant reduction electrode which defines a boundary wall for the electrochemical cell.

DETAILED DESCRIPTION OF THE ILLUSTRATED EMBODIMENTS

Figure 3:
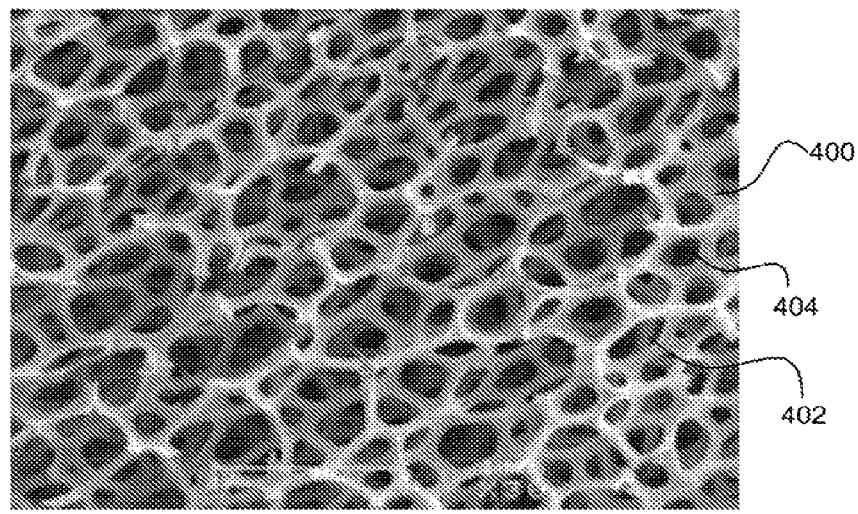
FIG. 3 shows a surface image of metal foam.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale and some features may be exaggerated to show details of particular components. Therefore, specific structural and functional details disclosed herein are not to be interpreted as limiting, but merely as a representative basis for teaching one skilled in the art to variously employ the present invention.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

In cases where the present specification and a document incorporated by reference include conflicting and/or inconsistent disclosure, the present specification shall control.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications and improvements are within the scope of the present invention.

Various portions of the electrochemical cell 100 may be of any suitable structure or composition, including but not limited to being formed from plastic, metal, resin, or combinations thereof. Accordingly, the cell 100 may be assembled in any manner, including being formed from a plurality of elements, being integrally molded, or so on. In various embodiments the cell 100 and/or the housing 110 may include elements or arrangements from one or more of U.S. Pat. Nos. 8,168,337, 8,309,259, 8,491,763, 8,492,052, 8,659,268, 8,877,391, 8,895,197, 8,906,563, 8,911,910, 9,269,996, 9,269,998 and U.S. Patent Application Publication Nos. 20100316935, 20110070506, 20110250512, 20120015264, 20120068667, 20120202127, 20120321969, 20130095393, 20130115523, and 20130115525, each of which are incorporated herein in their entireties by reference.

FIG. 1 illustrates a schematic cross sectional view of an electrochemical cell 100. As shown, the components of the electrochemical cell 100 may be contained at least partially in an associated housing 110. The cell 100 utilizes a liquid ionically conductive medium 124, such as an electrolyte 126, that is contained within the housing 110, and is configured to circulate therein to conduct ions within the cell 100. While at times the ionically conductive medium may be generally stationary within the housing 110, such as in a stagnant zone, it may be appreciated that the cell 100 may be configured to create a convective flow of the ionically conductive medium. In some embodiments, the flow of the ionically conductive medium may be a convective flow generated by bubbles of evolved gas in the cell 100, such as is described in U.S. Patent Publication No. 2013/0115532 incorporated above in its entirety by reference Although in the illustrated embodiment of FIG. 1 the cell housing is configured such that the oxidant reduction electrode 150 is immersed with the oxidant reduction electrode module 160 into the cell chamber 120, it may be appreciated that in various embodiments, other configurations or arrangements of the cell 100 are also possible. For example, in FIG. 2, another embodiment of the cell 100 (specifically, cell 100*) is presented, whereby an oxidant reduction electrode 150* defines a boundary wall for the cell chamber 120, and is sealed to a portion of a housing 110* so as to prevent seepage of ionically conductive medium therebetween. In some such embodiments the convective flow of the ionically conductive medium in the cell chamber 120, described in greater detail below, may be in a direction upwards and away from the oxidant reduction electrode 150*, across the top of the fuel electrode 130.

As shown in FIG. 3, a prior art metal foam 400 has metal fused together to form an interconnected network having pores 404. The pores are variable in size. The structure has internal porosity or internal surface area 402. Internal surface area is the surface area that extends into the outer surface or is beneath an outer surface. In addition, metal foam and sintered metal have irregularly shaped pores and surfaces, many with rough or very low radius elements. The structure has a large number of sharp edges or protrusions that can lead to the formation of dendrites.

Figure 4:
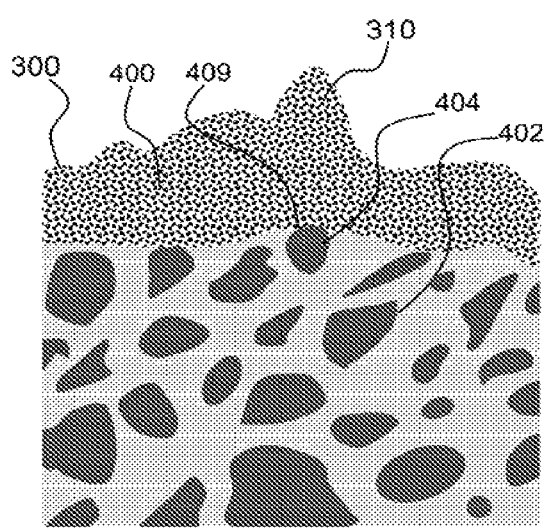
FIG. 4 shows a cross sectional diagram of fuel deposition on a surface of metal foam.

FIG. 4 shows a dendrite 310 formed in the fuel deposition 300 layer on the metal foam 400, as generally known in the art. The dendrite has formed over the low radius of curvature element 409, or protrusion from the metal foam surface. As described herein, protrusion from the surface and or sharp corners may be areas of charge concentrations that can lead to dendrite formation. Also shown in FIG. 4 the internal surface area 402 that may have limited or no fuel deposition. The fuel deposition layer 300 on the surface of the metal foam may block the internal surface area and prevent fuel deposition on the internal surfaces of the metal foam.

As noted previously, using these type metal foams or 3D foams as part of the electrode structure is not optimal or ideal because they result in irregularities, a reduced open area, rough surfaces with undesirable angles and/or corners, and a lower surface area to volume ratio.

Figure 5:
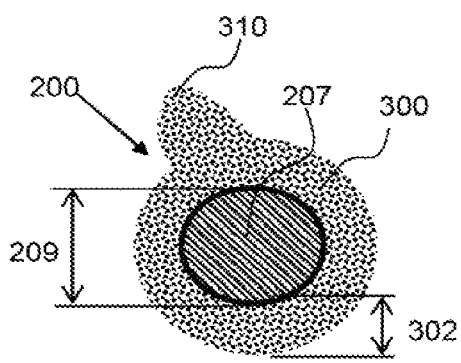
FIG. 5 shows a cross-section of fuel deposition on a metal wire.

As shown in FIG. 5, a fuel electrode comprises a fuel element, or metal wire 207, having diameter 209 and a fuel deposition layer 300 of thickness 302 around the wire. In addition, a dendrite 310 has formed in the fuel deposition layer.

Figure 6:
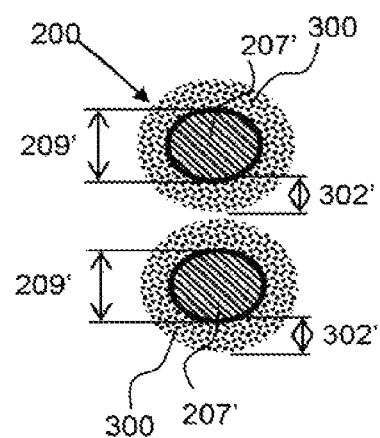
FIG. 6 shows a cross-section of fuel deposition of two smaller metal wires than shown in FIG. 5.

As shown in FIG. 6, a fuel electrode comprises wires 207' having a smaller diameter 209' than the wire shown in FIG. 5. Again, there is a fuel deposition layer 300 around the wires having a thickness 302'. The thickness of the fuel deposition layer on each wire 207' in FIG. 6 is less than the fuel deposition layer thickness in FIG. 5, but there is more surface area for deposition in the fuel electrode of FIG. 6 because more wires of smaller diameter can be arranged in the same overall volume. Therefore, the fuel is spread out over this larger surface area in a thinner layer.

Figure 7:
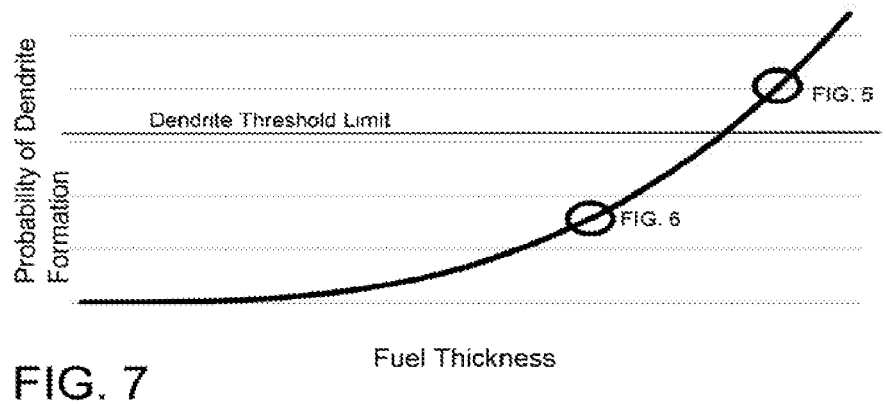
FIG. 7 shows a graph of the probability of dendrite formation versus thickness of fuel deposition.

FIG. 7 shows a graph of the probability of dendrite formation versus thickness of fuel deposition. As the thickness of fuel deposition increases, the probability of dendrite formation increases. Therefore, for a given amount of deposition, the fuel electrode shown in FIG. 5 may be above a threshold probability of dendrite formation whereas the fuel electrode shown in FIG. 6 remains below the dendrite threshold limit.

Figure 8:
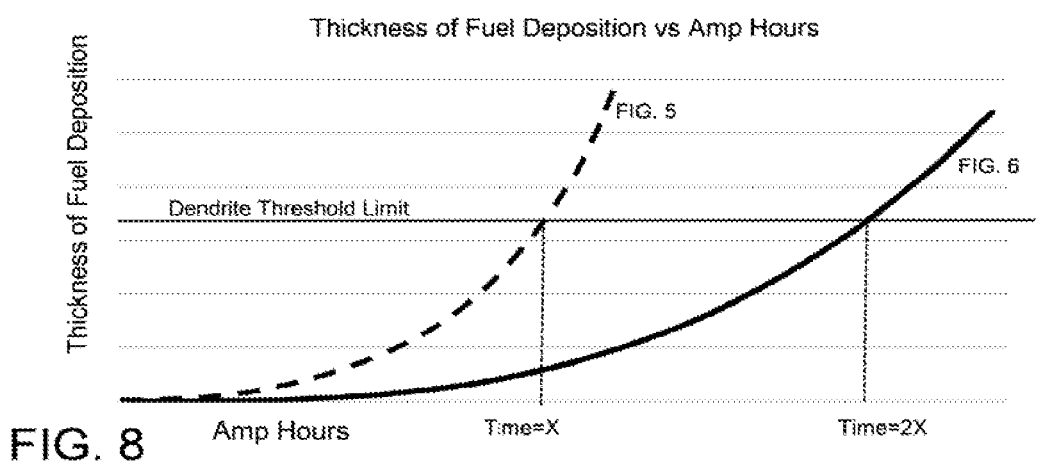
FIG. 8 shows a graph of the thickness of fuel deposition versus amp hours and two lines for different fuel electrodes.

FIG. 8 shows a graph of the thickness of fuel deposition versus amp hours and two lines for different fuel electrodes. For a given number of amp-hours, a fuel will be deposited over the available surface area of the fuel electrode and the fuel electrode in FIG. 6, having a higher surface area, will have a slower growth in the thickness of the fuel deposition layer. Therefore, the fuel electrode shown in FIG. 6 can run for a longer time before exceeding the dendrite threshold limit and therefore has a higher run capacity. However, the fuel electrode in FIG. 6 comprises wires that are smaller in diameter, and therefore may be more flexible or fragile, which is not desirable. The corrugated electrode, as described herein, can provide sufficient stiffness with smaller diameter wire screens or other configurations.

A fuel electrode for an electrochemical cell comprises two or more corrugated portions configured with their corrugation axes offset from one another and attached to each other (also referred to as a "corrugated structure" throughout this disclosure) to produce a stiffer corrugated laminate fuel electrode preferably with high sa/vol. Rotating the corrugation direction of one corrugated portion relative to another enhances the structural rigidity of the fuel electrode. In addition, the open area of the corrugated fuel electrode can be optimally tailored as desired and may be uniform and provide little resistance to flow therethrough. For example, the first corrugated portion may be configured vertically within the cell, wherein the first corrugation axis extends from the top to the bottom of the cell and the second corrugated portion may be configured orthogonally to the first corrugated portion, wherein the second corrugation axis extends horizontally, or across the cell. The axes need not align with the vertical/horizontal directions of the cell, and reference to these directions in the illustrated embodiment is for convenience. The first and second corrugated portions may be attached to each other by attachments whereby the two attached corrugated portions support and reinforce each other to create a fuel electrode that is stiffer in the vertical and horizontal directions, or along the first corrugation axis and orthogonal to the first corrugation axis, as well as in torsion. The second corrugated portion may be configured at a second corrugation axis offset angle, i.e., its axis is offset at an angle relative to the first corrugation axis. In an embodiment, the second corrugation axis offset angle is preferably at least about 30 degrees or more, about 45 degrees or more, about 60 degrees, 90 degrees or more or in any range between and including the offset angles provided. In an embodiment, the offset of the second corrugation axis from the first corrugation axis is between about 25 degrees to about 90 degrees. In one embodiment, the second corrugation axis is about 45 degrees offset from the first corrugation axis. In another embodiment, the second corrugation axis is about 90 degrees offset from the first corrugation axis. In an embodiment, the first corrugated portion and/or the second corrugated portion may be calendared or crushed to reduce thickness of the corrugated structure and/or the fuel electrode. A fuel electrode may comprise any suitable number of corrugated portions including, but not limited to, two or more, three or more, four or more, five or more, ten or more and any in range between and including the numbers provided.

A corrugated metal portion may comprise, consist essentially of, or consist of an electrically conductive material including, metal, nickel, zinc, copper, aluminum, steel, platinum, gold, silver, palladium, plated metal, nickel plated steel, nickel plated stainless steel and the like. A metal may be selected for a particular electrochemical application taking into account the type of electrolyte, the conductivity requirements as well as cost requirements.

Figure 9:
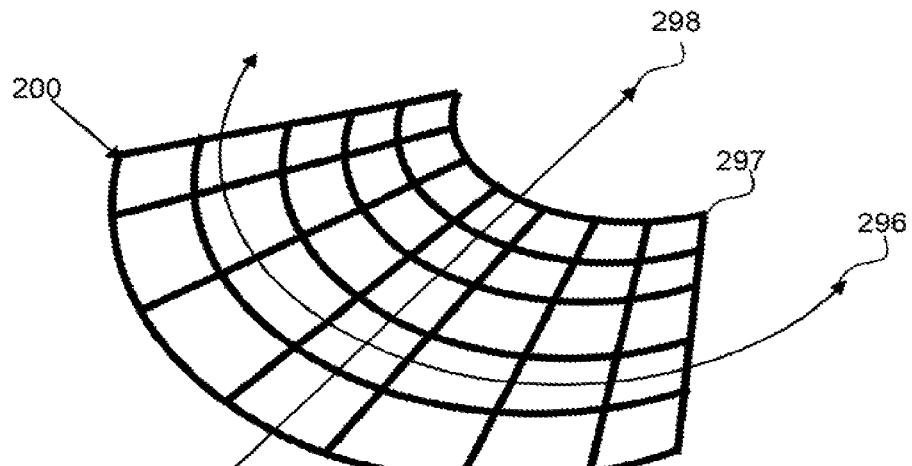
FIG. 9 shows a metal screen that is flexible.

FIG. 9 shows a fuel electrode 200 made of a metal screen 297 that is flexible. The metal screen is being rolled in the first axis 296 but could also be rolled or easily flexed or bent in the perpendicular second axis 298. As used herein, the axis or axes in general refer to the major or X-Y axes of the plane corresponding to the shape of the electrode, and not the Z-direction of the thickness. A corrugation axis more specifically means the axis parallel to the direction in which the corrugations extend.

Figure 10:
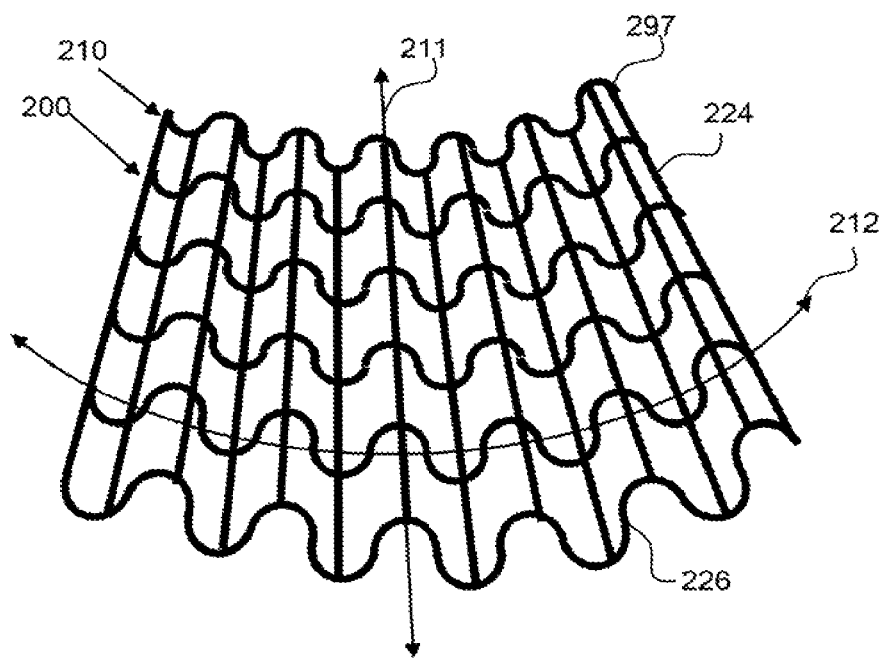
FIG. 10 show a corrugated metal screen that is flexible along one axis and stiffened by the corrugation in the opposing axis.

As shown in FIG. 10, a metal screen 297 is corrugated to form a first corrugated portion 210 of a fuel electrode. The corrugations extend in the corrugation axis 211, wherein the peaks and troughs of the corrugations are aligned with this corrugation axis. The corrugated portion is flexible and can be easily rolled or flexed in the cross-corrugation axis 212 as shown by the curved double arrow line indicating the cross-corrugation axis. However, the first corrugated portion will be stiffened and more resistant to flexing and bending in the corrugation axis, as the corrugations increase the stiffness of the metal screen in that axis.

A woven screen or fabric couples the corrugation axis extensions and cross-corrugation extensions together through the weave itself. A mesh may comprise corrugation axis extensions and cross-corrugation extensions that are attached to each other by fasteners, adhesive, welding or soldering. The welded attachments may be discrete, such as spot welds. A weld attachment comprises fused materials, such as a first and second corrugated portion being fused together. A metal wire from a first corrugated portion may be welded to a metal wire of the second corrugated portion to form a weld attachment. Heat and pressure may be applied to cause the compressed portions to fuse into each other. Diffusion welding may also be used. Diffusion welding is a solid state welding process by which two metals, which may be dissimilar, can be bonded together. Diffusion involves the migration of atoms across the joint, due to concentration gradients. Diffusion welding may be preferred as it does not require as much heating as conventional welding and therefore may produce a more robust attachment. Resistance welding or ultrasonic bonding may also be employed to bond a first corrugated portion to a second corrugated portion.

Figure 11:
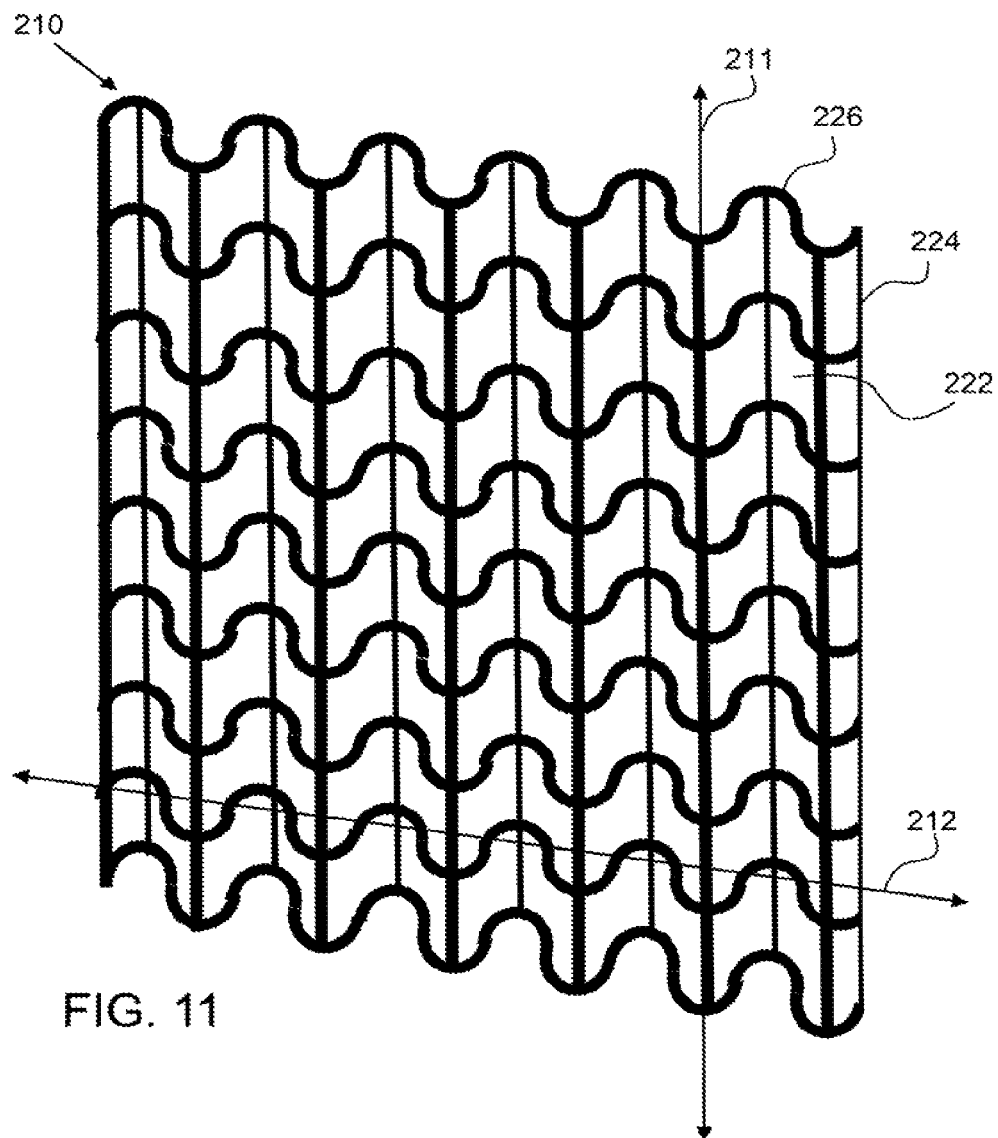
FIG. 11 shows a perspective view of an exemplary first corrugated portion.
Figure 12:
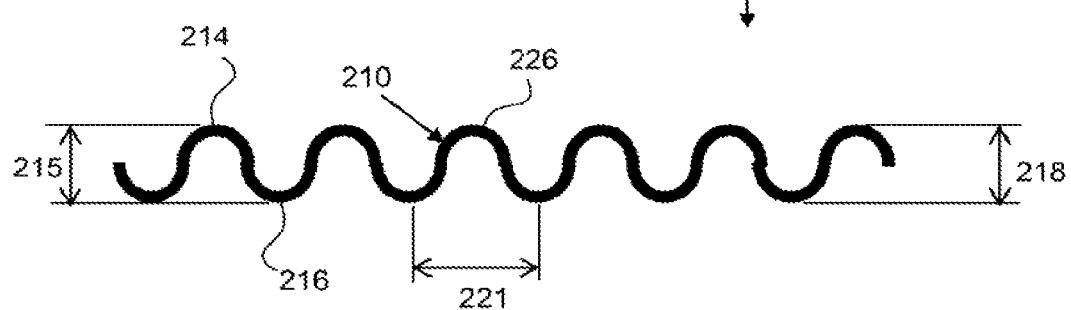
FIG. 12 shows a corrugation axis end view of the exemplary first corrugated portion shown in FIG. 11.

As shown in FIGS. 11 and 12, an exemplary first corrugated portion 210 comprises corrugated-axis extensions 224 that extend in the first corrugation axis 211 and cross-corrugation extensions 226 that extend in the first cross-corrugation axis 212, which is orthogonal to the first corrugation axis. In this embodiment, the corrugated-axis extensions and cross-corrugation extensions are strands, such as wire having a length that is much greater in dimension, such as at least 10 times greater, than a cross-sectional dimension of the strand. Apertures 222 are formed between the strands to allow flow of an ionic conductive medium, or electrolyte therethrough. As shown in FIG. 12, the first corrugated portion 210 has a first corrugation amplitude 218 or thickness 215 between a first side 214 and a second side 216. The corrugation pitch 221, or distance of a repeating unit of the corrugation is shown.

Figures 13, 14:
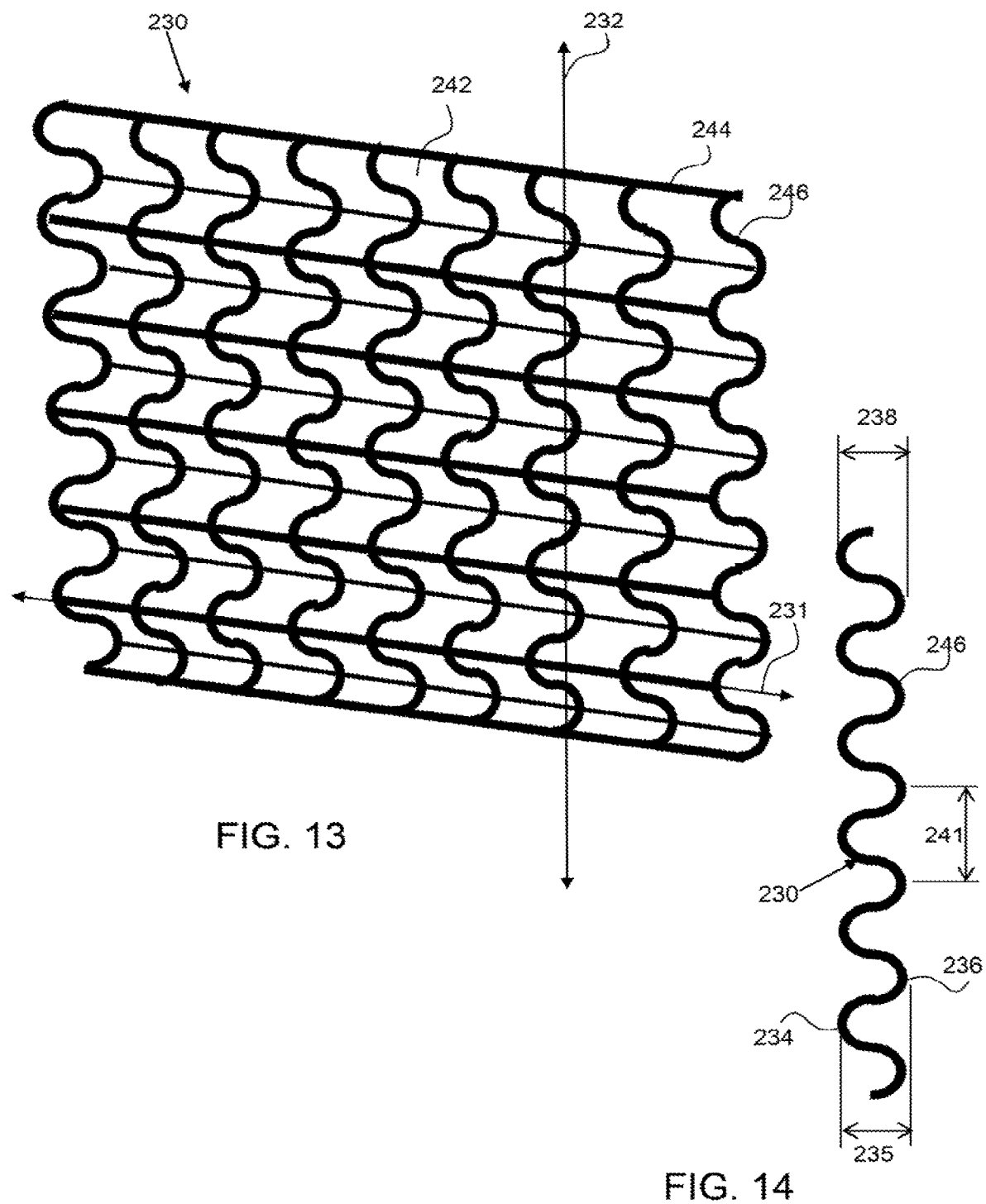
FIG. 13 shows a perspective view of an exemplary second corrugated portion.
FIG. 14 shows a corrugation axis end view of the exemplary first corrugated portion shown in FIG. 13.

As shown in FIGS. 13 and 14, an exemplary second corrugated portion 230 comprises corrugated-axis extensions 244 that extend in the second corrugation axis 231 and cross-corrugation extensions 246 that extend in the second cross-corrugation axis 232. In this embodiment, the corrugated-axis extensions and cross-corrugation extensions are strands, such as wire having a length that is much greater in dimension, such as at least 10 times greater, than a cross-sectional dimension of the strand. Apertures 242 are formed between the strands to allow flow of an ionic conductive medium, or electrolyte therethrough. As shown in FIG. 14, the second corrugated portion 230 has a second corrugation amplitude 238 or thickness 235 between a first side 234 and a second side 236. The corrugation pitch 241, or distance of a repeating unit of the corrugation is shown.

Figure 15:
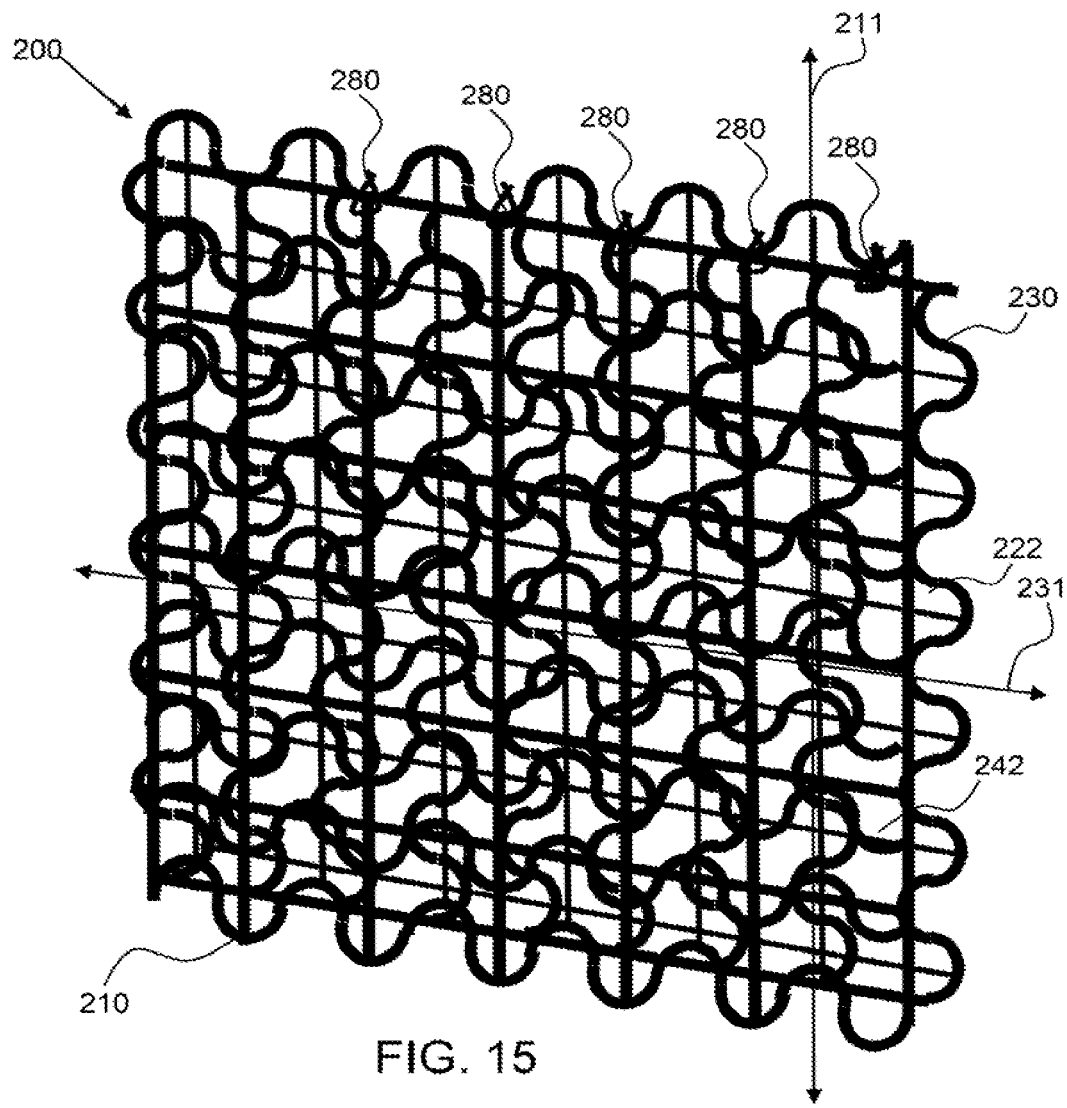
FIG. 15 show a perspective view of an exemplary fuel electrode having a first corrugated portion attached to a second corrugated portion by discrete attachments.
Figure 16:
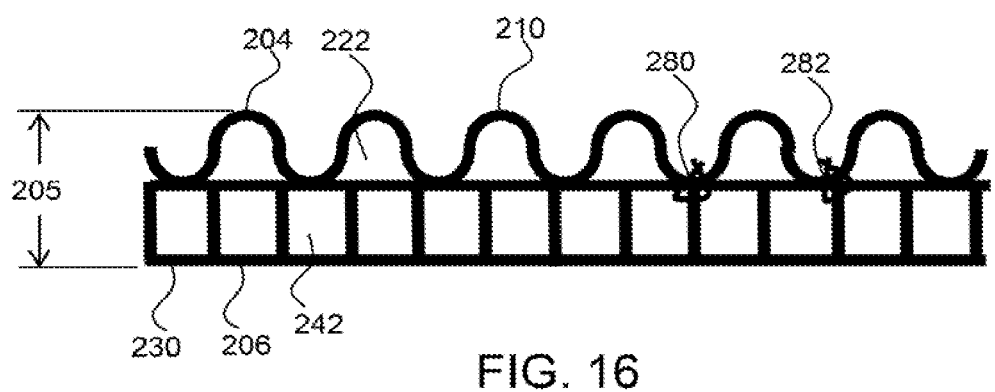
FIG. 16 shows a corrugation axis end view of the exemplary fuel electrode shown in FIG. 15.

As shown in FIGS. 15 and 16, an exemplary fuel electrode 200 has a corrugated structure including a first corrugated portion 210 attached to a second corrugated portion 230 by attachments 280. The first corrugated portion has a first corrugation axis 211 that is about 90 degrees offset from the second corrugation axis 231, wherein the first and second corrugated portion are configured essentially orthogonally to each other, with respect to their corrugation axes (although other angles may be used). Apertures or open spaces through the first and second corrugated portions 222, 242 respectively, enable electrolyte to flow freely through the fuel electrode to allow high reaction rates. As shown in FIG. 16, the fuel electrode 200 has a thickness 205 from a first outer side 204 and a second outer side 206. The first corrugated portion 210 is attached to the second corrugated portion 230 by attachments 280, such as discrete fasteners 282 that attach the two corrugated portions together in one discrete location.

In an exemplary embodiment, the corrugated portions of the fuel electrode made substantially of metal wire having a smooth continuous outer surface that is preferred for deposition of fuel thereon and the attachments of the fuel electrode may be made out of a material different than metal wire. A metal wire may be circular or oval in cross-sectional shape having a radius of curvature about the outer surface, for example. The metal wire may optimally have essentially no internal surface area, wherein the surface of the metal wire is essentially free of any porosity. The diameter of the strands, or maximum cross-sectional dimension, maybe about 0.5 mm or more, about 1 mm or more, about 2 mm or more, about 3 mm or more about 5 mm or more, about 8 mm or more and any range between and including the diameters provided. It is desirable to have a small diameter as this will increase the surface area for fuel deposition, however the smaller the diameter the more flexible the wire mesh or screen may be. Thus, a combination of wire or strand diameters may be utilized in a corrugated portion or from one corrugated portion to another, as described herein.

Figure 17:
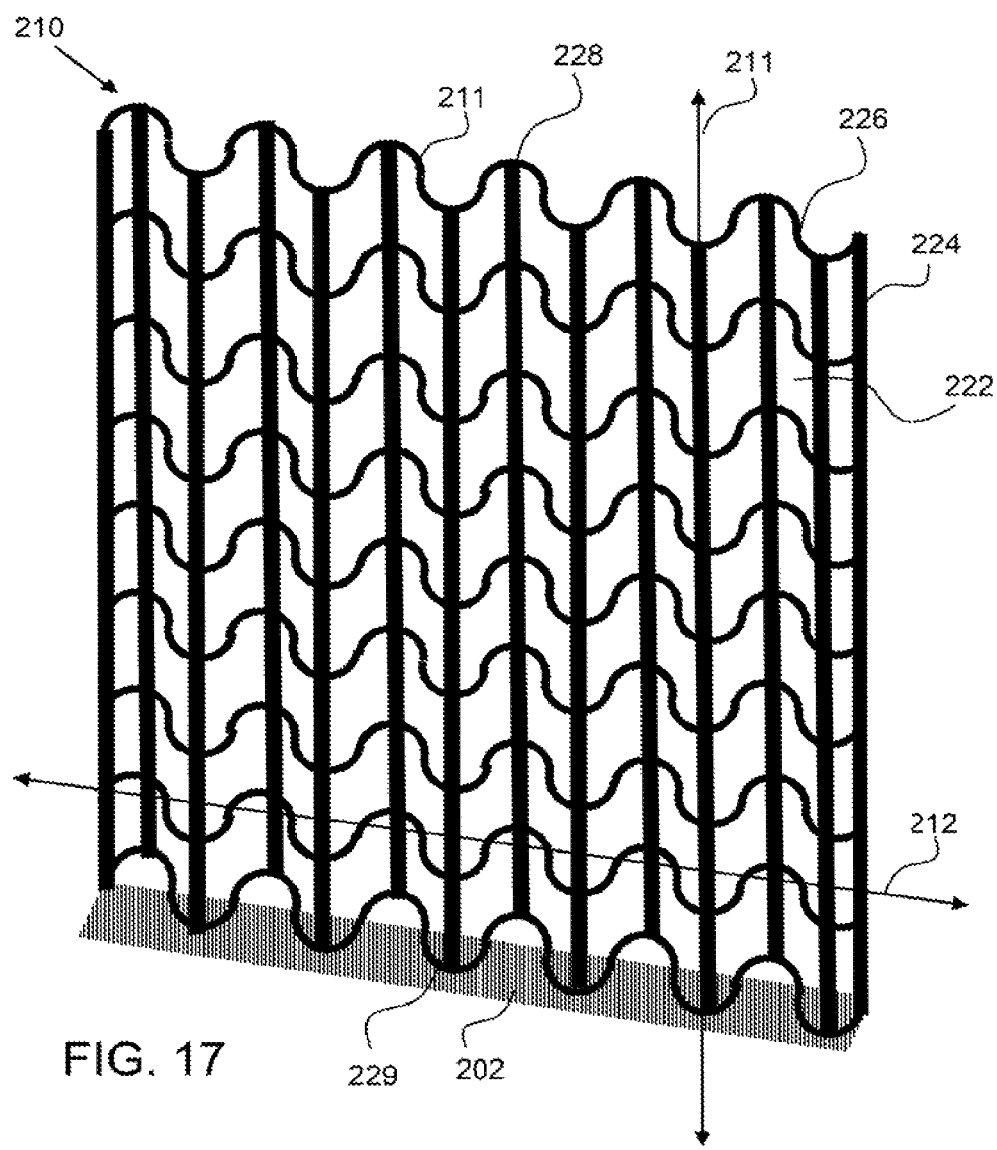
FIG. 17 shows a perspective view of an exemplary first corrugated portion having corrugation axis extensions that are larger in cross-sectional dimension than the cross-corrugation extensions.
Figure 18:
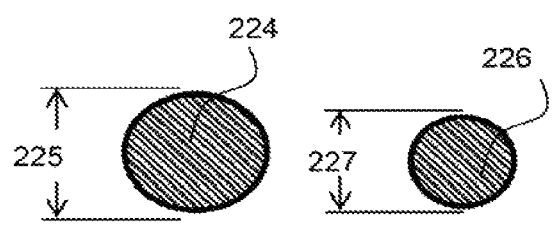
FIG. 18 shows cross-sectional views of the corrugation axis extension and the cross-corrugation extension.

As shown in FIG. 17, an exemplary first corrugated portion 210 has corrugation axis extensions 224 that are larger in cross-sectional dimension than the cross-corrugation extensions 226. FIG. 18 shows the cross-sections of the corrugation axis extensions 224 and the cross-corrugation extensions 226. The corrugation axis extensions have a greater cross-sectional dimension 225 than the cross-corrugation extensions cross-sectional dimension 227. The corrugation axis extensions may be larger in diameter to reduce resistance for electrical current collection, as these strands may be electrically coupled with a current collector 202 at the first end 228 or second end 229, as shown.

This ability to tailor the size and gap distance between corrugation axis extensions and cross-corrugation extensions enables optional tailoring of the corrugated portion to have optimized properties for the electrochemical cell system. In addition, not all of the corrugation axis extensions and cross-corrugation extensions have to be the same in cross-section dimension. A portion of the corrugation axis extensions may be one diameter, and the remaining may be smaller in diameter, for example.

In an embodiment, both of the first and second corrugated portions may have cross-corrugation extensions. An exemplary fuel electrode, in accordance with an embodiment, has first and second corrugated portions attached to each other, with the second corrugation axis being offset from the first corrugation axis and the cross-corrugation extensions of the first and/or second corrugated portions may extend to a current collector (e.g., 202). In one embodiment, in this fuel electrode, the second corrugation axis may be between about 45 to about 90 degrees (both inclusive) offset from said first corrugation axis. In an embodiment, in the fuel electrode, the corrugation-axis extensions of the first corrugated portion are larger in cross-sectional dimension than the cross-corrugation extension of the first corrugated portion. In an embodiment, the cross-corrugations extensions of the second corrugated portion are larger in cross-sectional dimension than the corrugation-axis extensions of the second corrugated portion.

Figure 19:
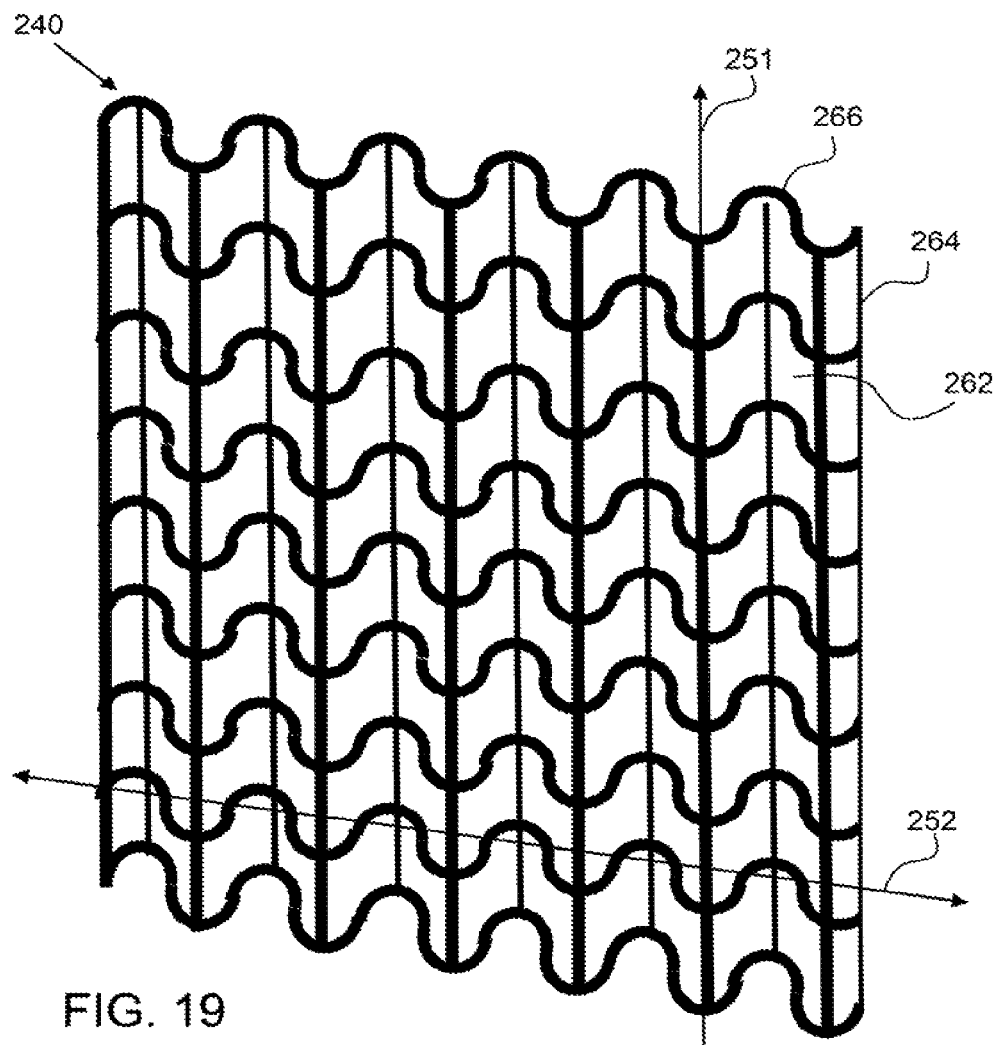
FIG. 19 shows a perspective view of an exemplary third corrugated portion.
Figure 20:
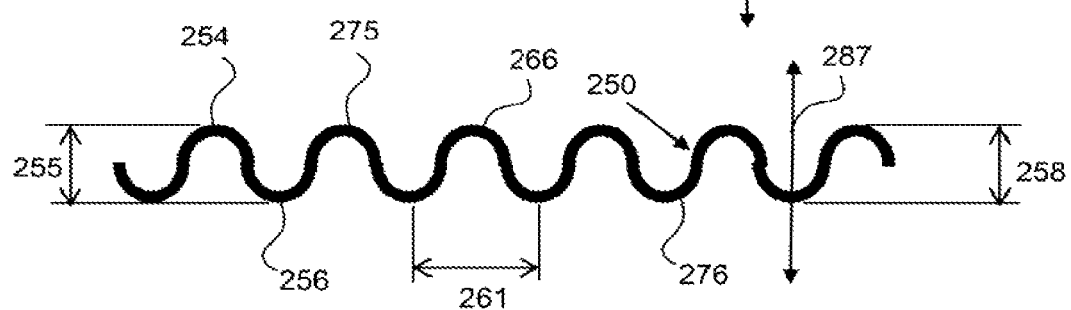
FIG. 20 shows a corrugation axis end view of the exemplary third corrugated portion shown in FIG. 19.

As shown in FIGS. 19 and 20, an exemplary third corrugated portion 250 comprises corrugated-axis extensions 264 that extend in the third corrugation axis 251 and cross-corrugation extensions 266 that extend in the third cross-corrugation axis 252. In this embodiment, the corrugated-axis extensions and cross-corrugation extensions are strands, such as wire having a length that is much greater in dimension, such as at least 10 times greater than a cross-sectional dimension of the strand. Apertures 262 are formed between the strands to allow flow of an ionic conductive medium, or electrolyte therethrough. As shown in FIG. 20, the third corrugated portion 250 has a third corrugation amplitude 258 or thickness 255 between a first side 254 and a second side 256. The corrugation pitch 261, or distance of a repeating unit of the corrugation is shown. The third corrugated portion has a corrugation peak 275 and corrugation trough 276, wherein the peak is the highest point and the trough is the lowest point of the corrugation, with respect to a vertical axis 287 (also referred to as a thickness direction or Z-axis) and the corrugated portion extending perpendicular to said vertical axis 287.

Figure 21:
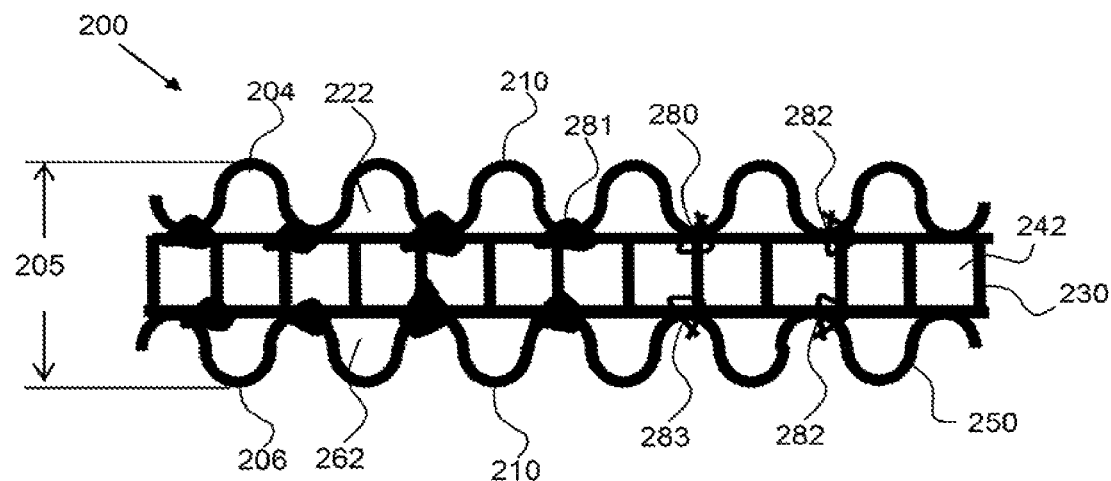
FIG. 21 shows an end view of an exemplary corrugated fuel electrode having first, second and third corrugated portions attached to each other and at offset angles.

As shown in FIG. 21, an exemplary fuel electrode 200 has a corrugated structure including first 210, second 230 and third 250 corrugated portions attached to each other. The first and third corrugated portions are aligned with the first and third corrugation axes aligned. The second corrugation portion is configured between the first and third corrugated portions and has a corrugation axis that is offset 90 degrees to the first and third corrugation axes. The first and third corrugation portions are attached to each other by attachments 280, both discrete fasteners 283 and adhesive 281. The adhesive is attached to the two adjacent corrugated portions and may extend around and encapsulate a strand of the corrugated portions.

Figure 22:
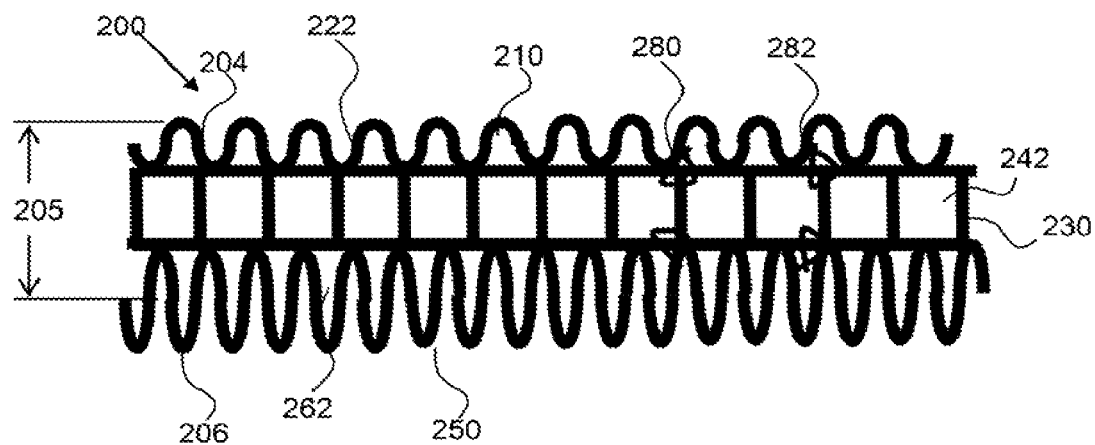
FIG. 22 shows an end view of an exemplary corrugated fuel electrode having first, second and third corrugated portions attached to each other and at offset angles and having different corrugation amplitudes and corrugation pitch.

As shown in FIG. 22, an exemplary fuel electrode 200 has a corrugated structure including first 210, second 230 and third 250 corrugated portions attached to each other. Like FIG. 21, the first and third corrugated portions 210, 250 are aligned with the first and third corrugation axes aligned. The second corrugation portion 230 is configured between the first and third corrugated portions 210, 250 and has a corrugation axis that is offset 90 degrees to the first and second corrugation axis. The first and third corrugation portions are attached to opposite sides of the second portion 230 by discrete attachments 282. The amplitude and corrugation pitch of the three corrugated portions, however, are each different from one another. This may be done to provide more surface area on one side versus the other, or to provide more stiffness in one direction than the other, for example. In any embodiment with multiple corrugated portions, each adjacent pair of corrugated parties may have their corrugation axes angularly offset from each other, while the axes of alternating corrugated parties may be offset or aligned.

In another embodiment, one of the second or third corrugated portions 230, 250 may be configured at a 45 degree offset angle to the first corrugated portion 210 and the other corrugated portion is configured with a 90 degree offset angle to the first corrugated portion 210. In still another embodiment, the fuel electrode may optimally comprise four corrugated portions with offset angles of 30 degrees, wherein when the first corrugated portion is configured vertically, one of the remaining corrugated portions is configured with about a 30 degree offset angle, one is configured with about a 60 degree offset angle and the last corrugated portion is configured with about a 90 degree offset angle. In this embodiment, the fuel electrode may be stiffened in multiple directions to prevent deflection and bowing.

A corrugated portion may have a corrugation, or pleat that is saw-tooth shaped having linear corrugation segments, whereby each corrugation forms a substantially triangular shape. A corrugation may be curved, or have one or more radius portions. In an exemplary embodiment, a corrugation has a wave shape resembling a sinusoid or modified sinusoidal wave shape. A corrugation may consist of a sinusoidal wave shape that is modified to approach a trapezoidal wave shape. A corrugation may have linear portions that extend along a peak and trough of the corrugation and connection segments that extend substantially vertically (i.e. in the Z-direction or thickness of the individual portion) between the peak and trough segments or at some offset angle with respect to vertical. A ratio of the amplitude to the pitch is the corrugation ratio, which defines how packed or spaced out the corrugations are. For example, a corrugation ratio of one means that the amplitude and pitch are equal, whereas a corrugation ratio of two means that the corrugation is twice as tall as it is wide. A higher corrugation ratio will create a higher sa/vol of the corrugated portion, whereby more material is within the volume defined by the product of the amplitude, the width and the length of the corrugated portion. A low corrugation ratio may be less desirable as it will not be as stiff. Stiffness of a corrugated portion in a direction orthogonal to the corrugation axis is increased by a higher corrugation ratio.

The corrugation ratio may also influence the ability of a corrugated portion to capture formations, dendritic material for example, that may slough or fall off the surface of a corrugated portion. A corrugated portion may have a corrugation ratio of about 0.25 or more, about 0.5 or more, about 0.75 or more, about 1.0 or more, about 1.5 or more, about 2.0 or more, about 3.0 or more, about 5 or more, about 10 or more and any ratio between and including the exemplary ratios provided. In accordance with an embodiment, a corrugated portion may have a corrugation ratio between about 0.25 and about 10.0 (both inclusive). In one embodiment, a corrugated portion may have a corrugation ratio between about 0.25 and about 5.0 (both inclusive). In one embodiment, a corrugated portion may have a corrugation ratio between about 0.25 and about 5.0 (both inclusive). In another embodiment, a corrugated portion may have a corrugation ratio of no more than about 3.0 (inclusive). The actual amplitude and pitch dimension may be selected based on the size of the electrochemical cell but in many cases will be on the order of about 0.1 cm or more, about 0.25 cm or more 0.5 cm or more, about 1 cm or more, about 2 cm or more, about 3 cm or more, about 5 cm or more and any range between and including the values provided. In an embodiment, the amplitude may be between about 0.1 cm and about 3.0 cm (both inclusive). In one embodiment, the amplitude may be between about 0.1 cm and about 1.5 cm (both inclusive). In an embodiment, the pitch may be between about may be between about 0.1 cm and about 3.0 cm (both inclusive). In one embodiment, the amplitude may be between about 0.1 cm and about 1.5 cm (both inclusive).

Figure 23:
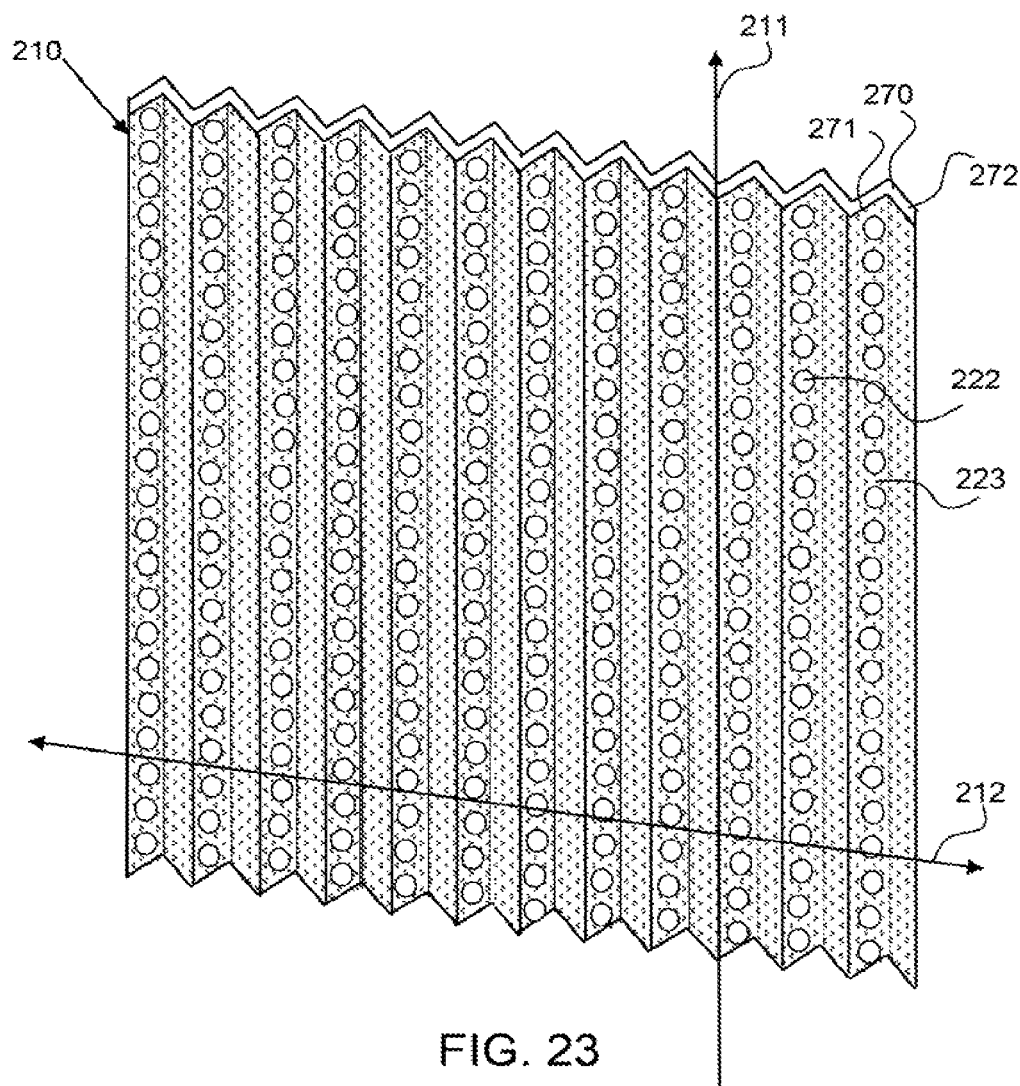
FIG. 23 shows a perspective view of an exemplary first corrugated portion having discrete apertures through the corrugated sheet material.
Figure 24:
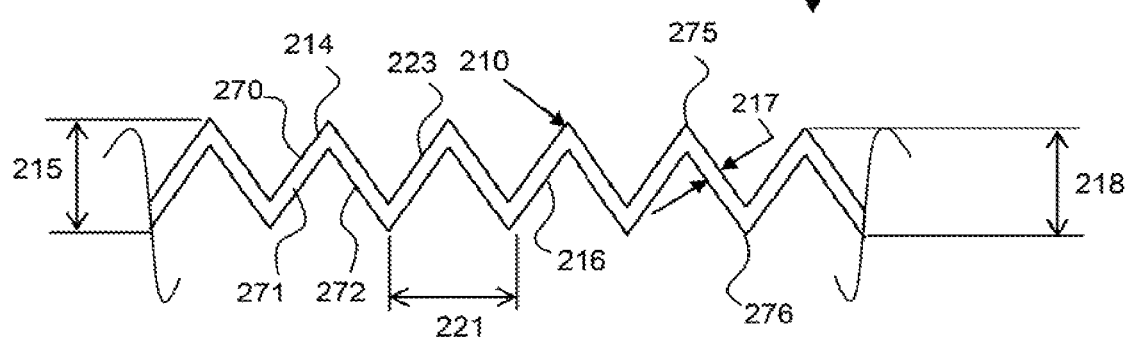
FIG. 24 shows an end view of an exemplary first corrugated portion having saw-tooth shaped corrugations or pleats.

As shown in FIGS. 23 and 24, an exemplary first corrugated portion 210 comprises a corrugated sheet of material 223 having apertures 222 through the sheet of material. The sheet of material may be a sheet of metal. The corrugations are saw-tooth shaped having linear segments 271, 272 that create triangular shaped corrugations 270 or pleat segments. The corrugations extend in the first corrugation axis 211 and the cross-corrugation axis 212 is orthogonal or perpendicular to the first corrugation axis. In a non-limiting embodiment, apertures 222 are formed through the corrugated sheet along a first corrugation segment 271 and not along the second corrugation segment 272, and allow flow of an ionic conductive medium, or electrolyte therethrough. The location, number or areal density, and shape of the apertures may be selected to provide suitable flow of electrolyte therethrough. In addition, the location of the apertures may be selected to produce a flow direction of electrolyte through the fuel electrode, wherein the flow may be up to prevent dislodging of slough or dendritic material. As shown in FIG. 24, the first corrugated portion 210 has saw-toothed shaped corrugations or pleats, having linear corrugation segments. The saw-toothed shaped corrugations have corrugation peaks 275 and corrugation troughs 276. The first corrugated portion 210 has a first corrugation amplitude 218 or thickness 215 between a first side 214 and a second side 216. The corrugation pitch 221, or distance of a repeating unit of the corrugation, as well as the sheet thickness 217 are shown.

The apertures 222 may be formed by punching, cutting, laser cutting, water cutting and the like. In an exemplary embodiment, a sheet is an expanded sheet of metal, wherein the metal sheet is perforated or cut and then stretched to form opening in the sheet material, usually diamond shaped openings. Expanded metal is an inexpensive method of forming a permeable metal sheet of material that can then be corrugated or pleated to form a corrugated portion.

Figure 25:
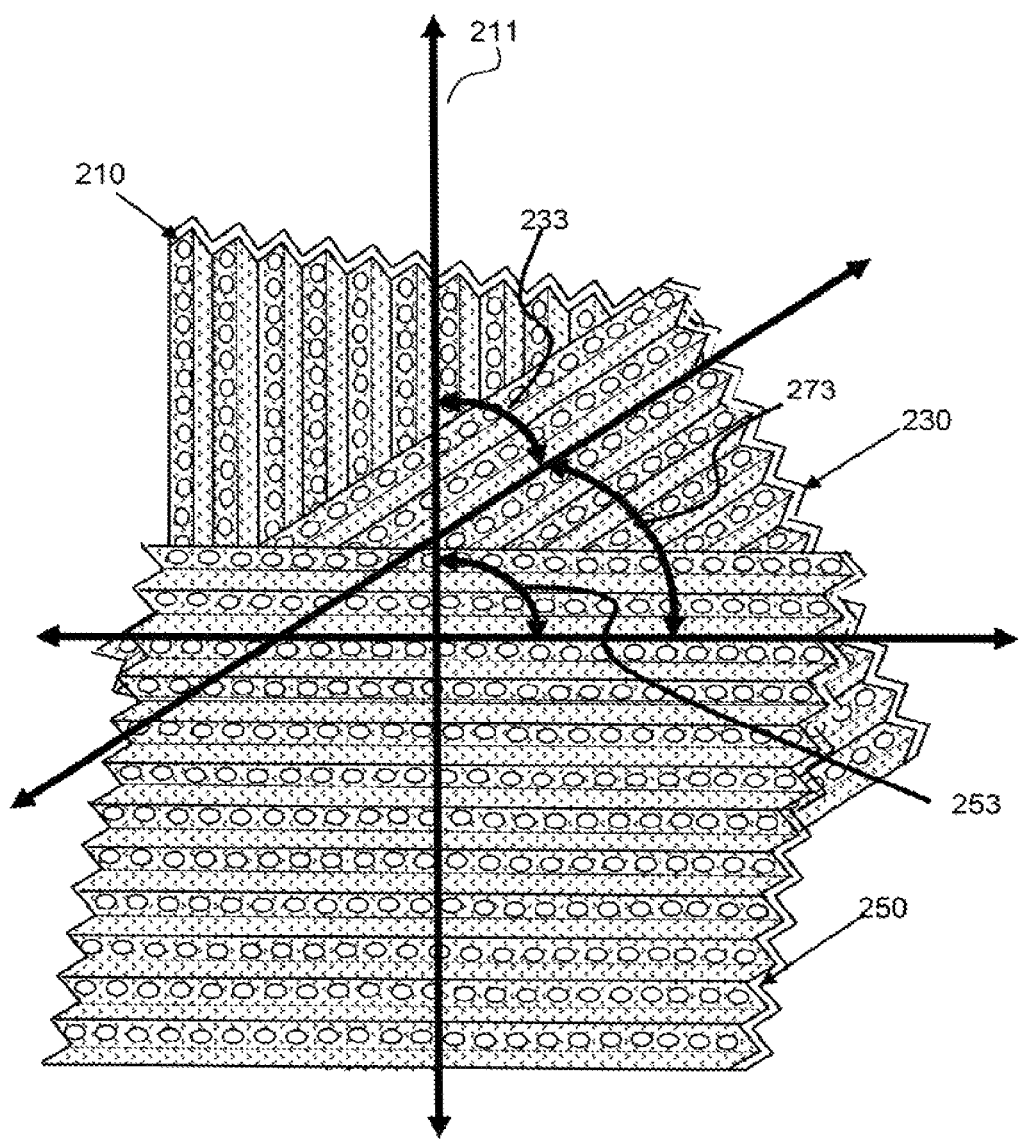
FIG. 25 shows exemplary first, second and third corrugated portions at offset corrugation axis angles.

FIG. 25 shows exemplary first 210, second 230 and third corrugated portions 250 each at offset corrugation axis angles relative to one another. The second corrugated portion 230 is at a second corrugation axis offset angle 233 from the first corrugated portion. The third corrugated portion 250 is at a first-to-third corrugation axis offset angle 253 from the first corrugated portion and at a second-to-third corrugation axis offset angle 273 from the second corrugated portion. In this embodiment, the second corrugated portion is at an offset angle of about 45 degrees from the both the first and third corrugated portions making the third corrugated portion orthogonal to the first corrugated portion. As described herein the offset angles may be selected for rigidity, flow, and/or electrical conductively purposes.

Figure 26:
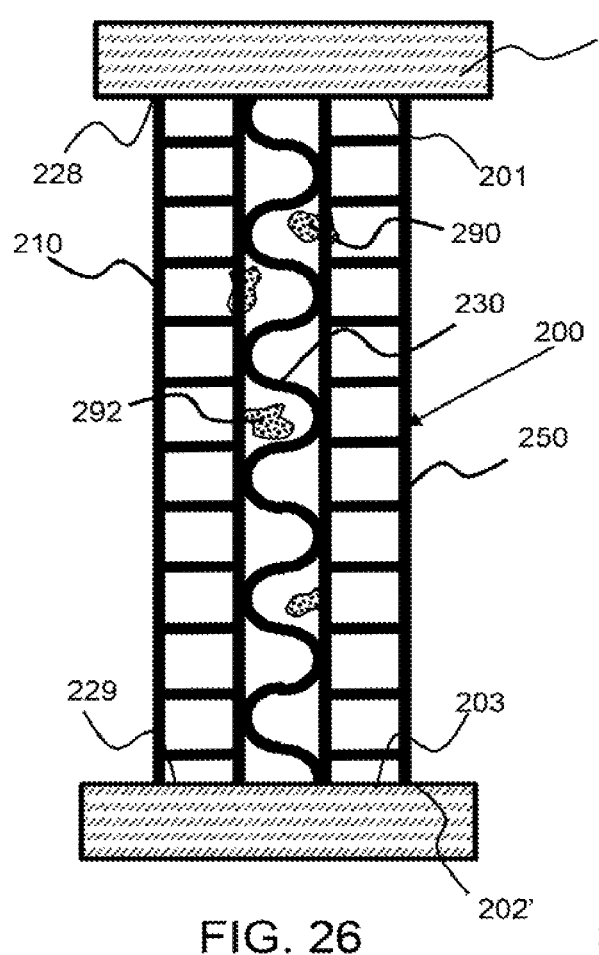
FIGS. 26 and 27 show a side view of an exemplary fuel electrode having first, second and third corrugated portions attached to each other and sloughed or dendritic material being captured in the corrugations between adjacent corrugated portions.
Figure 27:
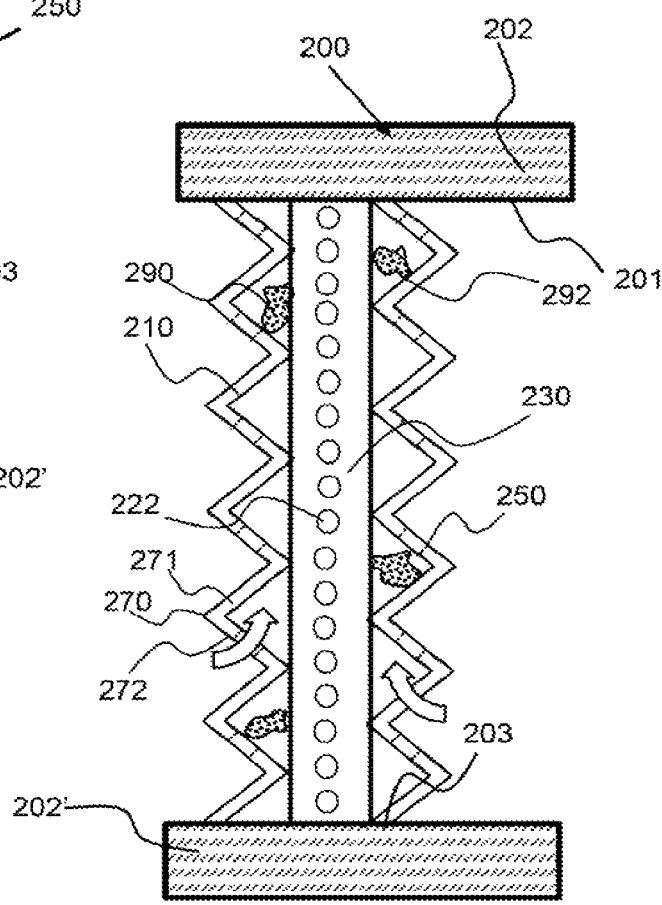

As shown in FIGS. 26 and 27, an exemplary fuel electrode has a corrugated structure having first 210, second 230 and third corrugated portions 250 attached to each other with sloughed 290 or dendritic material 292 being captured in the corrugations between adjacent corrugated portions. The fuel electrode has a corrugated electrode portions having strands in the middle as the second corrugated portion 230, and FIG. 26 shows corrugated portions formed out of a sheet of material having apertures on the outside as the first and third corrugated portions 210, 250. The apertures in the first 210 and third 250 corrugated portions, or the outer corrugated portions, may be configured in the second corrugation segment 272 to produce an upward flow through the fuel electrode, as indicated by the large arrows. Alternatively, the apertures may be formed only in the first corrugation segments 271, the upper segments, of the outer corrugated portions 210, 250 to prevent any sloughed 290 or dendritic material 292 from falling down and out through the apertures. With apertures only on the upper portion of the pleat segment, slough material may not be able to fall down through the corrugated portions to the bottom 203 of the fuel electrode. That option is beneficial because it keeps the slough metal in contact with the electrode for oxidation. The first end 228 and second end 229 of the fuel electrode 200 is electrically coupled with a current collector 202, 202' at the top 201 and bottom 203 of the fuel electrode, respectively.

Figure 28:
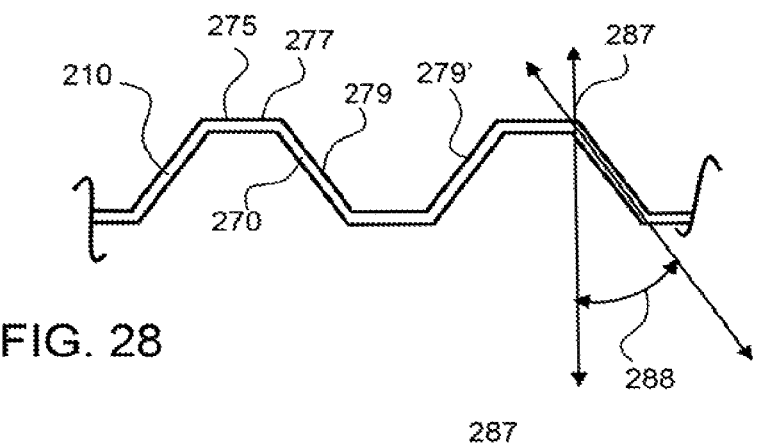
FIGS. 28 and 29 show end views of an exemplary corrugated portion having linear segments at the peak and troughs of the corrugations.
Figure 29:
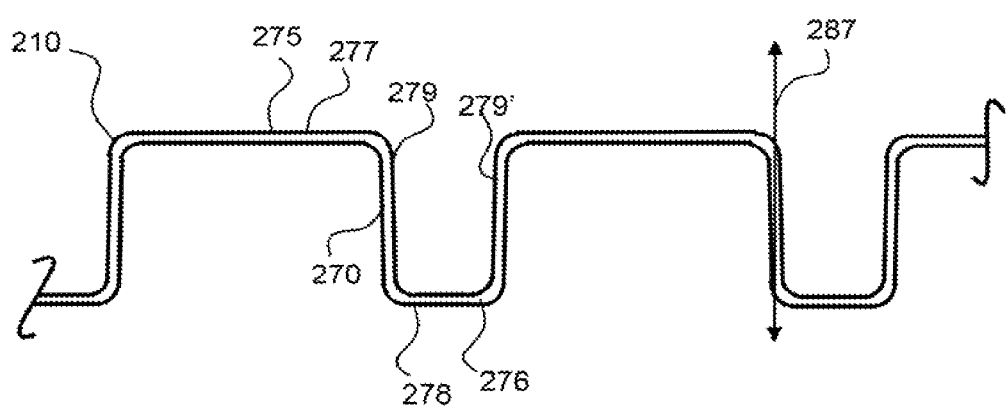

As shown in FIGS. 28 and 29, exemplary corrugated portion 210 has linear segments at the peak 275 and troughs 276 of the corrugations 270. A linear peak segment 277 and linear trough segment 278 extend essentially in the cross-corrugation axis direction and are coupled together by peak-trough connectors 279 that are at an offset angle 288 to the vertical axis as shown in FIG. 28, and that are substantially vertical as shown in FIG. 29. These types of corrugations may provide a high level of rigidity about the cross-corrugation axis.

Figure 30:
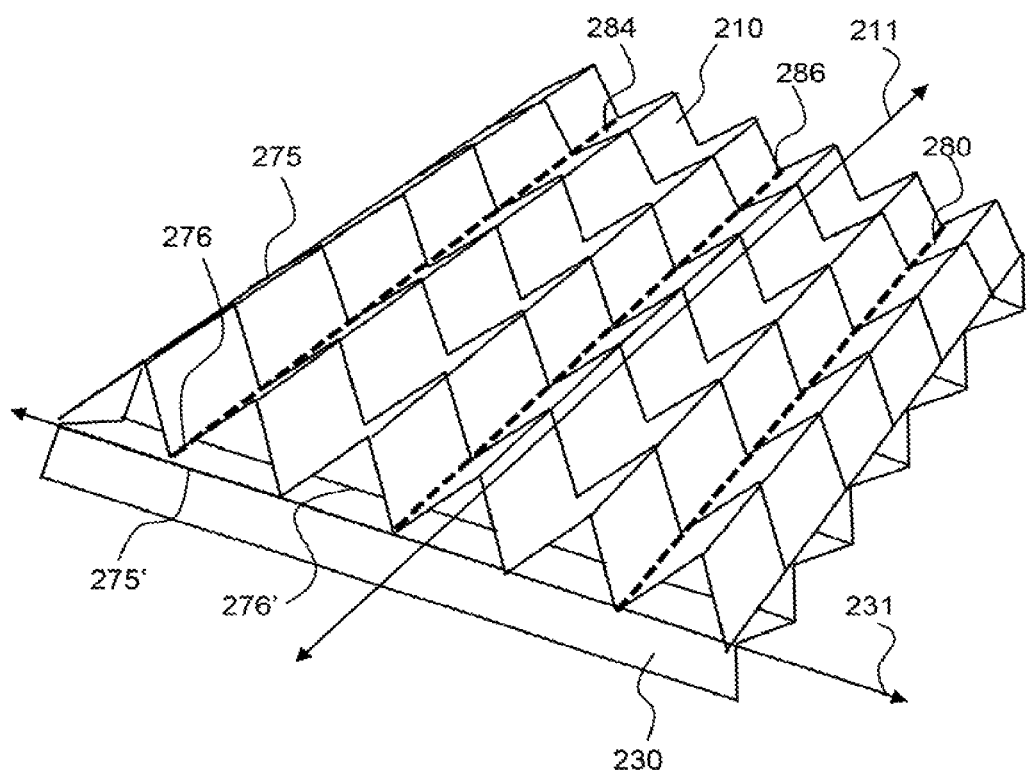
FIG. 30 shows a first and second corrugated portion attached by a stitch line attachment that extends along the trough of the first corrugated portion.

FIG. 30 shows a first corrugated portion 210 and second corrugated portion 230 attached by a stitch line attachment 286 that extends along the corrugation trough 276 of the first corrugated portion. The stitch line attachment is an example of a continuous attachment 284 (as opposed to discrete attachments at spaced apart points. The stitch line extends along the corrugation axis 211 of the first corrugated portion 210. The stitches may extend down and pull the peaks 275' of the second corrugated portion 230 to the troughs 276 of the first corrugate portion to firmly attach the two corrugated portions together.

The continuous stitched seam may optimally comprise at least 10 stitches made by the continuous thread that joins a first and second corrugated portion together. A thread may be a synthetic material, such as a polymeric material that is substantially non-reactive in the electrolyte, such as a fluoropolymer, polypropylene and the like. A thread may be a conductive material, such as a metal wire that both physically and electrically couples a first and second corrugated portion together. A thread may be stitched in a discrete or continuous manner to connect a first and a second corrugated portion together. A thread may be a supple material that is not free standing, whereby the thread will not hold a shape when a small compressive or flexural load is applied, such a gravity. For example, a thread may flex and deform when not supported by a surface.

Figure 31:
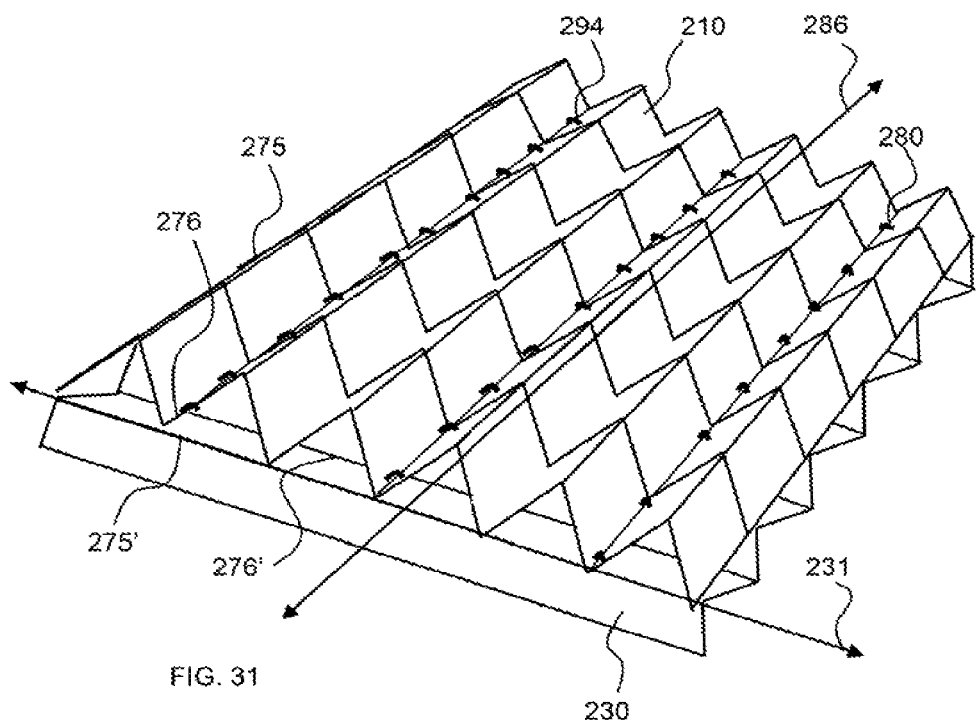
FIG. 31 shows a first and second corrugated portion attached by staples along the trough of the first corrugated portion.

FIG. 31 shows a first corrugated portion 210 and second corrugated portion 230 attached by staples 294 as discrete attachments along the corrugation trough 276 of the first corrugated portion. The staples may extend from a trough of the first corrugated portion and into the peaks, or proximal to the peaks of the second corrugated portion, wherein the peak of the second corrugate portion is adjacent the trough of the first corrugated portion. Any number or staples may be used to attach the first corrugation portion to the second corrugated portion and the staples may electrically couple the first and second corrugated portions together.

A staple may be metal or an electrically conductive material that physically and optionally electrically couples the first and second corrugated portions together. Staples may be attached along a trough of a first corrugated portion to the second corrugated portion, for example. A staple may be free standing, wherein the staple maintains a shape under small loads, such as gravity.

Figure 32:
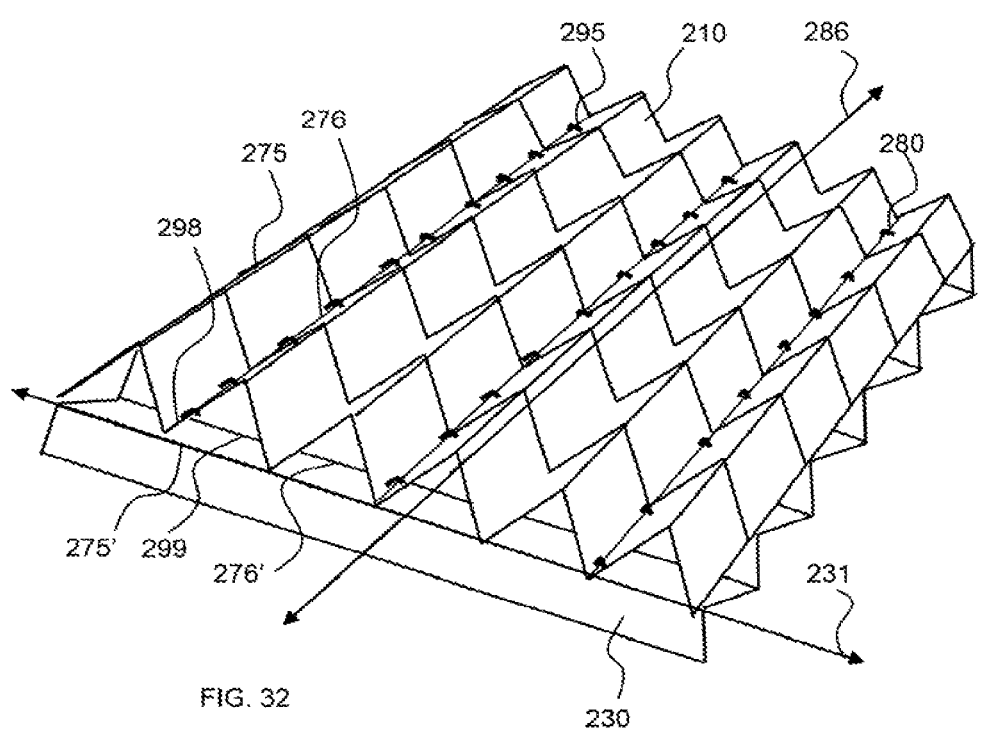
FIG. 32 shows a first and second corrugated portion attached by weld attachments along the trough of the first corrugated portion.

FIG. 32 shows a first corrugated portion 210 and second corrugated portion 230 attached by discrete weld attachments 295 configured along the corrugation trough 276 of the first corrugated portion. The weld attachments may be spot welds that attach the first and second corrugated portions together in discrete locations, or spots. A wire 298 of the first corrugated portion 210 may be welded with a wire 299 of the second corrugated portion 230. Any number or weld attachments 295 may be used to attach the first corrugation portion to the second corrugated portion and the weld attachments may electrically couple the first and second corrugated portions together.

An electrically conductive attachment, such as welding a thread in a stitch or stich line, or a staple, may provide electrical connections between the two corrugated portions and therefore reduce electrical resistance which may promote uniform fuel deposition.

Any of the embodiments disclosed herein may include corrugated portions that are calendared or crushed. In an embodiment, two or more corrugated portions may be calendared or crushed together to reduce thickness of the corrugated structure and thus the fuel electrode For example, after positioning the corrugated portions at an angle relative to one another, pressure may be applied to the structure (e.g., via a mechanical press or other pressure application device) to crush, e.g., corrugation-axis extensions and/or cross corrugation extensions of, the corrugated portions. In one embodiment, at least a portion of some of the extensions in the corrugated portions are non-linear and/or changed or transformed from their original structural configuration after calendaring or crushing. In an embodiment, the thickness of the corrugated structure is reduced approximately 5% to approximately 50% from its original thickness (i.e., a thickness before pressure is applied to the corrugated portions). In one embodiment, the thickness of the corrugated structure is reduced approximately 10% to approximately 20% from its original thickness (i.e., a thickness before pressure is applied to the corrugated portions).

Crushing or calendaring the corrugated portions provides a number benefits, including decreasing a thickness of the corrugated structure/fuel electrode, increasing a surface area per unit thickness, and a higher surface area to volume ratio. Crushed or calendared corrugated portions can also allow improved performance. For a given electrode surface area and a given inter-electrode gap (e.g. the distance between the air cathode and the near side of the anode/fuel electrode) reducing thickness can allow for shifting of the center of mass of the fuel electrode closer to the other electrode (i.e. the OEE (oxygen evolving electrode) or other charging electrode during charge or air cathode during discharge), while maintaining the same total fuel loading/capacity. This reduces total IR drop through the electrolyte, thereby reducing cell voltage during charge and increasing cell voltage during discharge. Alternatively, increasing surface area, for a given thickness and inter-electrode gap will decrease overpotential due to lower current density, leading to improved cell voltage. Cycling may also be improved while using a crushed/calendared corrugated structure. For example, if the center of mass of the fuel electrode is unchanged, the reduced thickness implies increased inter-electrode gap, which may aid in cyclability and reducing the tendency and probability of shorting, without adversely affecting performance (i.e. cell voltage). Increasing area/unit thickness can also lead to more uniform plating (charge) and oxidation (discharge) of the fuel electrode, since the difference in the electrode gap (i.e. as measured between the front and back sides of the fuel electrode) is reduced.

Also, if the total surface area of the corrugated structure is increased and crushed to the same thickness as the lower surface area, uncrushed anode/fuel electrode, the loading of the fuel on the anode (i.e. total mass or cell capacity) can be increased and improved. This results in increased energy density when concentration of the fuel species in the electrolyte is also increased. Further, increasing the electrode area while maintaining the same loading may result in reduced charge and discharge current densities. This tends to increase both performance and cyclability, while still maintaining large enough inter-electrode gaps critical for good cycling. The higher surface area for a given capacity also reduces average film thickness, film thickness non-uniformity and associated film stresses, which is important for achieving good cycling.

In addition to a corrugated structure being able to reduce shortage, a crushed/calendared corrugated structure may further reduce a cell's susceptibility to shortage by reducing an amount and size of dendrites that may be dislodged from the surface of the fuel electrode, and into the ionically conductive medium and housing.

Moreover, as generally noted throughout this disclosure, the herein described corrugated structure(s) (i.e., two or more corrugation portions assembled at an offset angle relative to one other, e.g., first and second corrugated portions) not only provide rigid structures with high surface area to volume ratios that may be used as fuel electrodes, but also allow for tailoring of the fuel electrode design. For example, the diameters (of wires or elements), weave density (e.g., wires per inch), the corrugation amplitude and/or pitch, the orientation and/or number of corrugated screens/portions bonded/attached together may be altered to change and tailor any number of features, including: surface area to volume ratio, structure conductivity, open area fraction, the corrugated structure stiffness or strength (resistance to bending), open void fraction, structure thickness, and total project structure surface area. Using smooth portions or wires also leads to smoother fuel deposition and better cell cycling.

Figure 33:
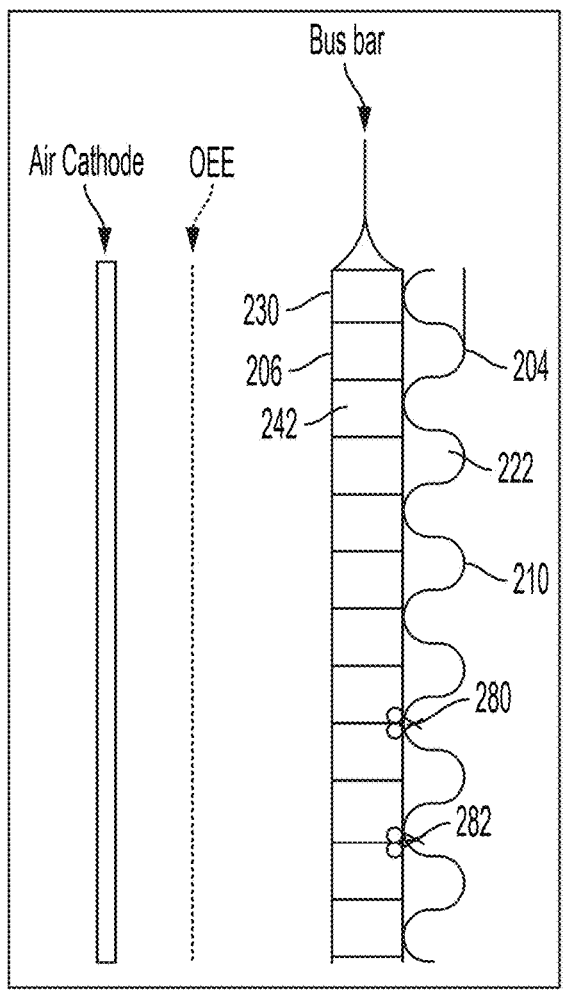
FIG. 33 shows a schematic end view of an exemplary corrugated structure used as a fuel electrode and arranged with a cathode in an electrochemical cell in accordance with an embodiment.

Any of the herein described embodiments of a corrugated structure may be used as a fuel electrode/anode in an electrochemical cell having a cathode and an ionically conductive medium communicating the fuel electrode. FIG. 33 shows an example arrangement of a corrugated structure (e.g. as shown in FIG. 16) provided as the fuel electrode/anode relative to a cathode (e.g., air electrode) and any other electrodes (e.g., OEE) (all of which are provided in a cell housing along with an ionically conductive medium) in an electrochemical cell, in accordance with an embodiment. The current collector (e.g. 202) or busbar is attached to the proximal corrugated portion (or screen), i.e., the portion of the corrugated structure that is closest to the cathode.

Figure 34:
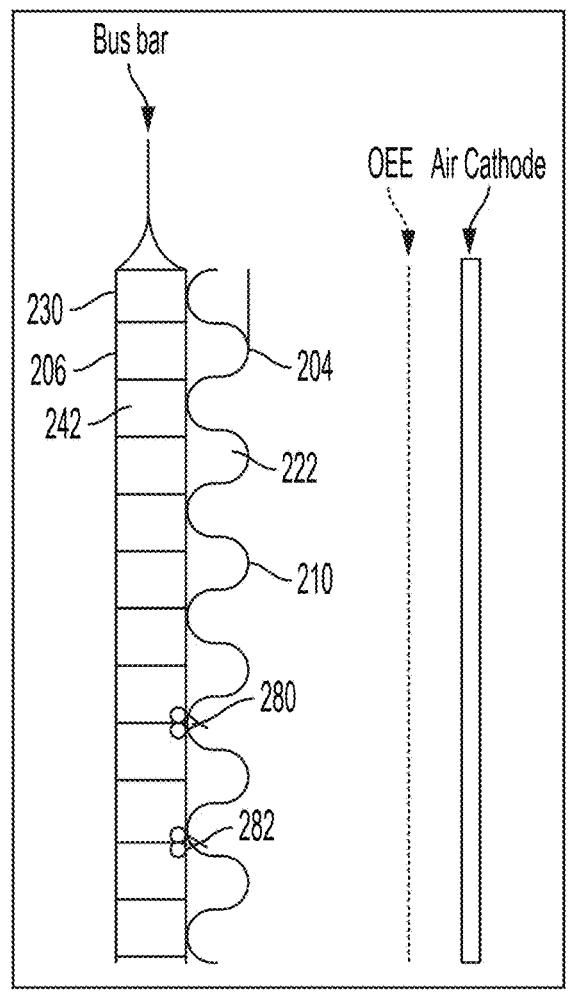
FIG. 34 shows a schematic end view of an exemplary corrugated structure used as a fuel electrode and arranged with a cathode in an electrochemical cell in accordance with another embodiment.

Furthermore, since each of the embodiments of the disclosed corrugated structure is a composite structure, assembled from individual corrugated screens that are coupled together via spot welds, staples, stitches, etc., electrical conductance through and across the corrugated structure can be varied by: (i) coupling individual screens that have different electrical resistance (i.e., different pitch and/or diameter), (ii) how the structure is bussed ((e.g. bussing all screens together, bussing only the screen proximal to the OEE or cathode, bussing only the screen distal from OEE or cathode), and/or (iii) changing the type and/or density of the attachment points between individual screens, for example. This may further allow control over the distribution of fuel over the anode/fuel electrode, which may be advantageous for improved cyclability. For example, as shown in FIG. 34, a corrugated structure may be provided or assembled as a fuel electrode/anode in an inverted configuration as compared to the one shown in FIG. 33; i.e., the corrugated structure may be arranged with a cathode and any other electrodes (e.g., OEE) in a cell such that the current collector (e.g., 202) or busbar is attached only to the distal corrugated portion (or screen), i.e., the portion of the corrugated structure that is farthest away from the cathode, or, in other words, the corrugated portion that is on an opposite or outer side of the structure relative to the side at which the cathode is nearest. Assembling the anode/fuel cell in this manner may improve cycling within the cell.

When used herein, the terms "peak and "trough" are used for convenience in reference to the Figures are not intended to imply that there is necessarily any structural difference between the two or any particular orientation, and thus there is no requirement of a "peak" vertically higher than any "trough". Hence, these terms should be interpreted to denote a specific orientation for the fuel electrode. They could also be referred to as peaks on the first and second side because a trough is essentially a peak on the opposite sides. Whatever terminology is used is simply for convenience in reference to the Figures. In many embodiments the fuel electrode will be in a vertical orientation.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

The open area percentage of a corrugated portion, the percent of the area that is open or represented by apertures, may optimally be engineered with respect to the amount of flow that will be required through the corrugated portion as well as the other factors of the corrugated portion including the corrugation ratio, amplitude and pitch dimensions. An exemplary corrugated portion or corrugated fuel electrode may have an open area percentage of about 50% or more, 75% or more, about 85% or more, about 90% or more, about 95% or more and any range between and including the open area percentages provided. In accordance with an embodiment, the corrugated portion(s) and/or corrugated fuel electrode may have an open area percentage between about 50% to about 95% (both inclusive). A corrugated electrode may have open area that extends completely through the electrode, from a first side to a second side, whereby a straight line can be drawn from a first side to second side through said open area. A corrugated portion or the fuel electrode may be effectively permeable to allow electrolyte to flow therethrough. In an embodiment, each of the corrugated portions used to form the fuel electrode may have a larger open area percentage while, after their assembly (and offset), the fuel electrode has a smaller open area percentage than the individual corrugated portions. For example, in one embodiment, each of the corrugated portions may have an open area percentage of about 50% to 95%; the fuel electrode formed using said corrugation portions may have an open area percentage of about 5% to about 80%, in accordance with an embodiment. In one embodiment, the corrugation portion and/or fuel electrode may have a permeability through the plane of the material that is between about 100 Frazier and about 500 Frazier, including the Frazier values provided.

A fuel electrode made from two or more corrugated portions that are attached to each other may have a volumetric void fraction, the percentage of the volume defined by the fuel electrode that is open space, that is high to enable good transport and flow of electrolyte therethrough. The volume of the fuel electrode is defined by the product of the outside dimension thickness, length and width of the fuel electrode. An exemplary corrugated portion may have a volumetric void fraction of about 75% or more, about, about 85% or more, about 90% or more, about 95% or more and any range between and including the percentages provided. In an embodiment, the fuel electrode has a volumetric void fraction between about 80% and 99.5% (both inclusive). In another embodiment, the fuel electrode has a volumetric void fraction between about 90% and about 99.5% (both inclusive). In yet another embodiment, the fuel electrode has a volumetric void fraction between about 95% and about 99.5% (both inclusive).

It is desirable to maximize reaction surface area per volume, sa/vol, of the corrugated portions and/or fuel electrode and enable effective exchange of the ionic fluid or electrolyte. An exemplary corrugated portion or corrugated fuel electrode may optimally have a surface area to volume ratio, sa/vol, of about 0.5 of more, about 1 or more, about 5 or more, about 10 or more and any range between and including the sa/vol values provided. In an embodiment, the corrugation portion(s) and/or the fuel electrode has a sa/vol between about 0.25 and about 30 (both inclusive). In another embodiment, the corrugation portion(s) and/or the fuel electrode has a sa/vol between about 1.0 and about 10 (both inclusive). In yet another embodiment, the corrugation portion(s) and/or the fuel electrode has a sa/vol between about 2.0 and about 6.0 (both inclusive). In one embodiment, the corrugation portion(s) and/or the fuel electrode has a sa/vol of about 1.0. In one embodiment, the corrugation portion(s) and/or the fuel electrode has a sa/vol of about 3.0. This value (sa/vol) can be calculated approximately by taking into account the diameter of the wire and the number of wires per unit length in both length and width direction as well as the volume occupied by the corrugated electrode, such as the amplitude of the corrugated portions that are attached multiplied by the area, length and width, occupied by the electrode. For example, a woven screen with a size of 24 by 27 by 0.6 cm utilizing round cross-sectional wires has a surface area of about 1,400 cm2 and a volume of about 389 cm3. This example has a sa/vol of about 3.6 cm2/cm3. The density of an exemplary corrugated electrode having first and second corrugated portions made out of woven screen having circular cross section wires with a diameter of about 3 mm and substantially square openings having a distance of 5 mm is about 0.065 g/cc, or 0.8% the density of solid nickel.

It will thus be seen that the features of this disclosure have been fully and effectively accomplished. It will be realized, however, that the foregoing preferred specific embodiments have been shown and described for the purpose of illustrating the functional and structural principles of this disclosure and are subject to change without departure from such principles. Therefore, this disclosure includes all modifications encompassed within the spirit and scope of the following claims.

What is claimed is:

1. A method of operating an electrochemical cell, the method comprising:

electrodepositing a metal fuel, via an ionically conductive medium in ionic communication between a fuel electrode and a cathode, on a first corrugated portion and a second corrugated portion of the fuel electrode, the first corrugated portion and the second corrugated portion each including electrically conductive material, the first corrugated portion and the second corrugated portion each defining respective apertures therethrough, the first corrugated portion having a first corrugation axis, and the second corrugated portion having a second corrugation axis offset from the first corrugation axis; and via the ionically conductive medium, oxidizing the metal fuel at the first corrugated portion and the second corrugated portion of fuel electrode.

2. The method of claim 1, wherein the first corrugated portion and the second corrugated portion are attached to one another.

3. The method of claim 1, wherein oxidizing the metal fuel at the first corrugated portion and the second corrugated portion of the fuel electrode includes reducing oxygen at an air cathode of the electrochemical cell.

4. The method of claim 1, further comprising creating a convective flow of the ionically conductive medium in ionic communication between the fuel electrode and the cathode.

5. The method of claim 4, wherein creating the convective flow of the ionically conductive medium comprises flowing the ionically conductive medium in a direction away from the cathode and across a top of the fuel electrode.

6. The method of claim 4, wherein creating the convective flow includes flowing the ionically conductive medium to pass through apertures defined by the first corrugated portion and the second corrugated portion.

7. The method of claim 1, wherein the first corrugated portion has a first corrugation ratio and the second corrugated portion has a second corrugation ratio, and the first corrugation ratio and the second corrugation ratio are each greater than 0.75 and less than about 5.0.

8. The method of claim 1, wherein the first corrugated portion and the second corrugated portion each have a smooth continuous outer surface, and the metal fuel is electrodeposited on the smooth continuous outer surface.

9. The method of claim 1, wherein the first corrugated portion and the second corrugated portion are calendared or crushed together.

* * * * *